United States Patent
Uehara

(10) Patent No.: US 10,317,688 B2
(45) Date of Patent: Jun. 11, 2019

(54) DISPLAY PANEL

(71) Applicant: NLT TECHNOLOGIES, LTD., Kanagawa (JP)

(72) Inventor: Shin-ichi Uehara, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 15/156,876

(22) Filed: May 17, 2016

(65) Prior Publication Data

US 2016/0259173 A1    Sep. 8, 2016

Related U.S. Application Data

(62) Division of application No. 14/275,330, filed on May 12, 2014, now Pat. No. 9,360,677, which is a division
(Continued)

(30) Foreign Application Priority Data

Jun. 27, 2006   (JP) .................................. 2006-176331

(51) Int. Cl.
*G02B 27/22*    (2018.01)
*G02F 1/1335*   (2006.01)
(Continued)

(52) U.S. Cl.
CPC ......... *G02B 27/2214* (2013.01); *G02B 5/201* (2013.01); *G02B 27/0025* (2013.01);
(Continued)

(58) Field of Classification Search
CPC ...................... G02B 27/2214; G02F 1/133555
(Continued)

(56) References Cited

U.S. PATENT DOCUMENTS

| 5,825,466 A | 10/1998 | Lo et al. |
| 6,501,521 B2 | 12/2002 | Matsushita et al. |

(Continued)

FOREIGN PATENT DOCUMENTS

| CN | 1497316 | 5/2004 |
| CN | 1525212 | 9/2004 |

(Continued)

OTHER PUBLICATIONS

Chinese Patent Office issued a Chinese Office Action dated Mar. 11, 2010, Application No. 200780024490.7.
(Continued)

*Primary Examiner* — Audrey Y Chang
(74) *Attorney, Agent, or Firm* — Young & Thompson

(57) ABSTRACT

A translucent liquid crystal display panel (2) includes pixel pairs as display units each formed by a left-eye pixel (4L) and a right-eye pixel (4R) and arranged in a matrix shape. A through hole (4Ld) arranged in a color layer (4Lc) of a color filter has a slit shape whose longitudinal direction is identical to the orientation direction of a cylindrical lens (3a) constituting a lenticular lens (3). Similarly, a through hole (4Rd) arranged in a color layer (4Rc) of a color filter has a slit shape whose longitudinal direction is identical to the orientation direction of the cylindrical lens (3a) constituting the lenticular lens (3). This suppresses the phenomenon that a hue is changed by a field-of-view angle and/or an external light condition on the translucent display panel capable of displaying an image directed to a plurality of viewpoints.

2 Claims, 66 Drawing Sheets

Related U.S. Application Data of application No. 12/306,763, filed as application No. PCT/JP2007/062948 on Jun. 27, 2007, now Pat. No. 8,760,761.

(51) Int. Cl.
  *H04N 13/305* (2018.01)
  *H04N 13/324* (2018.01)
  *G03B 21/625* (2014.01)
  *G03B 35/18* (2006.01)
  *G02B 5/20* (2006.01)
  *G02B 27/00* (2006.01)

(52) U.S. Cl.
  CPC .. *G02F 1/133514* (2013.01); *G02F 1/133526* (2013.01); *G02F 1/133555* (2013.01); *G03B 21/625* (2013.01); *G03B 35/18* (2013.01); *H04N 13/305* (2018.05); *H04N 13/324* (2018.05)

(58) Field of Classification Search
  USPC .................. 359/463, 464; 349/106; 345/419
  See application file for complete search history.

(56) References Cited

U.S. PATENT DOCUMENTS

| | | | |
|---|---|---|---|
| 6,606,078 B2 | 8/2003 | Son et al. | |
| 6,885,418 B2 | 4/2005 | Matsushita | |
| 7,339,639 B2 * | 3/2008 | Nakano | G02F 1/133555 349/106 |
| 7,705,844 B2 * | 4/2010 | Uehara | G02B 27/2214 345/419 |
| 7,868,992 B2 | 1/2011 | Ryu | |
| 2002/0126238 A1 | 9/2002 | Matsushita et al. | |
| 2003/0007112 A1 | 1/2003 | Matsushita et al. | |
| 2003/0043125 A1 | 3/2003 | Kojima et al. | |
| 2004/0109113 A1 | 6/2004 | Nakano et al. | |
| 2004/0169793 A1 | 9/2004 | Ino et al. | |
| 2004/0169919 A1 | 9/2004 | Uehara et al. | |
| 2005/0007522 A1 | 1/2005 | Hiraga et al. | |
| 2006/0050385 A1 | 3/2006 | Uehara | |

FOREIGN PATENT DOCUMENTS

| | | |
|---|---|---|
| CN | 1576982 | 2/2005 |
| CN | 1737895 | 2/2006 |
| JP | 06-332354 | 12/1994 |
| JP | 2000-111902 | 4/2000 |
| JP | 2002-333622 | 11/2002 |
| JP | 2003-233063 | 8/2003 |
| JP | 2004-184969 | 7/2004 |
| JP | 2004-280052 | 10/2004 |
| JP | 2005-31215 | 2/2005 |
| JP | 2005-208567 | 8/2005 |

OTHER PUBLICATIONS

Nikkei Electronics No. 838, Jan. 6, 2003, pp. 26-27, table 1.
Nikkei microelectronics supplement flat panel display, (2003).
Nikkei BP pp. 108-113 (FIG. 4).
Chinese Office Action, dated Oct. 10, 2014, in corresponding Chinese Patent Application No. 201310129476.0.

* cited by examiner

DISPLAY PANEL

TECHNICAL FIELD

The present invention relates to a semi-transmissive type display panel, a display device, and a terminal device capable of displaying images towards a plurality of viewpoints, and particularly relates to providing a display panel, a display device, and a terminal device capable of suppressing a phenomenon of color aberrations occurring due to an viewing angle and/or external light conditions.

BACKGROUND ART

Display apparatus capable of displaying three-dimensional images have been examined for many years. According to the Greek mathematician Euclid in 280 B.C., "biocular vision is the sensation experienced when the same object is viewed at the same time by left and right eyes viewing separate images looked at from different directions". It is therefore necessary for a function of a three-dimensional image display device to be to provide individual images to the left and right eyes with a mutual parallax.

A large number of three-dimensional image display methods have conventionally been examined as specific methods of implementing this function. These methods can be substantially divided into methods using glasses and methods that do not use glasses. Of these methods, anaglyph methods utilizing differences in color and polarizing glasses methods utilizing polarization exist as methods using glasses. However, it is basically not possible to eliminate the bothersomeness of having to wear glasses. Methods that do not use glasses have therefore been extensively examined in recent years.

Lenticular lens methods and parallax barrier methods exist as methods that do not use glasses. The lenticular lens method was invented in approximately 1910 by Ives et. Al. The parallax barrier method was conceived by Berthier in the year 1896, and verified by Ives in the year 1903.

A parallax barrier is a light blocking plate (barrier) formed with a large number of thin vertical stripe-shaped apertures extending in mutually parallel directions, i.e. formed with slits. A display panel is arranged at a rear surface of the parallax barrier. Pixels for left eye and right eye use are then repeatedly arranged at the display panel in a direction orthogonal to a lengthwise direction of the slits. The light from each pixel is therefore partially shielded while passing through the parallax barrier. Specifically, the pixels are arranged so that light from a pixel for left eye use reaches the left eye of a viewer but the light directed towards the right eye is shielded, while light from a pixel for the right eye reaches the right eye but does not reach the left eye. As a result, the light from respective pixels reaches the left and right eyes. It is therefore possible for the observer to recognize three-dimensional images.

FIG. 59 is a perspective view showing a biocular three-dimensional image display device using a parallax barrier of the related art, and FIG. 60 is a view showing an optical model for this three-dimensional image display device. As shown in FIGS. 59 and 60, a transmission type liquid crystal display panel 1021 is provided in the three-dimensional image display device of the related art, with display pixels being provided in a matrix shape at this transmission type liquid crystal display panel 1021. A left eye pixel 1043 and a right eye pixel 1044 are provided at each display pixel. The left eye pixel 1043 and the right eye pixel 1044 are defined by a light shielding section 1006. The light shielding section 1006 is arranged in order to prevent color mixing of the image and to transmit a display signal to the pixel.

A parallax barrier 1007 is provided at the front surface of the liquid crystal display panel 1021, i.e. on the observer side and a slit 1007a extending in one director is formed in the parallax barrier 1007. The slit 1007a is arranged corresponding to a pair of the left eye pixel 1043 and the right eye pixel 1044. A light source 1010 is provided at the rear surface of the liquid crystal display panel 1021.

As shown in FIG. 60, after light irradiated from the light source 1010 has passed through the left eye pixel 1043 and the right eye pixel 1044 of the transmission type liquid crystal display panel 1021, part of the light is shielded while passing through the slit 1007a of the parallax barrier 1007 and the remaining light is emitted towards respective regions of EL and ER. This means that a left eye image is inputted to the left eye 1052 and a right eye image is inputted to the right eye 1051 because the observer has their left eye 1052 positioned at the region EL and has their right eye 1051 positioned at the region ER. The viewer can therefore recognize a three-dimensional image.

When the parallax barrier method was first conceived, there was a problem that visibility was poor because the parallax barrier was arranged between the display panel and the eyes. However, with liquid crystal displays devices implemented in recent years, it has become possible to arrange the parallax barrier at the rear of the display panel, with visibility improving as a result. Such liquid crystal display devices are currently actively being examined and have recently been made into actual products (for example, refer to non-patent literature 1). The product disclosed in non-patent literature 1 is a parallax barrier type of three-dimensional image display device using a transmission type liquid crystal panel.

On the other hand, the lenticular lens method is a three-dimensional image display method that uses a lenticular lens as an optical element for implementing three-dimensional displaying. A lenticular lens is a lens with one flat surface, and with a plurality of semi-cylindrical projections (cylindrical lenses) extending in one direction formed at the other surface. Pixels displaying right eye images and pixels displaying left eye images are alternately arranged at a focal plane of this lens. One projecting section corresponds to one row of display units each comprised of one right eye pixel and one left eye pixel arranged in one direction. The light from each pixel is therefore divided in half in directions towards the left and right eyes by the lenticular lens. It is therefore possible for mutually different images to be recognized by the left and right eyes and it is possible for the observer to recognize a three-dimensional image.

FIG. 61 is a perspective view showing a biocular three-dimensional image display device using a lenticular lens of the related art, and FIG. 62 is a view showing an optical model for this three-dimensional image display device. As shown in FIGS. 61 and 62, a transmission type liquid crystal display panel 2021 is provided in the three-dimensional image display device of the related art, with display pixels being provided in a matrix shape at this transmission type liquid crystal display panel 2021. A left eye pixel 2043 and a right eye pixel 2044 are provided at each display pixel. A lenticular lens 2003 is provided at the front surface of the liquid crystal display panel 2021, i.e. on the observer side. A cylindrical lens 2003a that is a semi-cylindrical projecting section extending in one direction mutually in parallel is formed at the lenticular lens 2003. This cylindrical lens 2003a is arranged corresponding to two pixels of the transmission type liquid crystal display panel 2021, i.e. to one pair of a left eye pixel 2043 and a right eye pixel 2044. A light source 2010 is provided to the back surface side of the liquid crystal display panel 2021.

As shown in FIG. 62, after light irradiated from the light source 2010 passes through the left eye pixel 2043 and the right eye pixel 2044 of the transmission type liquid crystal display panel 2021, the light is refracted by the cylindrical lens 2003a and emitted towards the regions EL and ER. This means that a left eye image is inputted to the left eye 2052 and a right eye image is inputted to the right eye 2051 because the observer has their left eye 2052 positioned at the region EL and has their right eye 2051 positioned at the region ER. It is therefore possible for the observer to recognize three-dimensional images.

The parallax barrier method is a method where unnecessary light is "shielded" by a barrier, whereas the lenticular lens method is a method that changes the direction of travel of the light. This means that, in theory, the brightness of the display screen does not fall compared to a flat display even when displaying three-dimensionally. Application is therefore being examined in particular to terminal devices such as mobile equipment that requires both high brightness displaying and low power consumption and performance.

Simultaneous multiple image displaying devices that display a plurality of images at the same time have also been developed as other image display devices using a lenticular lens (for example, refer to patent literature 1). FIG. 63 (FIG. 10 of patent literature 1) is a schematic diagram showing a simultaneous multiple image displaying device of the related art disclosed in patent literature 1, and FIG. 64 is a diagram explaining the working of this simultaneous multiple image displaying device. As shown in FIG. 63, a simultaneous multiple image displaying device 3001 of the related art has a lenticular lens 3003 arranged at a front surface of the CRT3002.

As shown in FIG. 64, the simultaneous multiple image displaying device of the related art disclosed in patent literature 1 utilizes a function of dividing the image using the lenticular lens so as to enable images that are different for every direction of observation to be displayed at the same time under the same conditions. As a result, it is possible for a single simultaneous multiple image displaying device to simultaneously provide mutually different images to a plurality of viewers positioned in mutually different directions with respect to this display device. In patent literature 1, it is disclosed that by using this simultaneous multiple image displaying device, it is possible to reduce both footprint and electricity costs compared to the usual case where one image display devices are prepared just for the number of images wished to be displayed at the same time.

On the other hand, with terminal devices such as mobile equipment, ease of portability and length of usage time are important factors. It is therefore wished to reduce power consumption so that driving for long period of time is possible even with small, lightweight batteries that are capable of accumulating only a small amount of electrical power. Further, situations of use in extremely bright locations outdoors occur frequently. It is therefore necessary to make the brightness of the screen high every one minute in order to ensure sufficient visibility in bright locations. It is therefore preferable to use semi-transparent liquid crystal display devices as display devices satisfying such requirements.

With display devices using liquid crystal, the liquid crystal molecules themselves do not emit light. It is therefore necessary to use some kind of light in order to view the display. Typical liquid crystal display devices can be substantially divided into transmission type, reflecting type, and a semi-transmissive type display devices combining both transmitted light and reflected light, depending on the type of light source used. Low power consumption is possible with the reflecting type display devices because external light is utilized in displaying. However, display performance such as for contrast is degraded upon comparison with transmission type display devices. Transmission type and semi-transmissive type display devices therefore currently constitute the mainstream for liquid crystal displays devices. With transmission type and semi-transmissive type liquid crystal display devices, a light source device is installed at the back surface of the liquid crystal panel, with displaying then being implemented utilizing light emitted by this light source device. In particular, small and medium-sized liquid crystal display devices are carried by the observer and used in various situations. A semi-transmissive liquid crystal display device having a high degree of visibility can therefore be used in any situation by viewing a reflective display in bright locations, and viewing a transmission display in dark locations.

FIG. 65 is a plan view showing a first semi-transmissive type liquid crystal display device of the related art as disclosed in non-patent literature 2. As shown in FIG. 65, with the first liquid crystal display device of the related art, each of pixels 4040 of a semi-transmissive type liquid crystal display panel 4022 are divided into three color regions of R (red), G (green), and B (blue). Each color region is then divided into a transmission region and a reflective region. That is, the pixel 4040 is divided into six regions of a transmission region (red) 4041R, a reflective region (red) 4042R, a transmission region (green) 4041G, a reflective region (green) 4042G, a transmission region (blue) 4041B, and a reflective region (blue) 4042B. The semi-transmissive type liquid crystal display device of the related art disclosed in non-patent literature 2 is a display device capable of implementing both reflective displaying and transmission displaying and is not a three-dimensional image display device or a simultaneous multiple image displaying device. A lenticular lens or parallax barrier etc. are therefore not provided.

With the first semi-transmissive type liquid crystal display device of the related art, a metal film (not shown) is formed at the surface of the side contacting the liquid crystal of the glass substrate of the rear side, of two sheets of glass substrate of the semi-transmissive type liquid crystal display panel 4022 at each reflective region. This metal film then reflects external light. As a result, at the transmission region, light from the light source (not shown) is transmitted through the liquid crystal layer of the liquid crystal panel (not shown) and an image is formed. Further, at the reflective region, external light such as natural light and illuminating light within a room is transmitted through the liquid crystal layer. This light is then reflected by the metal film and is again transmitted through the liquid crystal layer so as to form an image. It is therefore possible to utilize external light as part of the light source at locations where the external light is very bright. As a result, upon comparison with the transmission type liquid crystal display device, the semi-transmissive type liquid crystal display device is capable of suppressing power consumption required to maintain brightness of the display screen and illuminate the light source.

With this semi-transmissive type liquid crystal display device, it is one time light from a backlight is transmitted at the color filter layer corresponding to a transmission section;

while the external light is transmitted two times, once when incident, and once when emitted, at a color filter layer corresponding to a reflective section. When the color filter layer is similarly arranged at the transmission section and the reflective section, there is a problem that the transmissivity of the reflective section falls and the color of the display becomes denser. Technology is therefore proposed where a region corresponding to the reflective section is configured from a region where a color filter layer is formed and a region where a color filter layer is not formed.

FIG. 66 is a plan view showing a second semi-transmissive type liquid crystal display device of the related art as disclosed in non-patent literature 2. As shown in FIG. 66, the second semi-transmissive type liquid crystal display device of the related art includes a reflective electrode 5003 and a transparent electrode 5008 formed in prescribed shapes on a lower side substrate 5001 and includes a color filter layer 5011 formed on a color filter substrate arranged facing the lower side substrate 5001. A signal electrode 5021 for driving the electrodes, a scanning electrode 5022, and a thin-film transistor (TFT) 5023 arranged in the vicinity of an intersecting section of the two types of electrodes are formed at the periphery of the reflective electrode 5003 and the transparent electrode 5008. Further, the color filter layer 5001 includes three types of filter layer, a red color filter layer 5001a, a green color filter layer 5011b, and a blue color filter 5011c. Each color filter layer of each respective color is formed so as not to overlap with the whole of the reflective electrode 5003 but to always overlap with the whole of the transmission electrode 5008. That is, a region is formed where the whole of the transparent electrode 5008 is covered by the color filter layer 5011, whereas the reflective electrode 5003 is not covered by the color filter layer 5011.

With the second semi-transmissive type liquid crystal display device of the related art, a region is provided where the color filter layer is not formed at the reflective section. The problem where the color for reflective displaying becomes darker than for transmission displaying is therefore suppressed by displaying white at the region where the color filter layer is not formed and mixing colors with light that is transmitted through the color filter layer. It is therefore possible to implement bright reflective displaying.

Non-patent literature 1: Nikkei Electronics No. 838, Jan. 6, 2003, p. 26-27 (table 1)

Non-patent literature 2: Nikkei microelectronics supplement "flat panel display", Nikkei BP p. 108-113 (FIG. 4)

Patent literature 1: Unexamined Japanese Patent Application KOKAI Publication No. 06-332354 (FIG. 9, FIG. 10)

Patent literature 2: Unexamined Japanese Patent Application KOKAI Publication No. 2000-111902 (FIG. 1)

DISCLOSURE OF INVENTION

Problems to be Solved by the Invention

However, when a three-dimensional image display device and a semi-transmissive type liquid crystal display device are combined as in the related art described above, the following problems occur. The color density of the reflective displaying changes depending on the observation position and the external light conditions and partial discoloration can be seen.

In order to resolve the above problems, it is an object of the present invention to provide a display panel, a display device, and a terminal device capable of suppressing a phenomenon of color aberrations occurring due to the viewing angle and/or external light conditions in a semi-transmissive type display panel capable of displaying respective images directed towards a plurality of viewpoints.

Means for Solving the Problems

A display panel of a first aspect of the invention of this application is comprised of a plurality of display units including at least pixels for displaying a first viewpoint image and pixels for displaying a second viewpoint image arranged in the shape of a matrix, an optical member, for splitting in mutually different directions light emitted from each pixel within the display unit provided along a first direction along which the pixels for displaying the first viewpoint image and the pixels for displaying the second viewpoint image are arranged; color filter layers each provided at at least the display region of each pixel; and a through-hole provided at the color filter layer of each pixel of the width of the through-hole in the first direction is the width of the display region or more.

The present invention can be configured with the through-hole existing at any position in the first direction that is the light splitting direction. As a result, it is possible to prevent the through-holes from being distributed unevenly only a certain specific portions, and it is possible to suppress a phenomenon where color aberrations occur due to the viewing angle and/or light source conditions.

The display panel of a second aspect of the invention of this application comprises a plurality of display units including at least pixels for displaying a first viewpoint image and pixels for displaying a second viewpoint image arranged in the shape of a matrix, an optical member, for splitting in mutually different directions light emitted from each pixel within the display unit provided along a first direction along which the pixels for displaying the first viewpoint image and the pixels for displaying the second viewpoint image are arranged; color filter layers each provided at at least the display region of each pixel, and a through-hole provided at the color filter layer of each pixel. Here, the width of the through-hole in the first direction is the width of the display region or more. The through-hole forms a shape divided with respect to the first direction, and the optical member does not have an image forming relationship with the pixels.

In the present invention, it is possible to display an image for the through-hole in a gradated manner because the optical member has no image forming relationship with the pixels. It is therefore possible to reduce the influence of the through-holes and it is possible to suppress color aberrations. It is therefore possible to improve the degree of freedom of arrangement of the through-holes and displaying quality can also be improved.

A display panel of a third aspect of the invention of this application is comprised of a plurality of display units including at least pixels for displaying a first viewpoint image and pixels for displaying a second viewpoint image arranged in the shape of a matrix, an optical member, for splitting in mutually different directions light emitted from each pixel within the display unit provided along a first direction along which the pixels for displaying the first viewpoint image and the pixels for displaying the second viewpoint image are arranged; color filter layers each provided at at least the display region of each pixel, and a through-hole provided at the color filter layer of each pixel of the width of the through-hole in the first direction is the width of the display region or more. The plurality of pixels for displaying the first viewpoint image and the plurality of pixels for displaying the second viewpoint image each include a pixel that has the through-hole in a position different from other pixels.

According to the present invention, it is possible to prevent the relative positions of the through-holes at each pixel from being the same for all pixels and it is possible to reduce the influence of the through-holes using pixels of different through-hole positions. This means that it is possible to reduce a phenomenon of color aberrations occurring as a result of the viewing angle and/or light source conditions.

A third aspect of the invention of this application is suitable for application to display panels using thin-film transistors. In particular, when the position of the through-hole is restricted as a result of using thin-film transistors and storage capacitors used in combination with the thin-film transistors, a preferred application is possible where the position is changed for the thin-film transistors etc. using line units. For example, by arranging the positions of thin-film transistors etc. within the pixels symmetrically about a Y-axis in line units, appropriate combination with the positions of the through-holes of the present invention is possible.

Effect of the Invention

According to the present invention, in a semi-transmissive type liquid crystal display element having transmission regions and reflective regions where through-holes are formed at color layers of the color filters at reflective regions, it is possible to implement uniform reflective displaying by arranging through-holes in such a manner that an image splitting effect of an image splitting optical element such as a lenticular lens, fly-eye-lens, or parallax barrier is reduced, and it is possible to suppress a phenomenon of color aberrations occurring as a result of the viewing angle and/or external light conditions.

Figure 1:
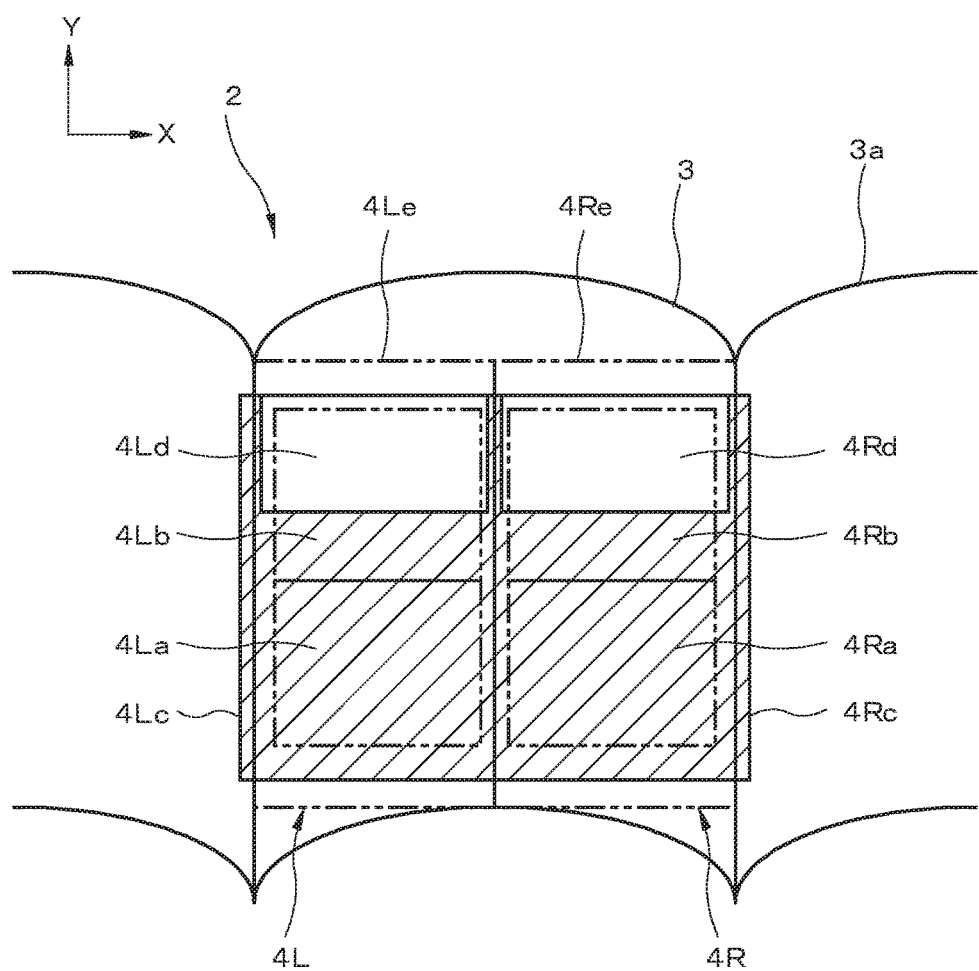
FIG. 1 A plan view showing a display panel of a first embodiment of the present invention.

DESCRIPTION OF THE NUMERALS 1, 11, 12, 13, 14, 15, 16, 17, 18, 19, 10, 111, 112, 113, 114, 115, 116, 117, 118, 119; three-dimensional image display device
2, 21, 22, 23, 24, 25, 26, 27, 28, 29, 20, 221, 222, 223, 224, 225, 226, 227, 228, 229; semi-transmissive type liquid crystal display panel
3, 31, 32, 33; lenticular lens
3a, 31a, 32a, 33a; cylindrical lens
4L, 41L, 42L, 43L, 44L, 45L, 46L, 47L, 401L, 402L, 403L, 404L, 405L, 406L, 407L; left eye pixel
4R, 41R, 42R, 43R, 44R, 45R, 46R, 47R, 401R, 402R, 403R, 404R, 405R, 406R, 407R; right eye pixel
4F; first viewpoint pixel
4S; second viewpoint pixel
4La, 41La, 42La, 43La, 44La, 45La, 46La, 47La, 401La, 402La, 403La, 404La, 405La, 406La, 407La, 4Ra, 41Ra, 42Ra, 43Ra, 44Ra, 45Ra, 46Ra, 47Ra, 401Ra, 402Ra, 403Ra, 404Ra, 405Ra, 406Ra, 407Ra, 4Fa, 4Sa; transmission region
4Lb, 41Lb, 42Lb, 43Lb, 44Lb, 45Lb, 46Lb, 47Lb, 401Lb, 402Lb, 403Lb, 404Lb, 405Lb, 406Lb, 407Lb, 4Rb, 41Rb, 42Rb, 43Rb, 44Rb, 45Rb, 46Rb, 47Rb, 401Rb, 402Rb, 403Rb, 404Rb, 405Rb, 406Rb, 407Rb, 4Fb, 4Sb; reflective region
4Lc, 41Lc, 42Lc, 43Lc, 44Lc, 45Lc, 46Lc, 47Lc, 401Lc, 402Lc, 403Lc, 404Lc, 405Lc, 406Lc, 407Lc, 4Rc, 41Rc, 42Rc, 43Rc, 44Rc, 45Rc, 46Rc, 47Rc, 401Rc, 402Rc, 403Rc, 404Rc, 405Rc, 406Rc, 407Rc, 4Fc, 4Sc; color layer
4Ld, 41Ld, 42Ld, 43Ld, 44Ld, 45Ld, 46Ld, 47Ld, 401Ld, 402Ld, 403Ld, 404Ld, 405Ld, 406Ld, 407Ld, 4Rd, 41Rd, 42Rd, 43Rd, 44Rd, 45Rd, 46Rd, 47Rd, 401Rd, 402Rd, 403Rd, 404Rd, 405Rd, 406Rd, 407Rd, 4Fd, 4Sd; through-holes
4Le, 41Le, 42Le, 43Le, 44Le, 45Le, 46Le, 47Le, 401Le, 402Le, 403Le, 404Le, 405Le, 406Le, 407Le, 4Re, 41Re, 42Re, 43Re, 44Re, 45Re, 46Re, 47Re, 401Re, 402Re, 403Re, 404Re, 405Re, 406Re, 407Re, 4Fe, 4Se; light shielding region
51; right eye
52; left eye
6; fly-eye lens
7; parallax barrier
7a; slit
8; planar light source
9, 91; mobile telephone
1021; transmission type liquid crystal display panel
1043; left eye pixel
1404; right eye pixel
1006; light shielding section
1007; parallax barrier 1007a; slit
1010; light source
1051, 2051; right eye
1052, 2052; left eye
2021; transmission type liquid crystal display panel
2043; left eye pixel
2044; right eye pixel
2003; lenticular lens
2003a; cylindrical lens
2010; light source
3001; simultaneous multiple image displaying device
3002; CRT
3003; lenticular lens
4022; semi-transmissive type liquid crystal display panel
4040; pixel 4040
4041R; transmission region (red)
4042R; reflective region (red)
4041G; transmission region (green)
4042G; reflective region (green)
4041B; transmission region (blue)
4042B; reflective region (blue)
5001; lower substrate
5003; reflective electrode
5008; transmission electrode
5011; color filter layer
5011a; red color filter layer
5011b; green color filter layer
5011c; blue color filter layer
5021; signal electrode
5022; scanning electrode
5023; thin-film transistor (TFT)

BEST MODE FOR CARRYING OUT THE INVENTION

Figure 2:
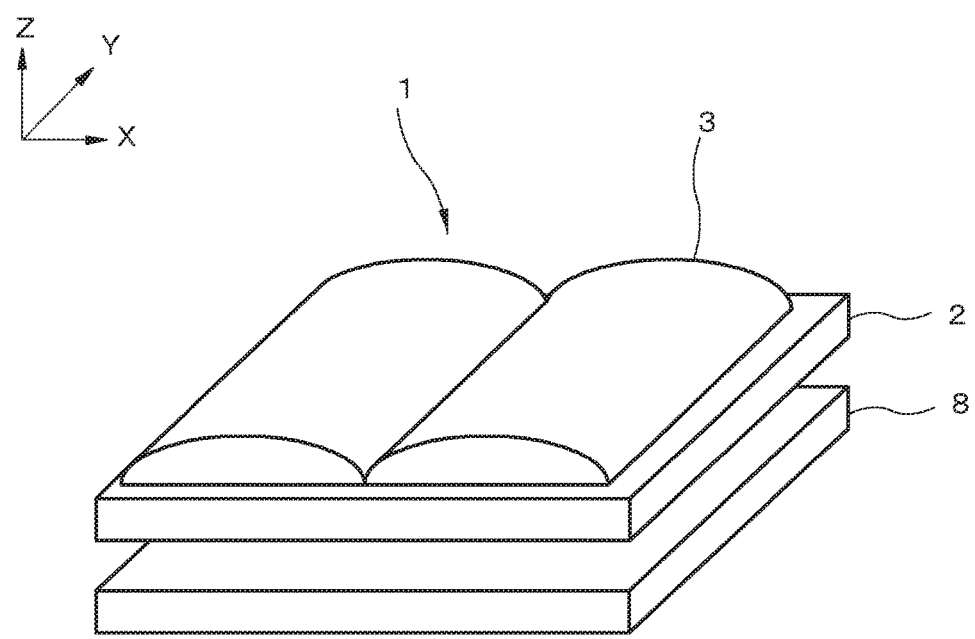
FIG. 2 A perspective view showing a display device of the first embodiment.
Figure 3:
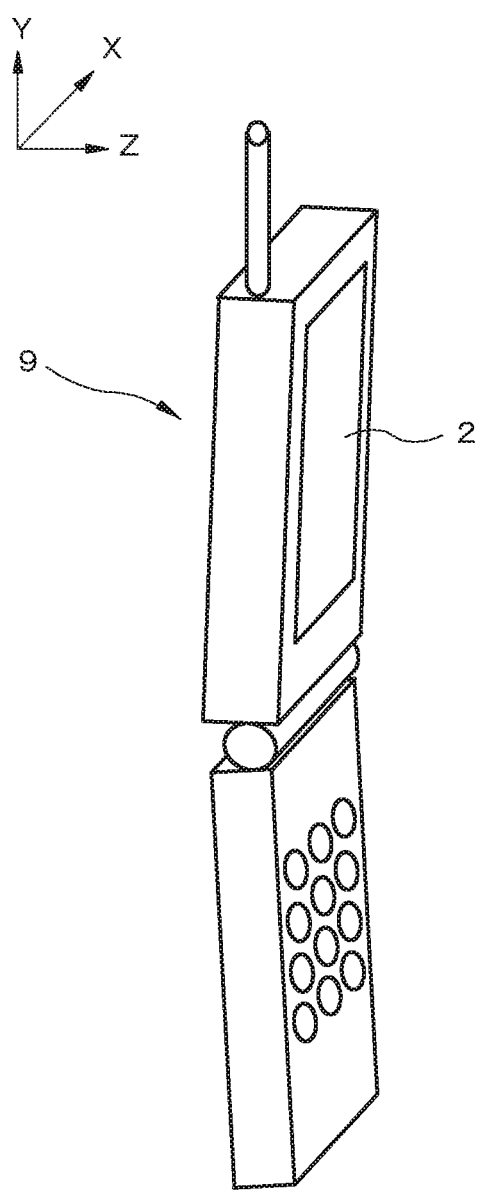
FIG. 3 A perspective view showing a terminal device of the first embodiment.

The following is a detailed description with reference to the appended drawings of a display panel, a display device, and a terminal device of the embodiments of the present invention. First, an explanation is given of a display panel, a display device, and a terminal device of a first embodiment of the present invention. FIG. 1 is a plan view showing a display panel of this embodiment. FIG. 2 is a perspective view showing a display device of this embodiment. FIG. 3 is a perspective view showing a terminal device of this embodiment.

As shown in FIG. 1, the display panel of the first embodiment is a semi-transmissive type liquid crystal display panel 2 equipped with a lenticular lens 3. With this semi-transmissive type liquid crystal display panel 2, each pixel pair that is a display unit constituted by one left eye pixel 4L and one right eye pixel 4R is provided in a matrix shape. The lenticular lens 3 is a lens array with a large number of cylindrical lenses 3a one dimensionally arranged. The direction of arraying of the cylindrical lenses 3a is arranged in the direction where the left eye pixels 4L and the right eye pixels 4R are repeatedly arranged. A direction of elongation of the cylindrical lenses 3a, i.e. a longitudinal direction is a direction orthogonal to the direction of arraying of the cylindrical lenses 3a within a display surface. As shown in FIG. 2, the cylindrical lenses have semi-cylindrical projections. In FIG. 1, this shape is depicted in an exaggerated manner. In reality, the surface parallel to the surface where the pixels are formed is depicted as rectangular and a projecting shape does not appear. This is the same in plan views showing cylindrical lenses occurring in other embodiments.

In this specification, an XYZ orthogonal coordinate system is set as shown below for simplicity. In the direction where the left eye pixel 4L and the right eye pixel 4R, repeatedly arranged, a direction from the left eye pixel 4L towards the right eye pixel 4R is taken to be a +X direction, and the opposite direction is taken to be a −X direction. The +X direction and the −X direction are then totaled to give an X-axis direction. Further, a longitudinal direction of the cylindrical lens 3a is taken to be a Y-axis direction. Further, a direction orthogonal to both the X-axis direction and the Y-axis direction is taken to be a Z-axis direction. A direction going from the left eye pixel 4L or the right eye pixel 4L towards the lenticular lens 3 is taken to be a +Z direction, in the opposite direction is taken to be a −Z direction. The +Z direction is forwards, i.e. a direction towards the observer. The user views the surface of the semi-transmissive type liquid crystal display panel 2 on the +Z side. The +Y direction is taken to be a direction where a right-hand coordinate system is established. That is, the thumb of a person's right-hand is taken to be the +X direction, the index finger is taken to be the +Y direction, and the middle finger is taken to be the +Z direction.

When the XYZ orthogonal coordinate system is set, the direction of arraying of the cylindrical lenses 3a becomes the X-direction, and the left eye pixels 4L and the right eye pixels 4R are each arranged in a row in the Y-axis direction. The array interval for the pixel pairs in the X-direction is approximately equal to the array interval for the cylindrical lenses. In this X-direction, a row constituting one pair of pixel pairs arranged in the Y-axis direction corresponds to the one cylindrical lens 3a.

A transmission region 4La for transmission display and a reflective region 4Lb for reflective display are provided at the left eye pixel 4L. The transmission region 4La and the reflective region 4Lb are formed so as to divide the left eye pixel 4L into two equal halves along the Y-axis direction. The region on the −Y direction side is then the transmission region 4La, and the region on the +Y direction side is then the reflective region 4Lb.

The reflective region 4Lb is formed with, for example, a metal film (not shown) such as, for example, aluminium, at a surface contacting with a liquid crystal layer (not shown) at a glass substrate (not shown) positioned in a −Z direction of the semi-transmissive type liquid crystal display panel 2. Light that is incident from the front and that is transmitted through the liquid crystal layer of the semi-transmissive type liquid crystal display panel is reflected by the metal film and is again transmitted through the liquid crystal layer so as to be emitted towards the front.

A color layer 4Lc for implementing color displaying is provided at the transmission region 4La and the reflective region 4Lb of the left eye pixel 4L. The color layer 4Lc is formed using an organic film (not shown) containing, for example, pigment, at a surface making contact with the liquid crystal layer (not shown) at the glass substrate (not shown) positioned in a +Z direction of the semi-transmissive type liquid crystal display panel 2. Light incident from the front that is incident to the color layer 4Lc of the semi-transmissive type liquid crystal display panel 2 is again reflected by the metal film after being transmitted through the liquid crystal layer so as to once again be transmitted through the liquid crystal layer. The light is then again transmitted through the color layer 4Lc and is emitted towards the front. On the other side, light incident to the semi-transmissive type liquid crystal display panel 2 from the rear is transmitted through the color layer 4Lc after being transmitted through the liquid crystal layer and is emitted towards the front.

A slit-shaped through-hole 4Ld is provided at part of the color layer 4Lc of the reflective region 4Lb. This slit-shaped through-hole 4Ld is arranged at the end in the +Y direction in the reflective region 4Lb. The width of this slit in the X-axis direction is the width of the display region of the left eye pixel 4L in the X-axis direction or more, and the width of this slit in the Y-axis direction is fixed regardless of the coordinates in the X-axis direction. That is, the side formed by the slit-shaped through-hole 4Ld in the +Y direction and the side in the −Y direction are arranged so as to be parallel. In one example, the width of the through-hole 4Ld in the Y-axis direction is set to be half of the width of the reflective region 4Lb in the Y-axis direction.

A light shielding region 4Le is provided at the transmission region 4La and the reflective region 4Lb of the left eye pixel 4L. The light shielding region 4Le is a region provided in order to prevent the influence of neighboring pixels being viewed at the time of display, and in order to be a light shielding for wiring etc. As with the color layer 4Lc, the light shielding region 4Le is formed using an organic film (not shown) containing, for example, black pigment, at a surface contacting with a liquid crystal layer (not shown) at a glass substrate (not shown) positioned at a +Z direction of the semi-transmissive type liquid crystal display panel 2.

The right eye pixel 4R has a structure that is exactly the same as the left eye pixel 4L but the positional relationship with respect to the corresponding cylindrical lens 3a is different to that of the left eye pixel 4L. That is, a transmission region 4Ra, a reflective region 4Rb, a color layer 4Rc, a slit-shaped through-hole 4Rd, and a light shielding region 4Re are the same configurational elements as for each left eye pixel 4L and are arranged as the configurational elements of the right eye pixel 4R.

FIG. 1 shows one pair of a left eye pixel and a right eye pixel of the display panel and one cylindrical lens corresponding to this pair of pixels. Further, the pixels are arranged at the focal surface of the cylindrical lens. That is, the distance between a principal point of the cylindrical lens (portion inclined projecting most in the +Z direction) and a pixels is set to be a focal length of the cylindrical lens.

As shown in FIG. 2, and the display device of this first embodiment is a three-dimensional image display device 1 with a flat light source 8 provided at a rear surface of the display panel i.e. at the −Z side. The flat light source 8 is a light source operating as a backlight in the transmission displaying of the semi-transmissive type liquid crystal display panel 2 that enables transmission displaying to be viewed by utilizing the light emitted by the flat light source 8.

As shown in FIG. 3, this display device 2 is mounted on, for example, a display unit of a mobile telephone 9. That is, the mobile telephone 9 that is a terminal device of this embodiment is equipped with the display device 2. The Y-axis direction that is the longitudinal direction of the cylindrical lens 3a shown in FIG. 1 constitutes a vertical direction of the screen of the three-dimensional image display device 1, i.e. a perpendicular direction. The X-axis direction that is the arraying direction of the cylindrical lens 3a constitutes a longitudinal direction of the screen of the three-dimensional image display device 1, i.e. the horizontal direction. At this mobile telephone 9, the three-dimensional image display device 1 is driven by a battery (not shown) built into the mobile telephone 9.

Figure 4:
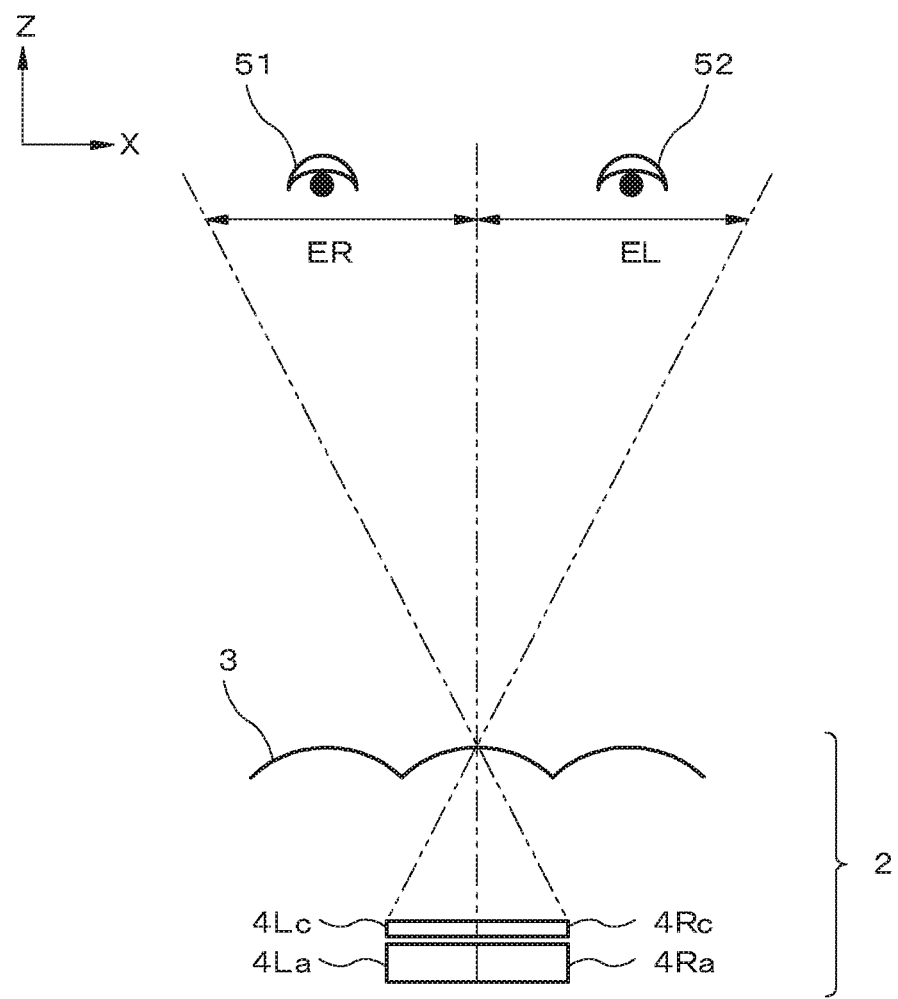
FIG. 4 A diagram showing an optical model in cross-section taken along a pixel transmission region at a line segment parallel with an X-axis direction for a semi-transmissive type liquid crystal display panel of this embodiment.
Figure 5:
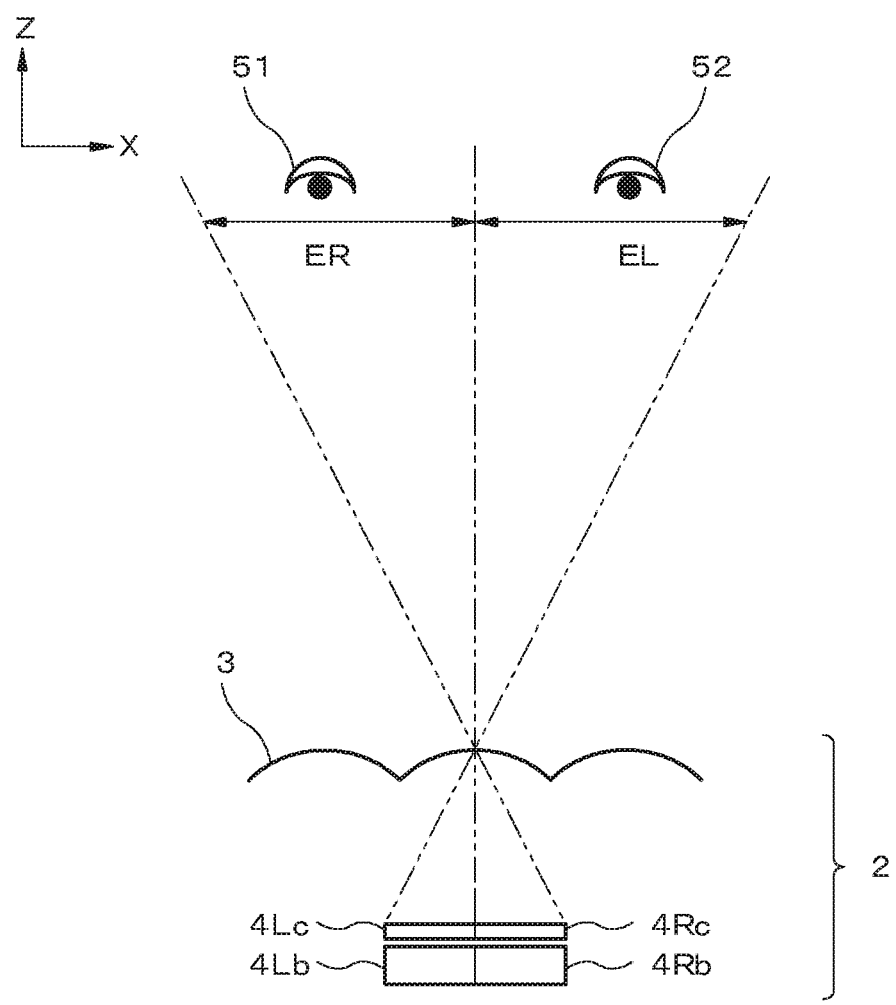
FIG. 5 A diagram showing an optical model in cross-section taken along a reflective region that does not include through-holes at a line segment parallel with an X-axis direction for the semi-transmissive type liquid crystal display panel of this embodiment.
Figure 6:
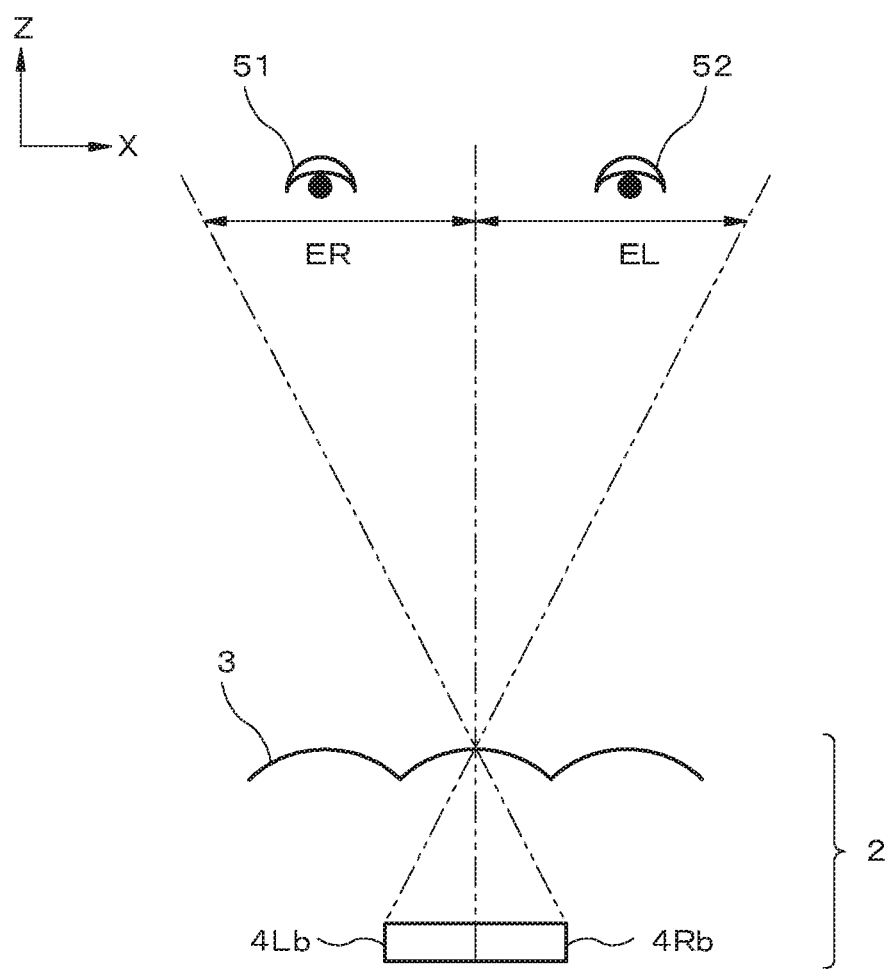
FIG. 6 A diagram showing an optical model in cross-section taken along a reflective region including a through-hole at a line segment parallel with the X-axis direction for the semi-transmissive type liquid crystal display panel of this embodiment.

Next, an explanation is given of the operation of the three-dimensional image display device of this embodiment so structured as described above. FIG. 4 is a diagram showing an optical model in cross-section taken along a transmission region of a pixel at a line segment parallel with the X-axis direction at the semi-transmissive type liquid crystal display panel 2 shown in FIG. 2. FIG. 5 is a diagram showing an optical model in cross-section taken along a reflective region that does not include through-holes at a line segment parallel with an X-axis direction at the semi-transmissive type liquid crystal display panel 2 shown in FIG. 2. FIG. 6 is a diagram showing an optical model in cross-section taken along a reflective region including a through-hole at a line segment parallel with the X-axis direction for the semi-transmissive type liquid crystal display panel 2 shown in FIG. 2.

As shown in FIG. 4, a signal is inputted to the semi-transmissive type liquid crystal display panel 2 from an external control device (not shown) and the left eye pixel 4L and the right eye pixel 4R display a left eye image and a right eye image, respectively. In this situation, the flat light source 8 emits light and this light is incident to the semi-transmissive type liquid crystal display panel 2. Of the light incident to the semi-transmissive type liquid crystal display panel 2, the light incident to the reflective regions 4Lb and 4Rb is reflected by the metal film acting as a reflective plate. This light then again becomes incident to the flat light source 8 without being transmitted through the semi-transmissive type liquid crystal display panel 2. On the other hand, light incident to the transmission regions 4La and 4Ra is transmitted through the liquid crystal layer and the color layers 4Lc and 4Rc positioned at the transmission regions 4La and 4Ra of the semi-transmissive type liquid crystal display panel 2 and becomes incident to the lenticular lens 3. Light emitted by the flat light source 8 is transmitted through the transmission regions 4La and 4Ra, becomes incident to the lenticular lens 3, and transmission displaying is realized. At this time, this light is only transmitted through the color layers 4Lc and 4Rc one time.

As shown in FIG. 5, external light such as natural light and illuminating light goes from the front, is transmitted through the lenticular lens 3, and is incident to the semi-transmissive type liquid crystal display panel 2. Of the light incident to the liquid crystal display panel 2, the light incident to the reflective regions 4Lb and 4Rb present at the color layers 4Lc and 4Rc is transmitted through the color layers 4Lc and 4Rc of the semi-transmissive type liquid crystal display panel 2. The light is then transmitted through the liquid crystal layer, is reflected by the metal film, and is again transmitted through the liquid crystal layer. The light is then again transmitted through the color layers 4Lc and 4Rc and is then incident to the lenticular lens 3. That is, external light incident to the reflective regions 4Lb and 4Rb present at the color layers 4Lc and 4Rc is transmitted through the color layers 4Lc and 4Rc two times. On the other hand, light incident to the transmission regions 4La and 4Ra is transmitted to the rear of the semi-transmissive type liquid crystal display panel 2, i.e. is transmitted to the side of the flat light source 8 and does not contribute directly to displaying. External light such as natural light and illuminating light is then transmitted through the reflective regions 4Lb and 4Rb, is incident to the lenticular lens 3, and reflective displaying is realized.

As shown in FIG. 6, of the external light coming from the front that is transmitted through the lenticular lens 3 and incident upon the semi-transmissive type liquid crystal display panel 2, light that is incident to the through-holes 4Ld and 4Rd at the reflective regions 4Lb and 4Rb where the color layers 4Lc and 4Rc do not exist is transmitted through the liquid crystal layer of the semi-transmissive type liquid crystal display panel 2 and is reflected by the metal film. The light is then again transmitted through the liquid crystal layer and is incident to the lenticular lens 3. That is, external light incident to the through-holes 4Ld and 4Rd is basically not transmitted through the color layers 4Lc and 4Rc. As shown in FIG. 6, in the X-axis direction, the width of the through-hole 4Ld is the width of the display region for the left eye pixel 4L or more. Further, the width of the through-hole 4Rd is the width of the display region for the right eye pixel 4R or more. The through-holes are therefore formed consecutively along the X-axis direction and are not divided into parts.

Light from the flat light source 8 incident to the lenticular lens 3 or external light such as natural light and illuminating light is refracted by each of the cylindrical lenses 3a, and splitted into mutually different directions that are orthogonal to the Y-axis direction that is the longitudinal direction of the cylindrical lens 3a. The direction of propagation of this light is inclined along the X-axis direction with respect to the optical axis plane of the cylindrical lens 3a. As a result, light emitted from the transmission region 4La and the reflective region 4Lb of the left eye pixel 4L is directed towards the region EL, and light emitted from the transmission region 4Ra and the reflective region 4Rb of the right eye pixel 4R is directed towards the region ER. When an observer then positions their left eye 52 at the region EL and positions their right eye 51 that the region ER, it is possible to observe a three-dimensional image.

The lenticular lens 3 is a set of one dimensional cylindrical lenses. The lens effect is therefore not inherent with regards to the Y-axis direction that is the longitudinal direction and the light is not split in the Y-axis direction. At the left eye pixel 4L, the transmission region 4La, the reflective region 4Lb existing at the color layer 4Lc, and the reflective region 4Lb having the through-hole 4Ld are arranged in the Y-axis direction. Similarly, the transmission region 4Ra, the reflective region 4Rb present at the color layer 4Rc, and the reflective region 4Rb having the through-hole 4Rd are also arranged in the Y-axis direction for the right eye pixel 4R. Light emitted from the left eye pixel 4L and the right eye pixel 4R is split along the X-axis direction that is the direction of arraying of the cylindrical lenses. However, light emitted from the transmission region 4La and the reflective region 4Lb of the left eye pixel 4L is mixed without being split and goes towards the same region EL, and light emitted from the transmission region 4Ra and the reflective region 4Rb of the right eye pixel 4R is mixed without being split and is directed towards the same region ER. Similarly, with the light emitted from the reflective regions 4Lb and 4Rb, light emitted from the region where the color layers 4Lc and 4Rc are present and light emitted from the region having the through-holes 4Ld and 4Rd is mixed without being split by the lenticular lens 3 and goes towards each pixel region. It is therefore possible to implement uniform reflective displaying without the influence of the through-holes not just in the Y-axis direction, but also in the X-axis direction and it is therefore possible to suppress the phenomenon where color aberrations occur due to the viewing angle and the external light conditions.

Next, an explanation is given of the effects of this embodiment. According to the display panel of this embodiment, it is possible to implement uniform reflective displaying that is not influenced by the through-holes by forming the through-holes of the color layers occurring at the reflective regions in a slit shape extending in an arraying direction of the lenticular lenses and it is possible to suppress the phenomenon of color aberrations occurring due to the viewing angle and/or external light conditions. Moreover, a through-hole region where a color layer is not formed in a reflective section is provided. It is therefore possible to suppress the problem of the color for reflective displaying being denser than for transmission displaying by displaying white at regions where the color layer is not formed and mixing light that passes through the color layer. It is therefore possible to achieve bright reflective displaying.

Regarding the semi-transmissible liquid crystal display panel of the present embodiment, the present invention can be applied if adopting a configuration where the reflective region formed with a through-hole and the transmission region are provided each pixel. The semi-transmissive type liquid crystal display panel of this embodiment is substantially not influenced by the ratio of the reflective region and the transmission region, and the ratio of the through-holes. This embodiment can also be similarly applied to fine reflective type liquid crystal display panels where the ratio of the transmission regions is large, and to fine transmission type liquid crystal display panels where the ratio of the reflective regions is large. The proportion of through-holes occurring at the reflective region, i.e. the width of the slits in the Y-axis direction can be different depending on the type of color layer.

An explanation has been given for the through-holes in this embodiment where the width in the Y-axis direction is fixed regardless of the X-axis direction coordinates. However, it is not essential for each side of a through-hole to be parallel with the X-axis. For example, it is also possible for a through-hole to have a side inclined from the X-axis direction. That is, it is sufficient for the width of the through-hole in the Y-axis direction to always be fixed.

At the boundary regions for neighboring pixels, the color layers can be continuous or discontinuous. However, it is preferable for the color layers to be continuous when the neighboring pixels have color layers of the same color. It is therefore possible to improve adhesion of the color layers and the yield at the time of manufacture can be improved. However, it is preferable for the color layers to be discontinuous when the neighboring pixels have color layers for different colors. When color layers of different colors are stacked up, undulation of the surface becomes substantial. This is because in doing so, abnormal orientation of the liquid crystal molecules occurs and displaying quality is degraded.

An explanation has been given in this embodiment of when through-holes are formed in the reflective region. However, the present invention is by no means limited in this respect and can be similarly applied to cases where the through-holes are formed the transmission region. This embodiment can be similarly applied not only to semi-transmissive type display elements but also to reflective type display elements or transmission type display elements so as to implement uniform displaying that is not influenced by the through-holes.

Moreover, in this embodiment an explanation is given where a color layer is formed on a surface contacting with a liquid crystal layer at a glass substrate positioned in the +Z direction of the semi-transmissive type liquid crystal display panel. However, the present invention is by no means limited in this respect, and the color layer can be formed at other locations. In one example, the color layer can be formed at a surface contacting with the liquid crystal layer of the glass substrate positioned in the −Z direction of the semi-transmissive type liquid crystal display panel, i.e. formed between a metal film acting as a reflective plate and a liquid crystal layer at the reflective region. In this way, when the color layer is formed on the substrate forming the reflective plate, it is possible to position the color layer and the reflective plate with a high degree of precision. It is therefore possible to enlarge the region of the display panel contributing to displaying and it is then possible to improve the reflection rate and the transmission rate.

Further, a method for driving the liquid crystal display panel can be an active matrix method such as a TFT (Thin Film Transistor) method or TFD (Thin Film Diode) method, or a passive matrix method such as an STN (Super Twisted Nematic liquid crystal) method. The display panel can be provided with a transmission region and a reflective region at each pixel but the liquid crystal display panel is by no means limited in this respect.

In this embodiment, an explanation is given of the case of a biocular three-dimensional display device provided with only the left eye pixels and the right eye pixels but the present invention is also applicable to N-ocular devices (where N is an integer greater than 2).

In this embodiment, in addition to color displaying using color filters, it is also possible to display color images using a method for lighting where light sources for a plurality of colors share time. It is therefore possible to reduce color mixing and displaying of broad color bands is also possible.

In this embodiment, an explanation is given using a lenticular lens having an optical member for image splitting. However the present invention is by no means limited in this respect, and it is also possible to use a parallax barrier where a large number of slits are arranged in an X-axis direction. Whereas a lenticular lens is three-dimensional in shape and has structure in a height direction, a parallax barrier has a planar two dimensional shape that can easily be made using photolithographic technology and lower costs are therefore possible.

In this embodiment, a mobile telephone is shown as a terminal device but the present invention is not limited in this respect. The display device of this embodiment can not only be applied to mobile telephones, but can also be applied to various portable terminal apparatus such as PDAs (Personal Digital Assistants), game equipment, digital cameras, and digital video cameras. The display device of this embodiment can also be applied not only to portable terminal devices, but also to various terminal devices such as notebook personal computers, cash dispensers, and automatic vending machines.

The above is a summary of the first embodiment of the present invention. The display panel of this embodiment comprises a plurality of display units including at least pixels for displaying a first viewpoint image and pixels for displaying a second viewpoint image arranged in the shape of a matrix, an optical member, for splitting in mutually different directions light emitted from each pixel provided along a first direction along which the pixels for displaying the first viewpoint image and the pixels for displaying the second viewpoint image are arranged, within the display unit; color filter layers each provided at at least the display region of each pixel; and a through-hole provided at the color filter layer of each pixel. The width of the through-hole in the first direction is the width of the display region or more. In the present invention, it is possible to reduce the influence of the through-holes and it is possible to reduce the phenomenon of color aberrations occurring due to the viewing angle and/or the light source conditions.

It is also preferable for the width of the through-holes in the second direction orthogonal to the first direction at the display surface of the display panel to be fixed regardless of the first direction. As a result, it is possible to completely eliminate the influence of the through-holes and it is possible to reduce the phenomenon of color aberrations occurring due to the viewing angle and/or the light source conditions.

The display panel can also be a semi-transmissive type display panel having transmission regions and reflective regions at the display region, with the through-holes being provided at the reflective regions. It is therefore possible to implement uniform reflective displaying that is not influenced by the through-holes and it is possible to suppress the phenomenon of color aberrations occurring due to the viewing angle and the external light conditions.

It is also possible for the optical member to be a lenticular lens where a plurality of cylindrical lenses provided every row of the display unit extending in a second direction that is the longitudinal direction are arranged in the first direction. There is therefore no loss of light and bright displaying is possible.

It is also possible for the display device equipped with the display panel of the present invention to display three-dimensional images where the first direction is a horizontal direction of the screen, the first viewpoint image is the left eye image, and the second viewpoint image is a right eye image having a parallax with respect to the left eye image. It is therefore possible to implement superior three-dimensional displaying.

Figure 7:
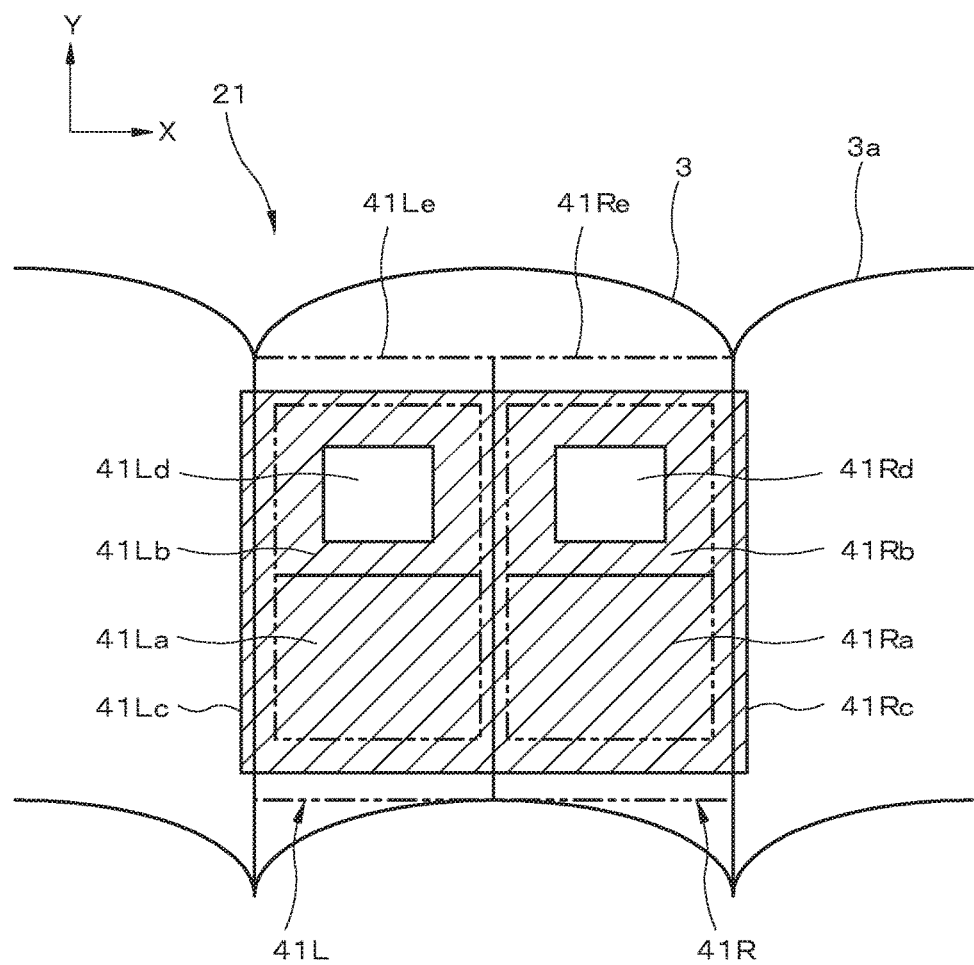
FIG. 7 A plan view showing a display panel of a first comparative example of the present invention.
Figure 8:
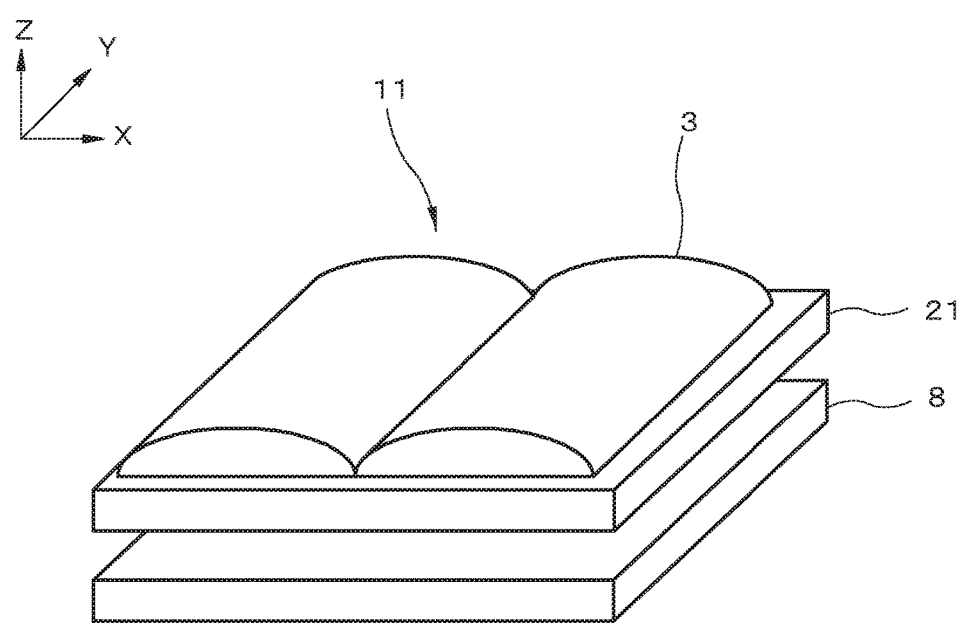
FIG. 8 A perspective view showing a display device of the first comparative example.
Figure 9:
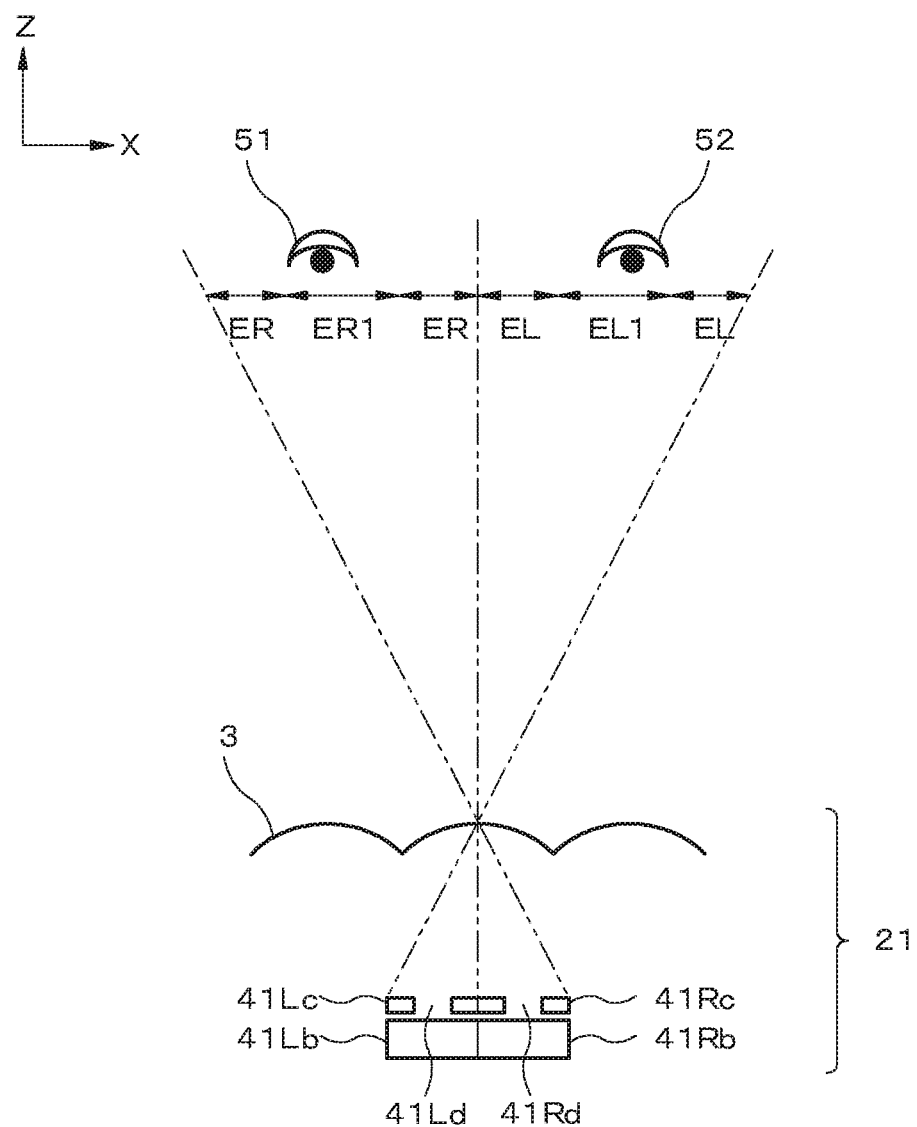
FIG. 9 A diagram showing an optical model in cross-section taken along a reflective region including a through-hole at a line segment parallel with the X-axis direction for the semi-transmissive type liquid crystal display panel of the first comparative example.

Next, an explanation is given of a first comparative example for the semi-transmissive type liquid crystal display panel of the present invention. FIG. 7 is a plan view showing a display panel of the first comparative example. FIG. 8 is a perspective view showing the display device of the first comparative example. FIG. 9 is a view showing an optical model in cross-section cut along a reflective region including a through-hole along a line segment parallel with the X-axis direction at the semi-transmissive type liquid crystal display panel shown in FIG. 8. The first comparative example differs from the first embodiment of the present invention described above in that the first comparative example shows the case where a through-hole that resembles the shape of the reflective region and is smaller than the reflective region is provided at a central part of the reflective region.

As shown in FIG. 7 and FIG. 8, at a semi-transmissive type liquid crystal display panel 21 of a three-dimensional image display device 11 shown in the first comparative example, the point of using a left eye pixel 41L and a right eye pixel 41R is different compared to the semi-transmissive type liquid crystal display panel 2 of the first embodiment. That is, at the left eye pixel 41L, a transmission region 41La, a reflective region 41Lb, and a light shielding region 41Le are installed in the same way as is for the first embodiment but the shape of a through-hole 41Ld provided at a color layer 41Lc is different. In the first comparative example, the shape of the through-hole 41Ld resembles the shape of the reflective region 41Lb at a central part of the reflective region 41Lb and is formed so as to be smaller than the reflective region. The width of the through-hole 41Ld in the X-axis direction is formed so as to be half of the width of the reflective region 41Lb in the X-axis direction, and the width in the Y-axis direction is formed so as to be half of the width of the reflective region 41Lb in the Y-axis direction.

It is also possible for the shape of a through-hole 41Rd to be the same shape as the left eye pixel 41L at the right eye pixel 41R. The configuration of this comparative example other than that described above is the same as for the first embodiment.

Next, an explanation is given of the operation of the display device of the first comparative example configured as described above. As shown in FIG. 9, at the reflective regions 41Lb and 41Rb of the first comparative example, when external light from the front, which is transmitted through the lenticular lens 3 and incident to the semi-transmissive type liquid crystal display panel 21, is incident to the reflective regions 41Lb and 41Rb present at the color layers 41Lc and 41Rc, the light is transmitted through the color layers 41Lc and 41Rc of the semi-transmissive type liquid crystal display panel 21. Next, the light is transmitted through the liquid crystal layer and is reflected by the film. The light is then again transmitted through the liquid crystal layer, is again transmitted through the color layers 41Lc and 41Rc, and is incident to the lenticular lens 3. That is, external light incident to the reflective regions 41Lb and 41Rb where the color layers 41Lc and 41Rc exist is transmitted through the color layers 41Lc and 41Rc two times.

On the other hand, the external light incident to the through-hole regions 41Ld and 41Rd at the reflective regions 41Lb and 41Rb where the color layers 41Lc and 41Rc do not exist is transmitted through the liquid crystal layer of the semi-transmissive type liquid crystal display panel 21. The light is then reflected by the metal layer and again transmitted through the liquid crystal. The light is then incident to the lenticular lens. That is, external light incident to the through-holes 41Ld and 41Rd is basically not transmitted through the color layers 41Lc and 41Rc.

In this comparative example, in the X-axis direction where the lenticular lens 3 has a lens effect, regions where the through-holes 41Ld and 41Rd are formed and regions where the through-holes 41Ld and 41Rd are not formed are repeatedly arranged. A result, when external light is transmitted through the through-holes 41Ld and 41Rd, the external light transmitted through the color layers 41Lc and 41Rc is separated along an X-axis direction that is the direction of arraying of the cylindrical lenses. This is to say that light transmitted through the through-hole 41Ld goes towards the region EL1 and light transmitted through the through-hole 41Rd goes towards the region ER1.

As described above, the light transmitted through the through-holes is white light. The regions EL1 or ER1 are a color closer to white compared to the other regions EL or ER. At the regions EL1 or ER1, the quantity of external light that is absorbed by the color layers 41Lc and 41Rc is small compared to the regions EL and ER and displaying of a high reflectance therefore takes place. As a result, when the observer positions their left eye 52 at the region EL1 and positions their right eye 51 at the region ER1, the observer views a display that is bright but is low in color purity. On the other hand, when an observer positions their left eye 52 at the region EL and positions their right eye 51 at the region ER, the observer views a display where the color density is dark. This phenomenon changes depending on the external light characteristics and is particularly noticeable when parallel light such as sunshine is incident.

When nonuniform through-holes are formed in the lens arraying direction, the quality of reflective displaying is substantially degraded due to the influence of the through-holes and color aberrations occur due to the viewing angle, i.e. the viewing angle and/or the external light conditions.

Figure 10:
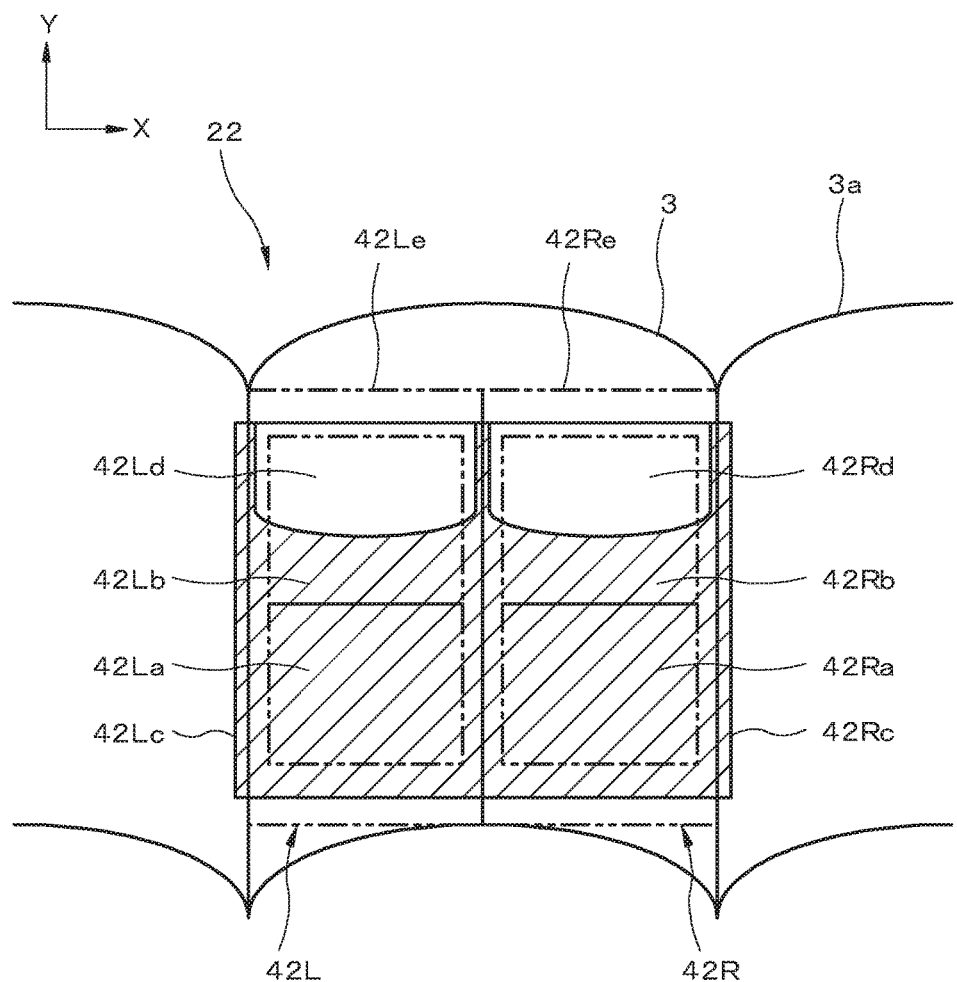
FIG. 10 A plan view showing a display panel of a second embodiment of the present invention.
Figure 11:
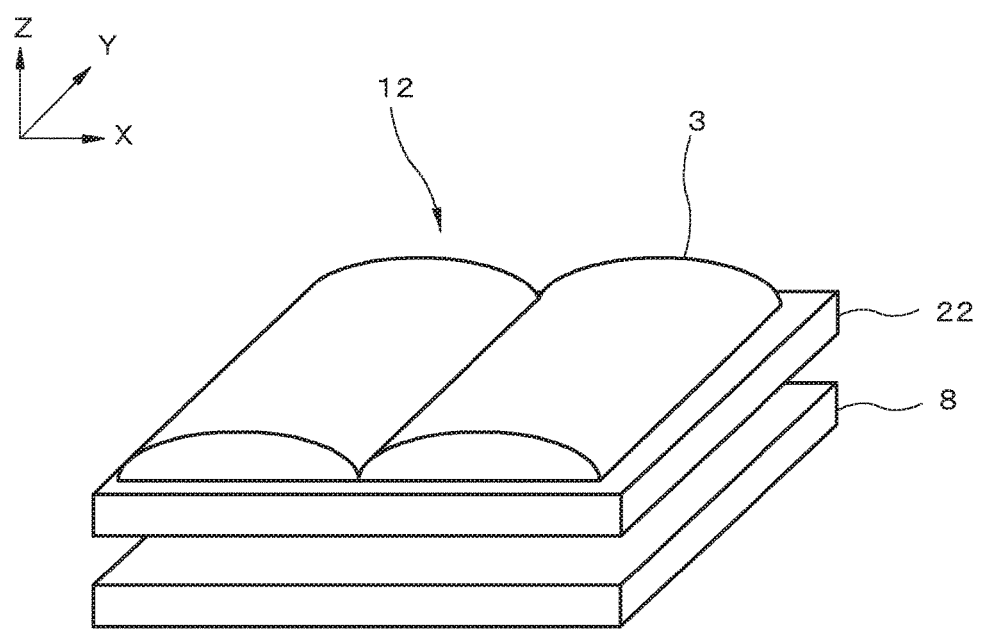
FIG. 11 A perspective view showing a display device of this embodiment.

Next, an explanation is given of a second embodiment of the present invention. FIG. 10 is a plan view showing a display panel of this embodiment. FIG. 11 is a perspective view showing a display device of this embodiment. As shown in FIGS. 10 and 11, a semi-transmissive type liquid crystal display panel 22 and a three-dimensional image display device 12 of the second embodiment differ from the semi-transmissive type liquid crystal display panel 2 and three-dimensional image display device 1 of the first embodiment in that a left eye pixel 42L and a right eye pixel 42R are used.

That is, at the left eye pixel 42L, a transmission region 42La, a reflective region 42Lb, and a light shielding region 42Le are installed in the same way as for the first embodiment but the shape of a through-hole 42Ld provided at a color layer 42Lc is different. In the first embodiment, the through-hole 42Ld is slit-shaped and the width of the opening of the through-hole in the Y-axis direction is fixed regardless of the coordinates in the X-axis direction. With regards to this, the shape of the through-hole 42Ld in the second embodiment is similarly slit-shaped but the width of the opening in the Y-axis direction differs depending on the coordinates in the X-axis direction. In one example, the width of the opening is a maximum at a central section in the X-axis direction of the left eye pixel 42L, with the opening width set so as to gradually become smaller towards an end of the left eye pixel 42L.

It is also possible for the shape of a through-hole 42Rd to be the same shape as the left eye pixel 42L at a right eye pixel 42R. The configuration of this comparative example other than that described above is the same as for the first embodiment.

In this embodiment, the through-holes are formed in the shape of slits. The width of the through-holes in the Y-axis direction is a maximum at central parts of each of the left eye pixels and the right eye pixels in an X-axis direction. As a result, regarding changes in color that occur due to the position in the X-axis direction, the width of the through-holes also changes gradually. The changes in color are therefore also gradual and the extent of discomfort felt by the observer is therefore reduced. This is because the lenticular lens has the effect of enlarging the pixels. That is, pixels are enlarged by the lenticular lens. Partial discoloration caused by differences in the heights of the openings of the through-holes, i.e. differences in width in the Y-axis direction therefore depend on the viewing angle in the X-axis direction. In other words, discoloration does not occur at the display surface, but the color changes when the angle of viewing the display changes. In this embodiment, the width of the through-holes in the Y-axis direction changes gradually depending on the position in the X-axis direction. This means that changes in color depending on the viewing angle also take place gradually. It is therefore difficult for the observer to recognize changes in color depending on the viewing angle. It is therefore possible to reduce the influence of the through-holes by ensuring that the width of the through-holes in the Y-axis direction orthogonal to the X-axis direction that is the lens splitting direction changes gradually depending on the position in the X-axis direction. The reflectance is also highest at central portions of the pixels. This means that bright reflective displaying is possible.

Further, in this embodiment, the through-holes for each pixel are formed so as to be symmetrical about the Y-axis. For example, at the left eye pixel 42L, the width of the through-hole in the Y-axis direction is a maximum at the central portion in the X-axis direction. When an axis of symmetry that is parallel with the Y-axis is arranged at a central portion in the X-axis direction, the shape of the through-hole is line-symmetrical with respect to the axis of symmetry. The same also applies for the right eye pixel 42R. As a result of the separating working of the lenses, a central part in the X-axis direction of the left eye pixel is viewed by the left eye during normal biocular viewing. Similarly, a central portion of the right eye pixel in the X-axis direction is viewed by the right eye. As a result of the configuration of this embodiment, it is possible for the color of the image viewed by the left eye and for the color of the image viewed by the right eye to be the same extent. Reduction of discomfort and high picture quality is therefore possible. The shape of the through-holes for the left and right pixels are the same. When moved away from this best position, the colors of the images viewed by the left and right eyes similarly change. It is therefore possible to make the color of images viewed by the left eye and the color of images viewed by the right the same extent even at positions other than the best position for biocular viewing. It is therefore possible to reduce discomfort and achieve high picture quality.

Taking note of the regions neighboring the left eye pixel and the right eye pixel, the widths of the through-holes in the Y-axis direction are formed to be substantially the same. The width of the through-holes in the Y-axis direction has a maximum value and a minimum value and changes gradually. This means that it is possible to suppress abrupt changes in color even when the angle of viewing the display changes and it is possible to reduce discomfort. The operation and effects of the second embodiment other than those described above are the same as for the first embodiment.

Figure 12:
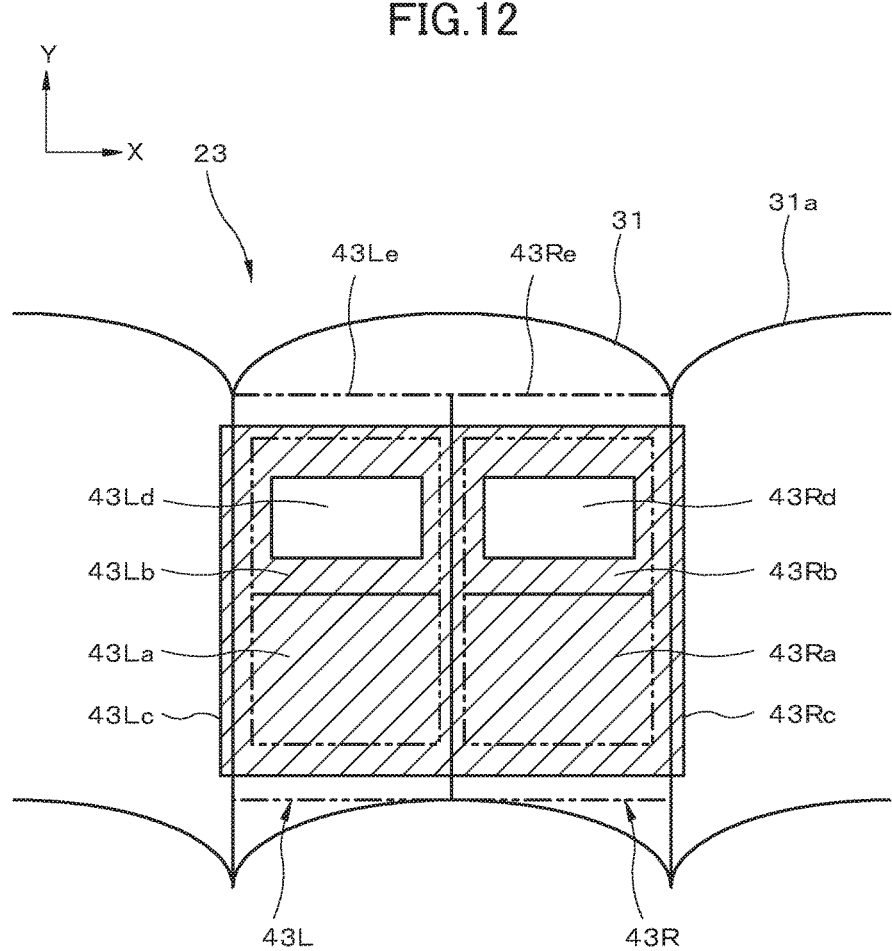
FIG. 12 A plan view showing a display panel of a third embodiment of the present invention.
Figure 13:
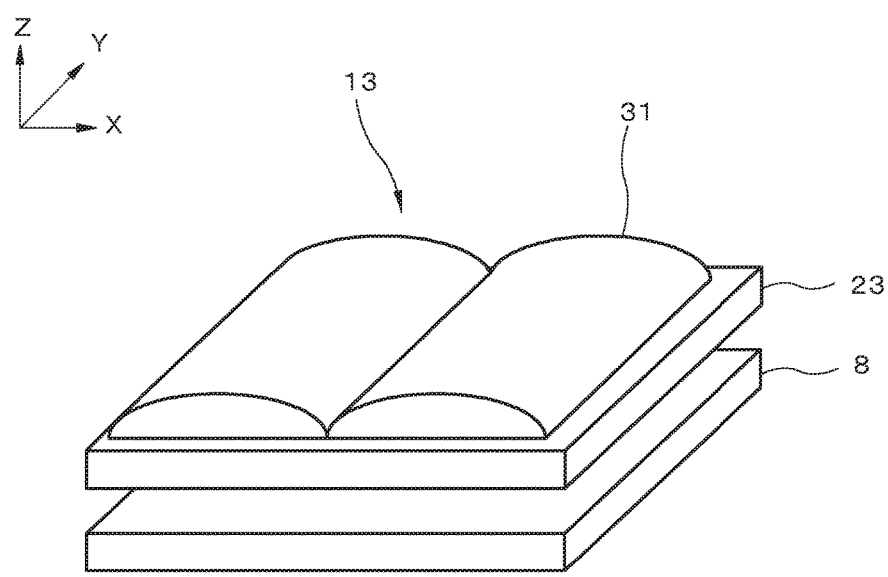
FIG. 13 A perspective view showing a display device of this embodiment.
Figure 14:
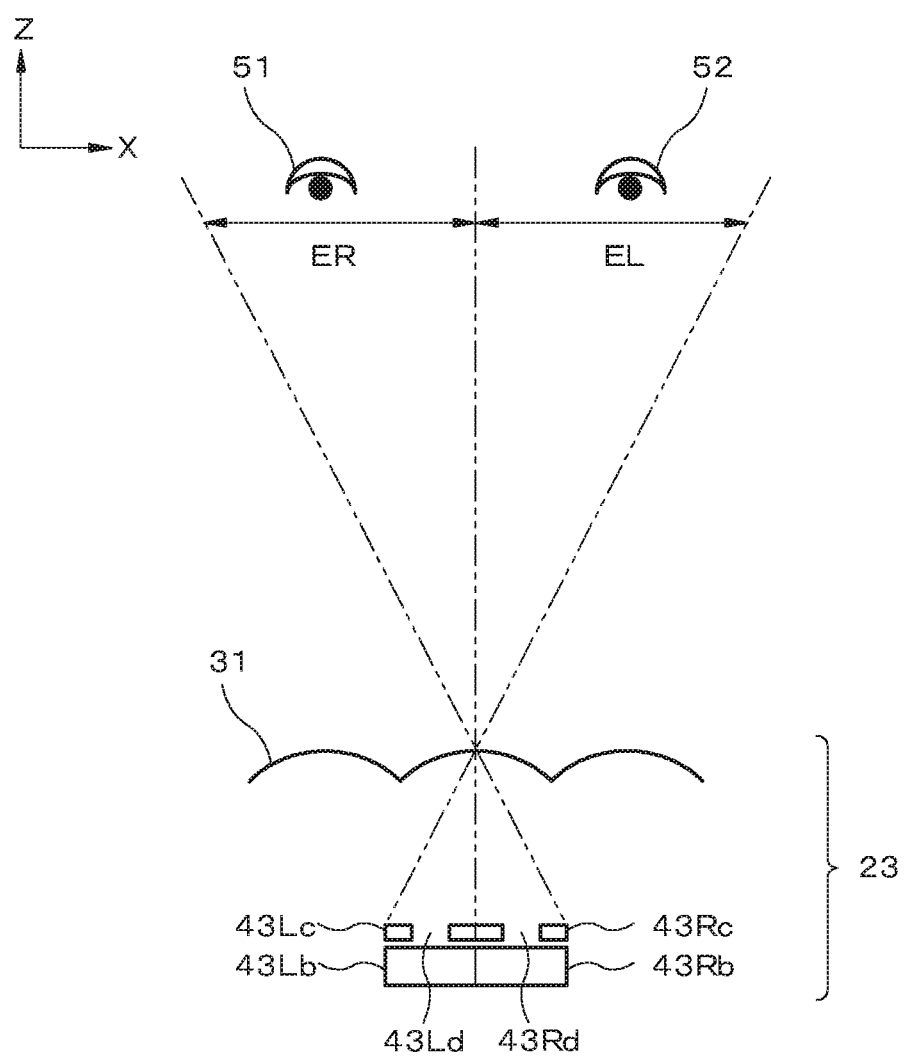
FIG. 14 A diagram showing an optical model in cross-section taken along a reflective region including a through-hole at a line segment parallel with the X-axis direction for the semi-transmissive type liquid crystal display panel of this embodiment.
Figure 15:
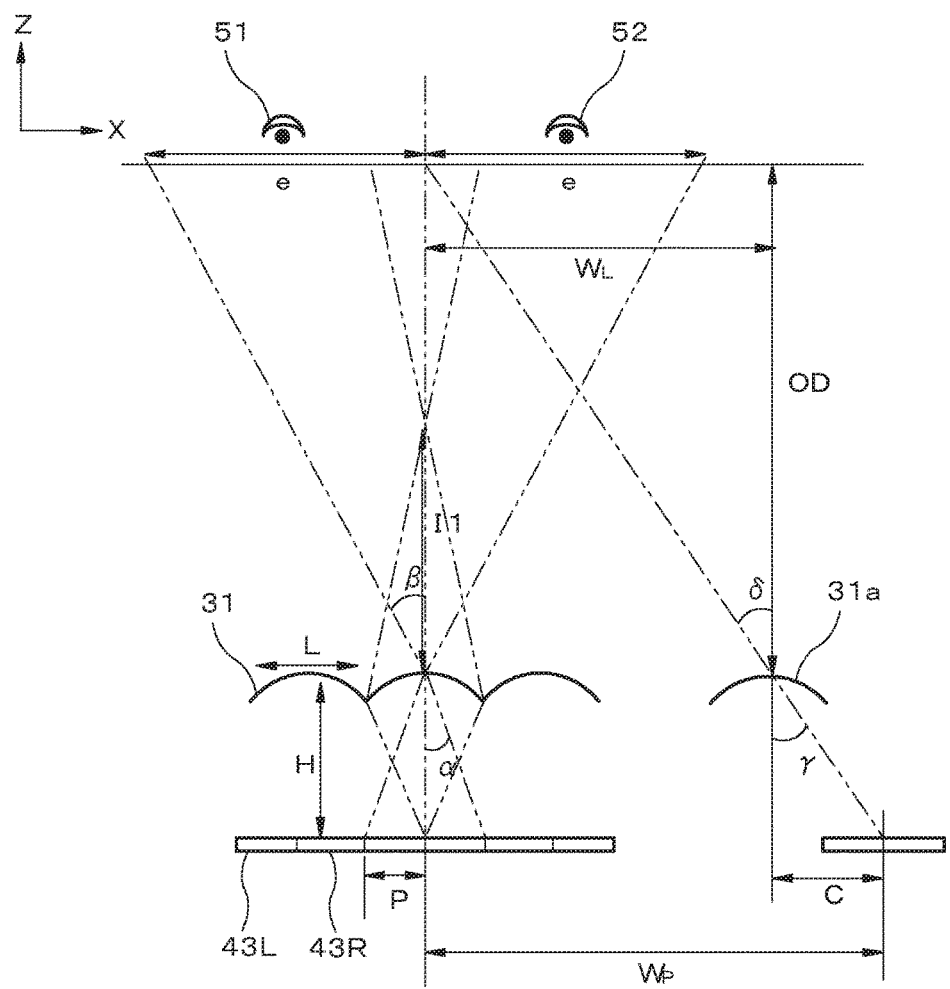
FIG. 15 A diagram showing an optical model for the case of using a lens of a focal length smaller than a distance between lens pixels in a semi-transmissive type liquid crystal display panel of this embodiment.

Next, a description is given of a third embodiment of the present invention. FIG. 12 is a plan view showing a display panel of this embodiment. FIG. 13 is a perspective view showing a display device of this embodiment. FIG. 14 is a diagram showing an optical model in cross-section cut along a reflective region including a through-hole at a line segment parallel to the X-axis direction in the semi-transmissive type liquid crystal display panel shown in FIG. 13, and FIG. 15 is a view showing an optical model for the case of using a lens of a focal length shorter than the distance between the lens pixels. As shown in FIGS. 12 and 13, a semi-transmissive type liquid crystal display panel 23 and a three-dimensional image display device 13 of the third embodiment differ from the semi-transmissive type liquid crystal display panel 2 and three-dimensional image display device 1 of the first embodiment in that a left eye pixel 43L, a right eye pixel 43R, and a lenticular lens 31 are used.

At the left eye pixel 43L, a transmission region 43La, a reflective region 43Lb, and a light shielding region 43Le are provided as in the first embodiment, but the shape of a through-hole 43Ld provided at a color layer 43Lc is different. The through-hole 43Ld of this embodiment resembles the shape of the reflective region at the central portion of the reflective region 43Lb and is smaller than the reflective region. In particular, the width of the through-hole 43Ld in the X-axis direction is smaller than the width of the reflective region 43Lb for the pixel, with a width in the X-axis direction of the through-hole 43Ld being set to half of the pixel pitch or more, and in this example being set to 80%. In this embodiment, a description is given of the case where the width of the through-hole 43Ld in the X-axis direction is 50 percent or more of the pixel pitch. It is also possible for the shape of a through-hole 43Rd to be the same shape as the left eye pixel 43L for the right eye pixel 43R also. As shown in FIG. 14, the through-hole 43Ld and a through-hole 43Rd are divided with respect to the X-axis direction by a color layer 43Lc and a color layer 44Rc.

At the lenticular lens 31, the radius of curvature is small compared to the lenticular lens 3 of the first embodiment of the present invention, i.e. there is a difference in that a cylindrical lens 31a of a short focal length is used. The configuration of this embodiment other than that described above is the same as for the first embodiment.

Next, an explanation is given of the operation of the display device of the third embodiment configured as described above. As shown in FIG. 14, at the reflective regions 43Lb and 43Rb of the third embodiment, when the external light from the front that is transmitted through the lenticular lens 31 so as to be incident to the semi-transmissive type liquid crystal display panel 23 is incident to the reflective regions 43Lb and 43Rb present at the color layers 43Lc and 43Rc, the light is transmitted through the color layers 43Lc and 43Rc of the semi-transmissive type liquid crystal display panel 23. The light is then transmitted through the liquid crystal layer, is reflected by the metal film, and is again transmitted through the liquid crystal layer. The light is then again transmitted through the color layers 43Lc and 43Rc so as to be incident to the lenticular lens 31. That is, external light incident to the reflective regions 43Lb and 43Rb where the color layers 43Lc and 43Rc exist is transmitted through the color layers 43Lc and 43Rc two times.

On the other hand, the external light incident to the through-hole regions 43Ld and 43Rd at the reflective regions 43Lb and 43Rb where the color layers 43Lc and 43Rc do not exist is transmitted through the liquid crystal layer of the semi-transmissive type liquid crystal display panel 23. The light is then reflected by the metal layer and again transmitted through the liquid crystal. The light is then incident to the lenticular lens 31. That is, external light incident to the through-holes 43Ld and 43Rd is basically not transmitted through the color layers 43Lc and 43Rc.

In the third embodiment, in the X-axis direction where the lenticular lens 31 has a lens effect, regions where the through-holes 43Ld and 43Rd are formed and regions where the through-holes 43Ld and 43Rd are not formed are repeatedly arranged. A result, when external light is transmitted through the through-holes 43Ld and 43Rd, the external light transmitted through the color layers 43Lc and 43Rc is separated along an X-axis direction that is the direction of arraying of the cylindrical lenses.

However, the radius of curvature of the lenticular lens 31 is set to be small compared to the first embodiment of the present invention. The image formation effect in an observation plane is therefore weak and the image for the pixels therefore becomes gradated. It is therefore possible to make separation of colors in the X-axis direction weak and it is possible to reduce dependency on the viewing angle of the colors.

The following is a quantitative explanation of the radius of curvature of the lenticular lens 31 in this embodiment using FIGS. 14 and 15. A main point of the lenticular lens 31, i.e. a distance between an apex and a pixel is taken to be H, the reflective index of the lenticular lens 31 is taken to be n, and the lens pitch is taken to be L. The pitch of each one left eye pixel 43L and right eye pixel 43R is taken to be P. At this time, the arrangement pitch of display pixels each comprised of one left eye pixel 43L and one right eye pixel 43R is 2P. A distance between the lenticular lens 31 and the observer is taken to be an optimum observation distance OD, and a interval for an enlarged projected image of the pixels occurring at this distance OD, i.e. a interval for a width of a projected image for the left eye pixel 43L and the right eye pixel 43R in a virtual plane parallel with the lens and the distance OD away from the lens is taken to be e. A distance from the center of the cylindrical lens 31a positioned at the center of the lenticular lens 31 to the center of the cylindrical lens 31a positioned at the end of the lenticular lens 31 in the X-axis direction is taken to be WL, and a distance from the center of the display pixel constituted by the left eye pixel 43L and the right eye pixel 43R positioned at the center of the semi-transmissive type liquid crystal display panel 23 and the center of the display pixel positioned at the end of the semi-transmissive type liquid crystal display panel 23 in the X-axis direction is taken to be WP. The angle of incidence and the exit angle of light at the cylindrical lens 31a positioned at the center of the lenticular lens 31 are taken to be α and β, and the angle of incidence and the exit angle of light at the cylindrical lens 31a positioned at the end of the lenticular lens 31 in the X-axis direction are taken to be γ and δ. The difference between the distance WL and the distance WP is taken to be C, and the number of pixels contained in a region of distance WP is taken to be 2 m. In FIG. 15, the case is depicted where the width of the projected image for the left eye pixel 43L and the right eye pixel 43R where there is little lens gradation is e. However, because the width of the projected image for each of the pixels becomes larger as the amount of gradation becomes larger, overlapping of the projected images on both sides also becomes larger and the interval e therefore remains as is. Also in the fourth to ninth embodiments described after this embodiment, the width of the projected image in the drawings is shown in the drawings so as to the seen to be the same as the interval, and in the drawings the width of the projected image is read out as e and the interval for the width of the projected images is always e. The pitch L of the arrangement of the cylindrical lenses 31a and the pitch P of the arrangement of the pixels are mutually related in such a manner that one decides the other. Normally, cases where the lenticular lens is designed in line with the display panel are common and the arraying pitch P of the pixels is handled as a constant. A refractive index n is decided by selecting the material for the lenticular lens 31a. With regards to this, the observation distance OD between the lens and the observer and the interval of the enlarged projected image for the pixels at the observation distance OD is set to a desired value. A distance H between a vertex of a lens and a pixel and a lens pitch L are decided using these values. The following equations 1 to 6 are established using Snell's law and geometrical relationships. The following equations 7 to 9 are then established.

$n \times \sin \alpha = \sin \beta$ [Equation 1]

$OD \times \tan \beta = e$ [Equation 2]

$H \times \tan \alpha = P$ [Equation 3]

$n \times \sin \gamma = \sin \delta$ [Equation 4]

$H \times \tan \gamma = C$ [Equation 5]

$OD \times \tan \delta = WL$ [Equation 6]

$WP - WL = C$ [Equation 7]

$WP = 2 \times m \times P$ [Equation 8]

$WL = m \times L$ [Equation 9]

In the first embodiment of the present invention, a distance H between a vertex of a lenticular lens and a pixel is set to be equal to a focal length f off a lenticular lens. The following equation 10 is therefore established, and when the radius of curvature of the lens is taken to be r, the radius of curvature r can be a obtained from the following equation 11.

$f = H$ [Equation 10]

$r = H \times (n-1)/n$ [Equation 11]

The lateral magnification of the lenticular lens can be considered to be the interval for the enlarged projected image for the pixels divided by the pixel interval, i.e. divided by the pixel pitch and is therefore e/P.

When the width of the opening in the X-axis direction of the through-holes 43Ld and 43Rd is defined as t times the pixel pitch, in this embodiment, the following equation 12 is established.

$0.5 \leq t < 1$ [Equation 12]

When defined as described above, the width of the enlarged image occurring at the observation plane of the through-hole becomes t×e. The width of the enlarged image for this through-hole is then subtracted from the interval for the enlarged projected image for the pixels and is then divided in half in order to reduce the influence of the through-holes in the observation plane. That is, it is preferable for the images for the pixels to only be gradated by $(1-t) \times e/2$.

As shown in FIG. 15, when the radius of curvature of the lenticular lens is set to be smaller than the value of equation 17, and the image point for the lenticular lens is set more to the +Z side than the lens. When a distance from the main point of the lenticular lens to the image point is taken to be I1, the following equation 13 is established using an analogous relationship.

$I1 = OD \times L/((1-t) \times e + L)$ [Equation 13]

The following equation 14 is also established using an invariant of Abbe.

$n/I1 - 1/OD = (n-1)/r1$ [Equation 14]

Here, r1 is the radius of curvature of the lenticular lens when the image for the pixels is gradated. When r1 is obtained by substituting equation 13 into equation 14, the following equation 15 can be obtained.

$r1 = OD \times (n-1) \times L/(n \times (1-t) \times e + (n-1) \times L)$ [Equation 15]

This radius of curvature r1 is a value for implementing the minimum gradation and corresponds to a maximum value for the radius of curvature. The radius of curvature r1 is therefore preferably set to the range established for equation 16 in the following.

$r1 \leq OD \times (n-1) \times L/(n \times (1-t) \times e + (n-1) \times L)$ [Equation 16]

In this embodiment, the through-holes are formed in the shape of a rectangular opening. It is then possible to reduce the influence of through-holes and suppress color aberrations by setting the radius of curvature so that the focal length of the lenticular lens is smaller than the distance between lens pixels.

The equation 16 merely defines the upper limit for the radius of curvature. The separation working of the lens also falls as the radius of curvature becomes smaller. That is, the lower limit of the radius of curvature is a value for where the separation working of the lens is exerted. In other words, a minimum value for the radius of curvature should be determined so that the lenticular lens splits light emitted from each of the pixels in a direction where the pixels that display the first viewpoint image and the pixels that display the second viewpoint image are arranged.

Figure 16:
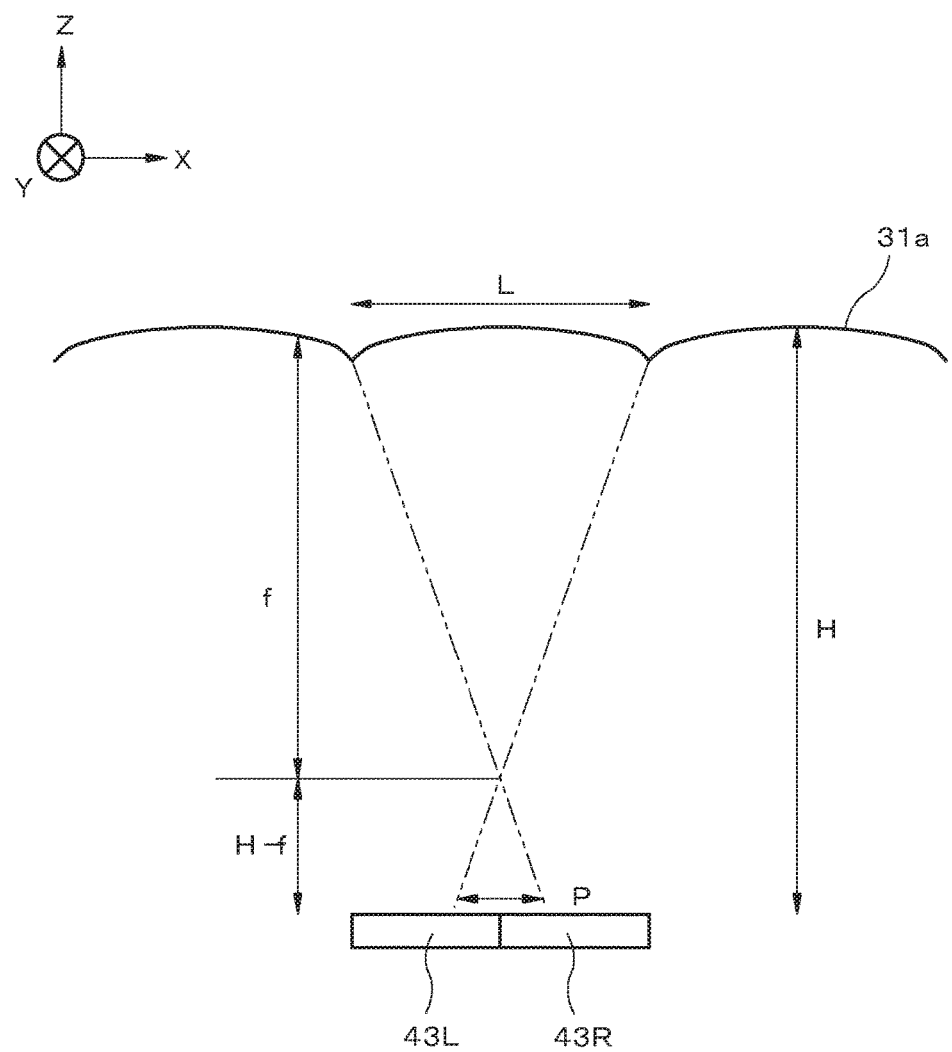
FIG. 16 A cross-sectional view for calculating the focal length of the cylindrical lens constituting the lenticular lens in this embodiment.

First, a minimum value for the focal length range where the lens separation working is exerted is calculated. As shown in FIG. 16, in order for the separation working to be exerted, it is preferable to establish an analogous relationship at a triangle taking the lens pitch L as a base and taking the focal length f as a height and at a triangle taking the pixel pitch P as a base and taking H-f as a height. It is then possible for a minimum value for the focal length to be obtained from H×L/(L+P).

Next, the radius of curvature is calculated from the focal length. Using equation 11, it is possible to obtain a minimum value for the radius of curvature from H×L×(n−1)/(L+P)/n. That is, it is preferable for the radius of curvature to satisfy the equation 16 so as to be this value or more.

In this embodiment, a description is given of a biocular three-dimensional image display device having left eye pixels and right eye pixels but the present invention is by no means limited in this respect. For example, it is also possible to similarly apply the present invention to N viewpoint (where N is a natural number) method display devices. In this event, for the definition of the distance WP, it is preferable to change the number of pixels included in a region for the distance WP from 2 m to N×m.

Figure 17:
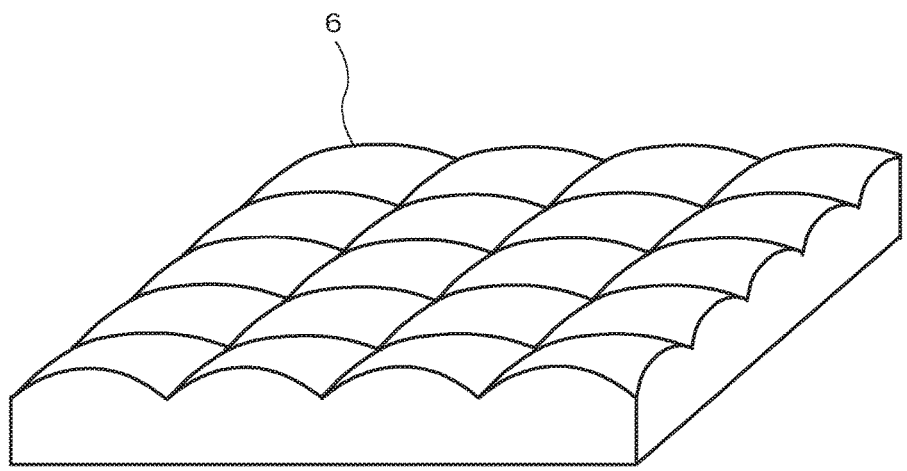
FIG. 17 A perspective view showing a fly-eye-lens.

An explanation has been given in this embodiment using a lenticular lens but as shown in FIG. 17, it is also possible for the lens element to consist of fly-eye-lenses 6 arranged two-dimensionally. This optical member has an effect of splitting, also in a second direction orthogonal to the first direction within a display plane of the display panel, light emitted from each pixel. As a result, it is possible to view images for different viewpoints not only in the first direction but also in the second direction.

In this embodiment, an explanation is given where the through-holes are formed in the shape of a rectangular opening. However, the present invention is by no means limited in this respect. For example, the through-holes can also be circular, ellipsoidal, or polygonal. The number of acute angles for such shapes is small compared to a rectangle and manufacture is therefore straightforward. If the through-holes are formed discontinuously in the X-axis direction that is the direction of splitting of the optical elements such as the lenses, the present invention can be similarly applied.

The following is a summary of the above third embodiment of the present invention. The display panel of this embodiment comprises a plurality of display units including at least pixels for displaying a first viewpoint image and pixels for displaying a second viewpoint image arranged in the shape of a matrix, an optical member, for splitting in mutually different directions light emitted from each pixel within the display unit provided along a first direction along which the pixels for displaying the first viewpoint image and the pixels for displaying the second viewpoint image are arranged, color filter layers each provided at at least the display region of each pixel, and a through-hole provided at the color filter of each pixel. The through-hole forms the shape divided by the first direction, and the optical member does not have an image forming relationship with the pixels. In the present invention, it is then possible to reduce the influence of the through-holes and suppress color aberrations by displaying the through-hole images in a gradated manner. The displaying quality can therefore be improved because the degree of freedom of arrangement of the through-holes can be improved compared to that of the first embodiment. The operation and effects of the third embodiment other than those described above are the same as for the first embodiment.

Figure 18:
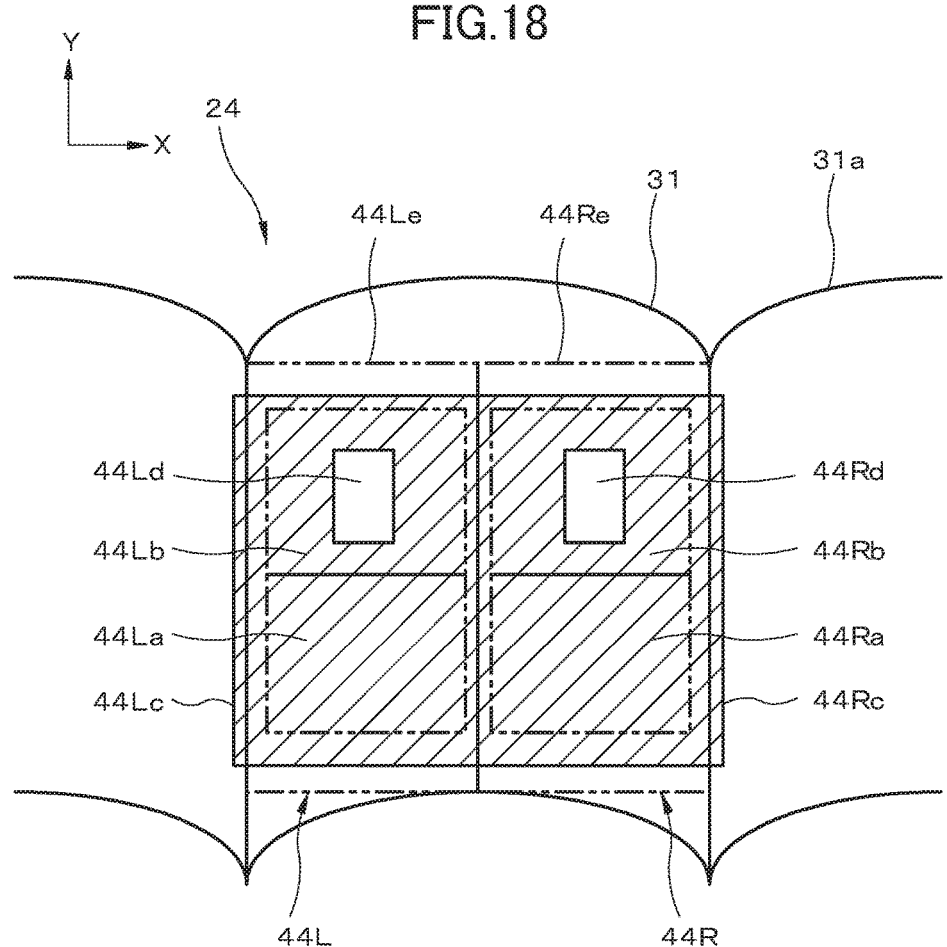
FIG. 18 A plan view showing a display panel of a fourth embodiment of the present invention.
Figure 19:
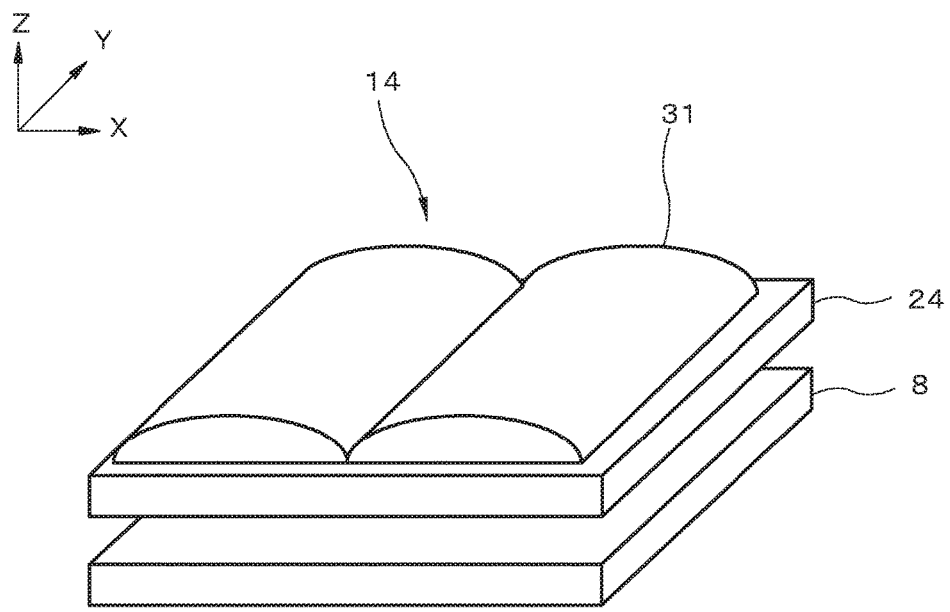
FIG. 19 A perspective view showing a display device of this embodiment.
Figure 20:
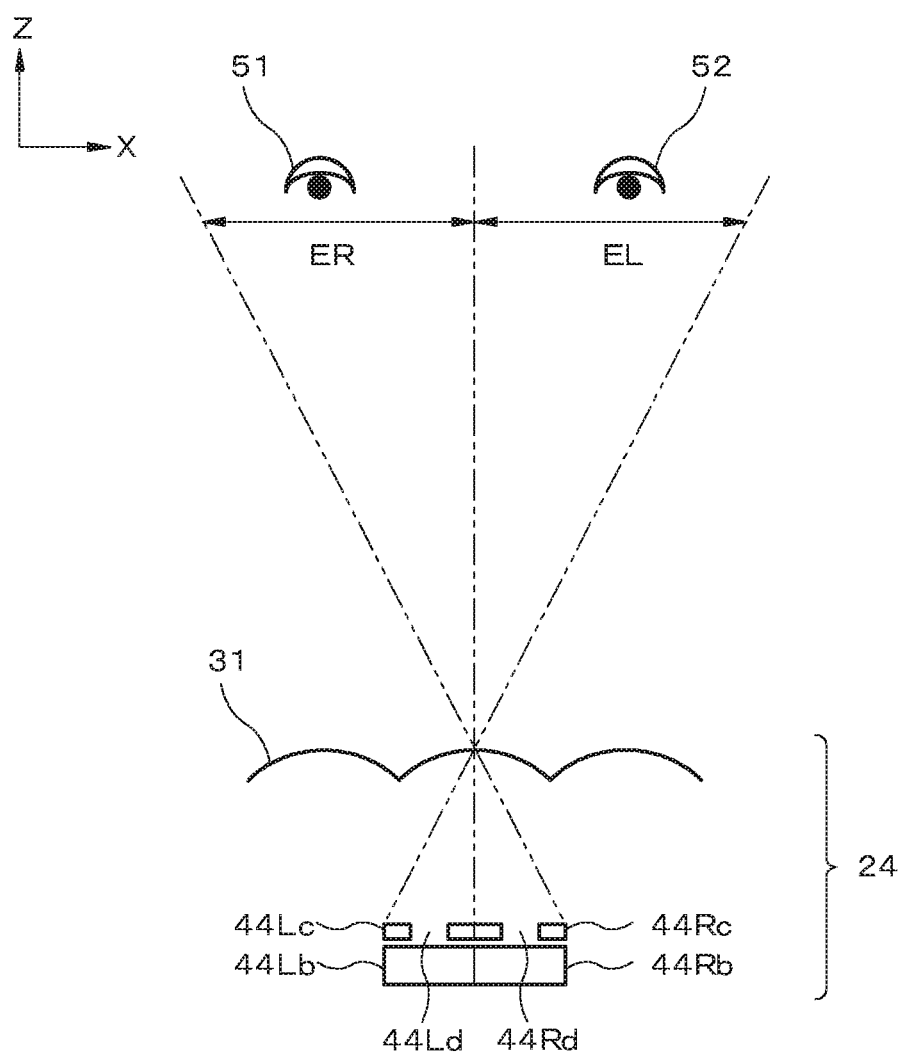
FIG. 20 A diagram showing an optical model in cross-section taken along a reflective region including a through-hole at a line segment parallel with the X-axis direction for the semi-transmissive type liquid crystal display panel of this embodiment.

Next, a description is given of a fourth embodiment of the present invention. FIG. 18 is a plan view showing a display panel of this embodiment. FIG. 19 is a perspective view showing a display device of this embodiment. FIG. 20 is a diagram showing an optical model in cross-section cut along a reflective region including a through-hole at a line segment parallel to the X-axis direction in the semi-transmissive type liquid crystal display panel shown in FIG. 19. As shown in FIGS. 18 and 19, a semi-transmissive type liquid crystal display panel 24 and a three-dimensional image display device 14 of the fourth embodiment differ from the semi-transmissive type liquid crystal display panel 23 and the three-dimensional image display device 13 of the third embodiment in using a left eye pixel 44L and a right eye pixel 44R.

At the left eye pixel 44L, the shape of a through-hole 44Ld provided at a color layer 44Lc differs from that of the third embodiment in being a shape resembling the shape of the reflective region at the central part of a reflective region 44Lb and in being smaller than the reflective region. In particular, the width of the through-hole 43Ld in the X-axis direction is smaller than the width of the reflective region 43Lb of the pixel, whereas the width of the through-hole 44Ld in the X-axis direction is half or less than the pixel pitch, and, in one example, is set to 30 percent. In this embodiment, a description is given of, in particular, the case where the width of the through-hole 44Ld in the X-axis direction is 50 percent or less than the pixel pitch. As shown in FIG. 20, the through-hole 44Ld and a through-hole 44Rd are divided with respect to the X-axis direction by a color layer 44Lc and a hue 44Rc.

It is also possible for the shape of the through-hole 44Rd to be the same shape as the left eye pixel 44L at the right eye pixel 44R. The configuration of this embodiment other than that described above is the same as for the third embodiment.

This embodiment is the same as the third embodiment of the present invention with regards to the point that the radius of curvature of the lenticular lens 31 is set to be small, the image forming effect at the observation playing is weak, and the effect of gradation of the image for the pixels is utilized. However, the amount of gradation of the image for the pixels is different because the width of the opening in the X-axis direction of the through-holes 44Ld and 44Rd is set to be half or less of the pixel pitch. In this embodiment, the following equation 17 is applied in place of equation 12 described above.

$$0<t\leq 0.5 \quad\quad\quad \text{[Equation 17]}$$

When defined as described above, as shown in FIG. 20, the width of the enlarged image occurring at the observation plane of the through-hole becomes t×e. It is then preferable for the image for the pixels to be gradated by a value that is the width of the enlarged image for this through-hole divided in half, i.e. divided by t×e/2, in order to reduce the influence of the through-holes at the observation plane. In the following, as with the third embodiment, the radius of curvature r2 of the lenses is calculated preferably so as to be set at a range established by the following equation 18.

$$r2 \leq OD \times (n-1) \times L / (n \times t \times e + (n-1) \times L) \quad\quad\quad \text{[Equation 18]}$$

This embodiment is preferably applied to the case where the through-holes are formed in the shape of a rectangular opening and the width of the opening in the X-axis direction is small. It is therefore possible to reduce the amount of gradation and implement a broad stereoscopic band. The operation and effects of the fourth embodiment other than those described above are the same as for the third embodiment.

Figure 21:
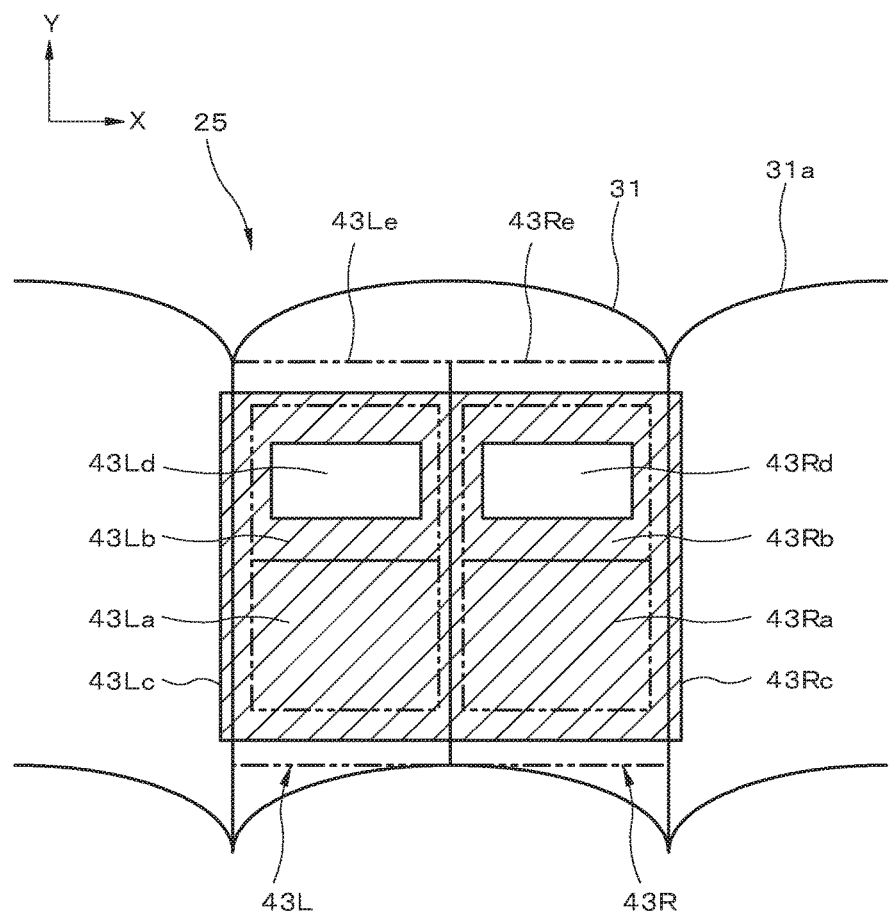
FIG. 21 A plan view showing a display panel of a fifth embodiment of the present invention.
Figure 22:
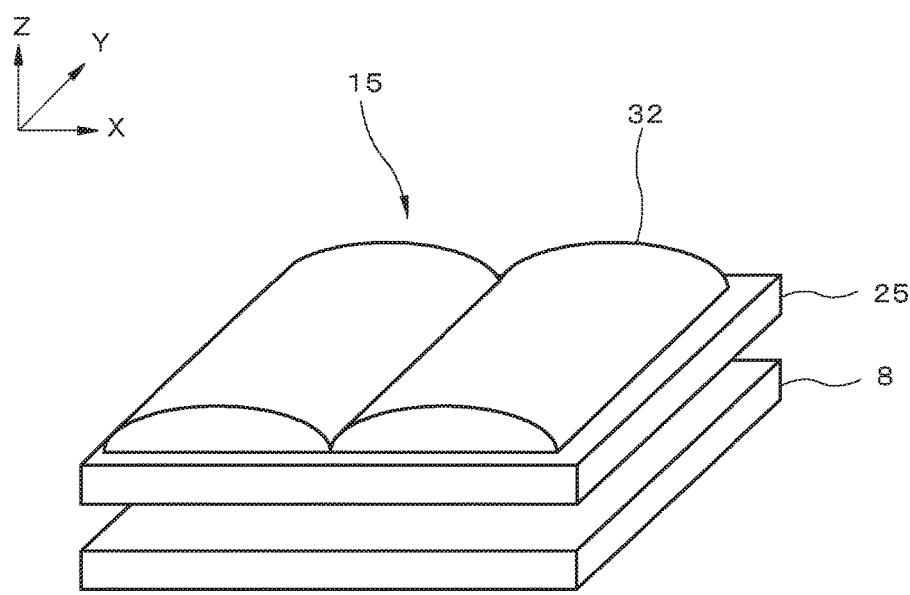
FIG. 22 A perspective view showing a display device of this embodiment.
Figure 23:
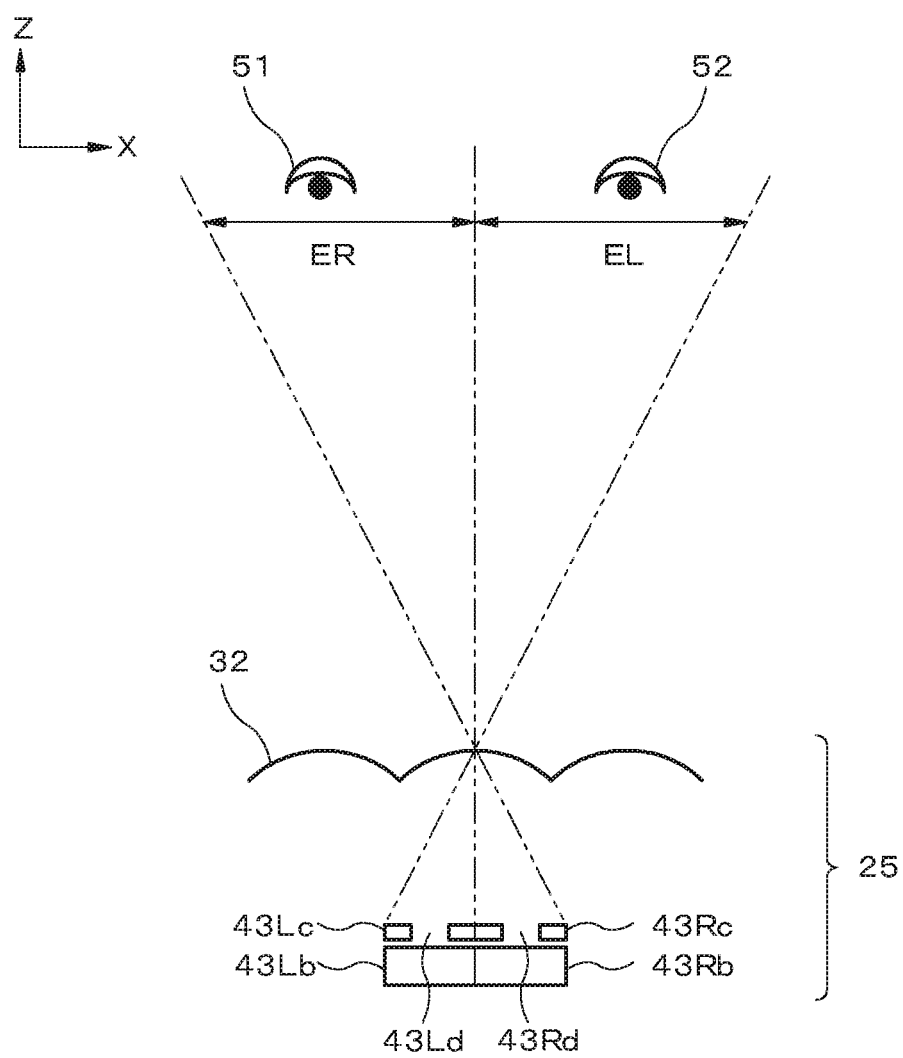
FIG. 23 A diagram showing an optical model in cross-section taken along a reflective region including a through-hole at a line segment parallel with the X-axis direction for the semi-transmissive type liquid crystal display panel of this embodiment.

Next, an explanation is given of a fifth embodiment of the present invention. FIG. 21 is a plan view showing a display panel of this embodiment. FIG. 22 is a perspective view showing a display device of this embodiment. FIG. 23 is a diagram showing an optical model in cross-section cut along a reflective region including a through-hole at a line segment parallel to the X-axis direction at the semi-transmissive type liquid crystal display panel shown in FIG. 22, and FIG. 24 is a view showing an optical model for the case of using a lens of a focal length longer than the distance between the lens pixels.

As shown in FIGS. 21 and 22, a semi-transmissive type liquid crystal display panel 25 and a three-dimensional image display device 15 of the fifth embodiment differ from the semi-transmissive type liquid crystal display panel 23 and the three-dimensional image display device 13 of the third embodiment in using a lenticular lens 32 using cylindrical lenses 32a of a large radius of curvature, i.e. of a long focal length. The configuration of this embodiment other than that described above is the same as for the third embodiment.

This embodiment is characterized by the points of setting the radius of curvature of the lenticular lens 32 to be large, the image forming effect that the observation plane being weak, and the utilization of the gradation effect for the image of the pixels. The pixels used in this embodiment of the same as for the third embodiment and equation 18 described above is therefore established.

Figure 24:
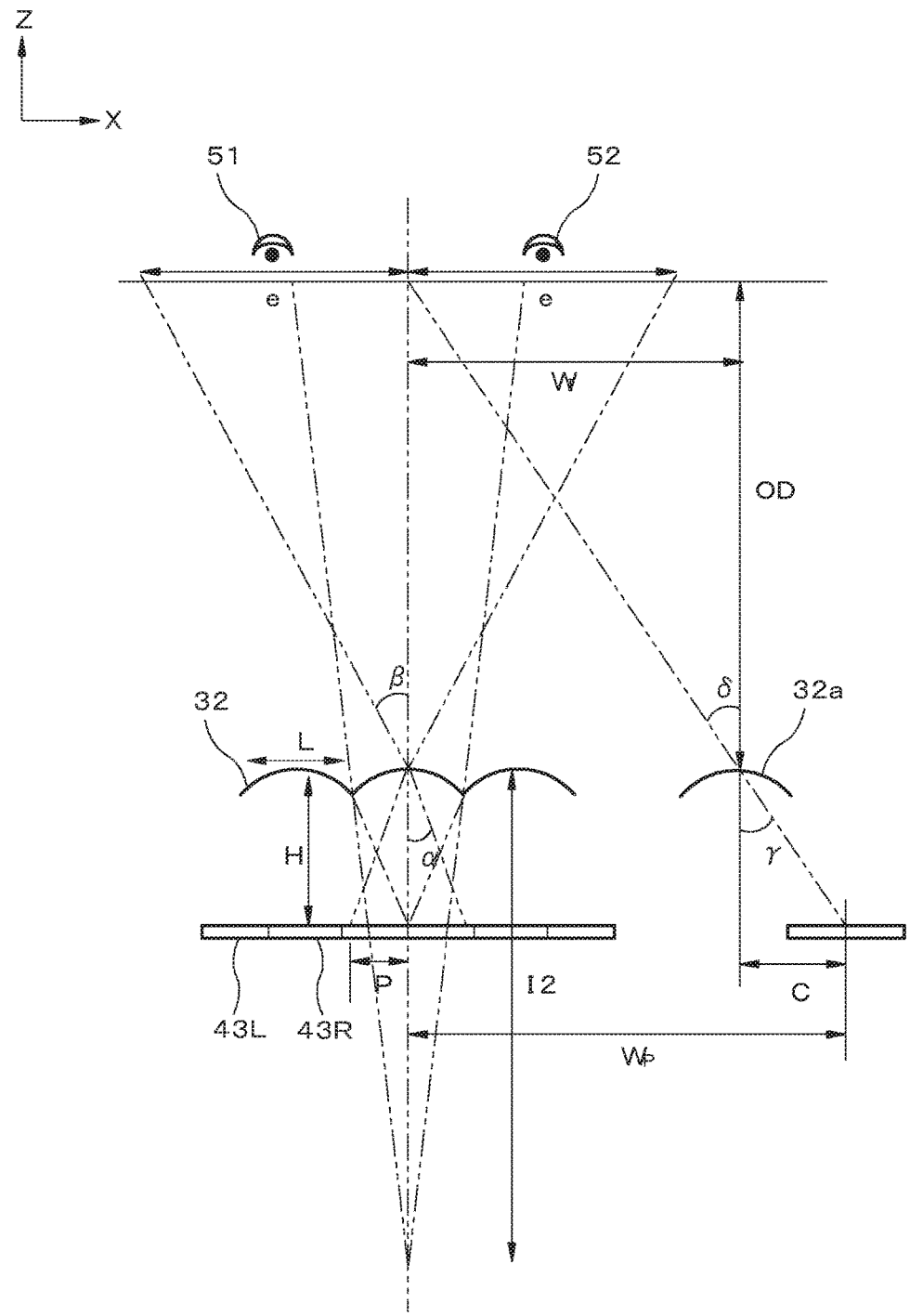
FIG. 24 A diagram showing an optical model for the case of using a lens of a focal length larger than a distance between lens pixels in a semi-transmissive type liquid crystal display panel of this embodiment.

As shown in FIG. 24, the radius of curvature of the lenticular lens is set to be larger than the value of equation 17, and the image point for the lenticular lens is set more to the −Z side than the lens. When a distance from the main point of the lenticular lens to the image point is taken to be I2, the following equation 19 is established using an analogous relationship.

$$I2 = OD \times L / ((1-t) \times e + L) \quad \text{[Equation 19]}$$

The following equation 20 is further established using an invariant of Abbe.

$$n/I2 - 1/OD = (n-1)/r3 \quad \text{[Equation 20]}$$

Here, r3 is the radius of curvature of the lenticular lens when the image for the pixels is gradated. When r2 is obtained by substituting equation 19 into equation 20, the following equation 21 can be obtained.

$$r3 = OD \times (n-1) \times L / (n \times (1-t) \times e - (n+1) \times L) \quad \text{[Equation 21]}$$

This radius of curvature r1 is a value for implementing the minimum gradation and corresponds to a minimum value for the radius of curvature and is therefore preferably set to the range established by equation 22 in the following.

$$r3 \geq OD \times (n-1) \times L / (n \times (1-t) \times e - (n+1) \times L) \quad \text{[Equation 22]}$$

The equation 22 merely defines lower limit for the radius of curvature. The separation working of the lens also falls as the radius of curvature becomes larger. That is, the upper limit of the radius of curvature is a value for where the separation working of the lens can be exerted. In other words, a maximum value for the radius of curvature should be determined so that the lenticular lens splits light emitted from each of the pixels into murually different directions along a direction in which the pixels that display the first viewpoint image and the pixels that display the second viewpoint image are arranged.

Figure 25:
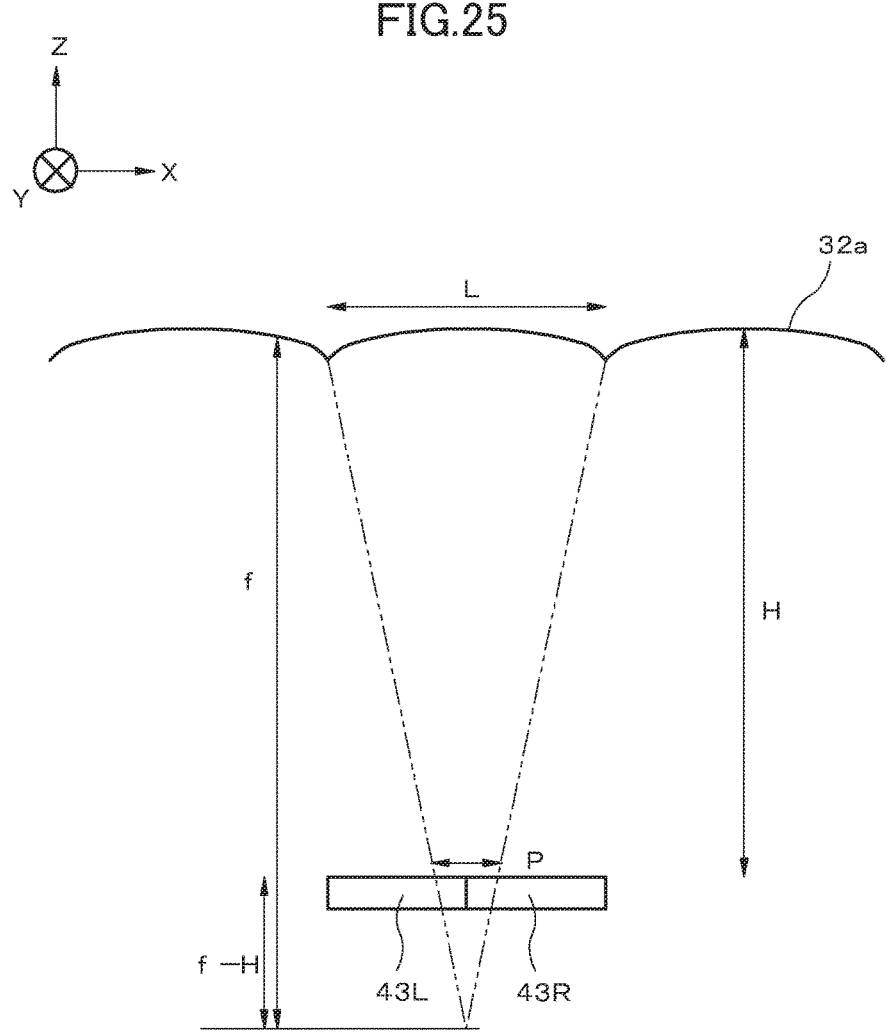
FIG. 25 A cross-sectional view for calculating the focal length of the cylindrical lens constituting the lenticular lens in this embodiment.

First, a maximum value for the focal length range where the lens separation working can be exerted is calculated. As shown in FIG. 25, in order for the separation working to be exerted, it is preferable to establish an analogous relationship at a triangle taking the lens pitch L as a base and taking the focal length f as a height and at a triangle taking the pixel pitch P as a base and taking f-H as a height. It is then possible for a maximum value for the focal length to be obtained from $H \times L/(L-P)$.

Next, the radius of curvature is calculated from the focal length. Using equation 11, it is possible to obtain a maximum value for the radius of curvature from $H \times L \times (n-1)/(L-P)/n$. That is, it is preferable for the radius of curvature to satisfy the equation 22 so as to be this value or less.

The conditions for the lens to split light emitted from each of these pixels into mutually different directions that are along the direction of arraying of each of the viewpoint pixels are summarized. As disclosed in the third embodiment, the minimum value for the radius of curvature in order to satisfy these conditions is $H \times L \times (n-1)/(L+P)/n$. As described above, the maximum value for the radius of curvature in order to satisfy this condition is $H \times L \times (n-1)/(L-P)/n$. That is, in order for the lens to demonstrate the splitting effects, it is necessary for the curvature radius to be in a range greater than $H \times L \times (n-1)/(L+P)/n$ and less than $H \times L \times (n-1)/(L-P)/n$. That is, the third to sixth embodiments of the present invention therefore exhibit the effect of reducing the influence of these through-holes by adding the further restriction of this range.

In this embodiment, a description is given of a biocular three-dimensional image displaying device having left eye pixels and right eye pixels but the present invention is by no means limited in this respect. For example, it is also possible to similarly apply the present invention to N viewpoint (where N is a natural number) method display devices. In this event, for the definition of the distance WP, it is preferable to change the number of pixels included in a region for the distance WP from 2 m to N×m.

In this embodiment, the through-holes are formed in the shape of a rectangular opening. It is then possible to reduce the influence of through-holes and suppress color aberrations by setting the radius of curvature so that the focal length of the lenticular lens is larger than the distance between lens pixels. In this embodiment, it is possible to reduce the extent of unevenness of the lens surface and to reduce the deterioration in image quality caused by this unevenness because a lens with a large radius of curvature is used. The operation and effects of the fifth embodiment other than those described above are the same as for the third embodiment.

Figure 26:
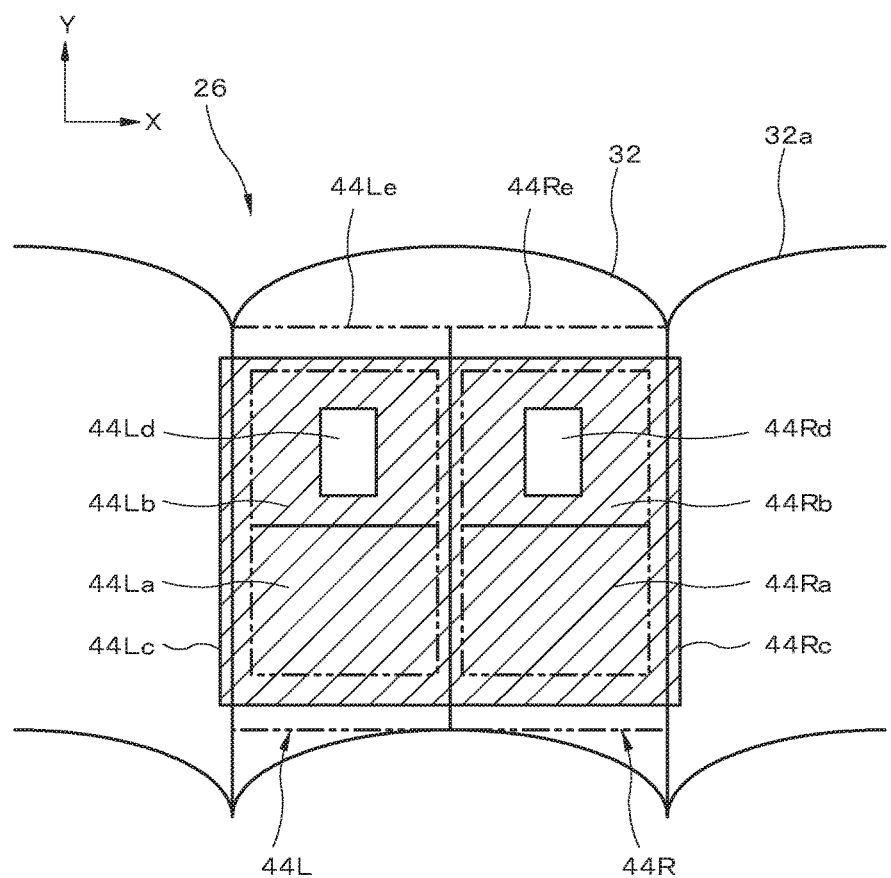
FIG. 26 A plan view showing a display panel of a sixth embodiment of the present invention.
Figure 27:
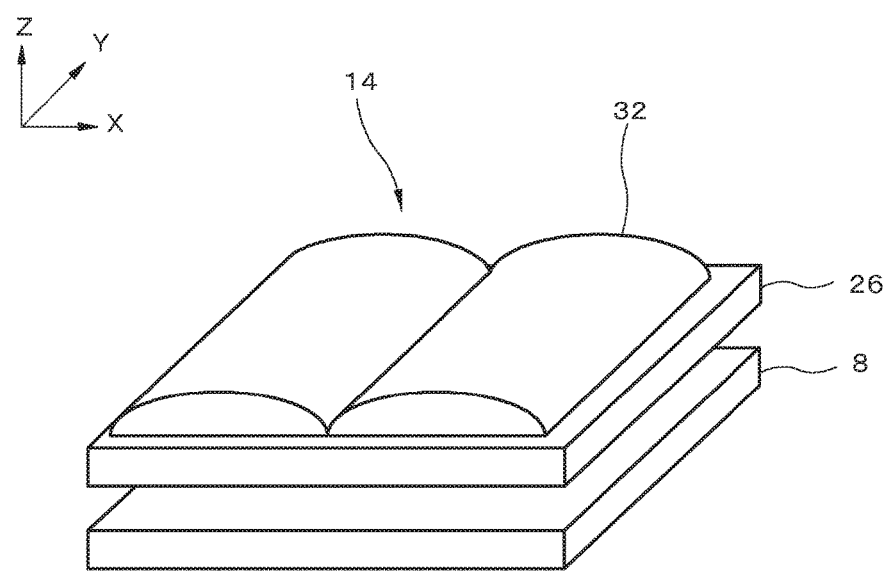
FIG. 27 A perspective view showing a display device of this embodiment.
Figure 28:
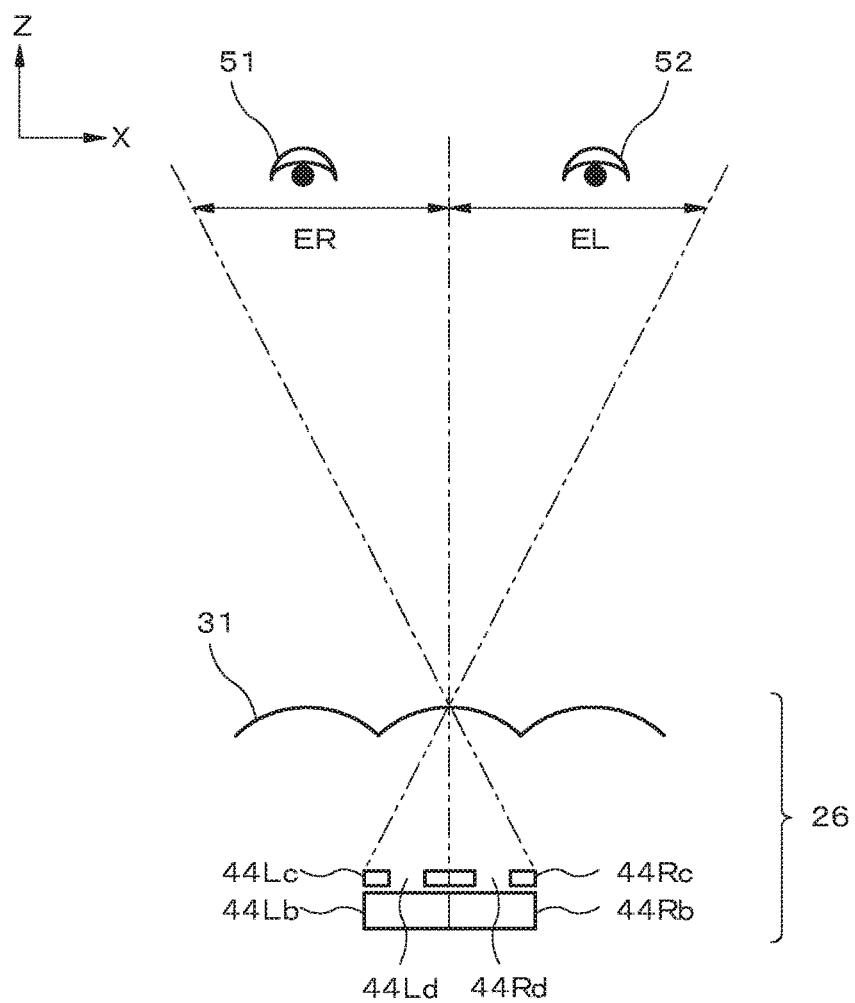
FIG. 28 A diagram showing an optical model in cross-section taken along a reflective region including a through-hole at a line segment parallel with the X-axis direction for the semi-transmissive type liquid crystal display panel of this embodiment.

Next, an explanation is given of a sixth embodiment of the present invention. FIG. 26 is a plan view showing a display panel of this embodiment. FIG. 27 is a perspective view showing a display device of this embodiment. FIG. 28 is a diagram showing an optical model in cross-section cut along a reflective region including a through-hole at a line segment parallel to the X-axis direction in the semi-transmissive type liquid crystal display panel shown in FIG. 27. As shown in FIGS. 26 and 27, a semi-transmissive type liquid crystal display panel 26 and a three-dimensional image display device 16 of the sixth embodiment differs from the semi-transmissive type liquid crystal display panel 25 and the three-dimensional image display device 15 of the fifth embodiment in the application of the pixel of the fourth embodiment. That is, this embodiment is the lens of the fifth embodiment applied to the pixels of the fourth embodiment. The configuration of this embodiment other than that described above is the same as for the fifth embodiment.

This embodiment is the same as the fifth embodiment of the present invention with regards to the point that the radius of curvature of the lenticular lens 32 is set to be large, the image forming effect at the observation playing is weak, and the effect of gradation of the image for the pixels is utilized. However, the amount of gradation of the image for the pixels is different because the width of the opening in the X-axis direction of the through-holes 44Ld and 44Rd is set to be half or less of the pixel pitch. In this embodiment, the following equation 23 is applied in place of equation 18 described above.

When defined as described above, the width of the enlarged image occurring at the observation plane of the through-hole becomes t×e. It is then preferable to divide the width of the enlarged image for this through-holein half. That is, it is preferable for the image for the pixel to only be gradated by t×e/2. In the following, as with the fifth embodiment, the radius of curvature r4 of the lenses is calculated preferably so as to be set at a range established by the following equation 23.

$$r4 \geq OD \times (n-1) \times L / (n \times t \times e - (n+1) \times L) \qquad \text{[Equation 23]}$$

This embodiment is finely applied to the case where the through-holes are formed in the shape of a rectangular opening and the width of the opening in the X-axis direction is small. It is therefore possible to reduce the amount of gradation and implement a broad stereoscopic band. The operation and effects of the sixth embodiment other than those described above are the same as for the fifth embodiment.

Figure 29:
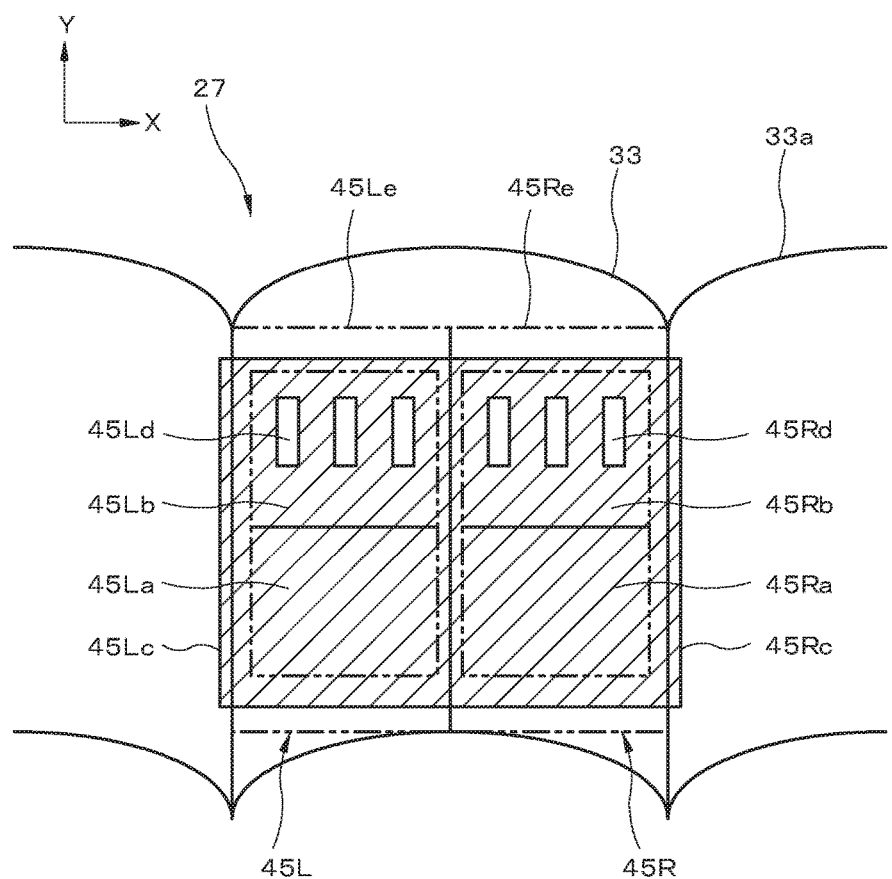
FIG. 29 A plan view showing a display panel of a seventh embodiment of the present invention.
Figure 30:
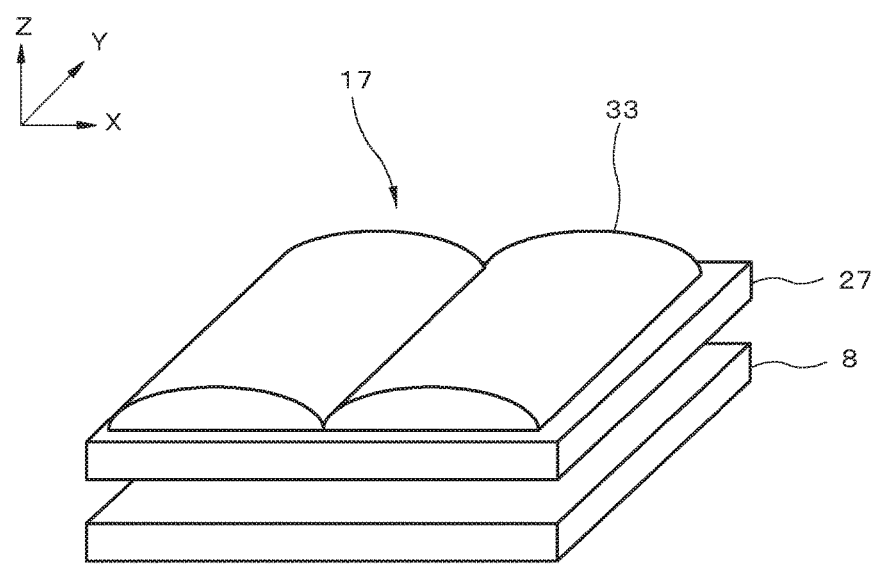
FIG. 30 A perspective view showing a display device of this embodiment.

Next, an explanation is given of a seventh embodiment of the present invention. FIG. 29 is a plan view showing a display panel of this embodiment. FIG. 30 is a perspective view showing a display device of this embodiment. As shown in FIGS. 29 and 30, a semi-transmissive type liquid crystal display panel 27 and a display device 17 of the seventh embodiment differ compared to the semi-transmissive type liquid crystal display panel 23 and the display device 13 disclosed in the third embodiment in that a left eye pixel 45L and a right eye pixel 45R are used, the radius of curvature is smaller than that is for the lenticular lens 3 disclosed in the first embodiment, and a lenticular lens 33 with a larger radius of curvature than the lenticular lens 31 disclosed in the third embodiment is used.

At the left eye pixel 45L, the shape of through-holes 45Ld provided at the color layer 45Lc is different from that of the third embodiment in that the through-holes are subdivided into a large number of rectangular through-holes in the X-axis direction. This is to say that a cross-section dividing the reflective region including the through-holes using a segment line parallel with the X-axis direction is such as to be divided into through-holes 45Ld, and is divided into three regions in the example shown in the drawing. The same also applies for the right eye pixel. The configuration of this embodiment other than that described above is the same as for the third embodiment.

In this embodiment, the shape of the through-hole 45Ld is formed so as to be subdivided into a large number of rectangular through-holes in the X-axis direction. It is therefore not necessary to change the radius of curvature of the lenticular lens 33 substantially from that of the first embodiment of the present invention. In the first embodiment of the present invention, the focal point of the lenticular lens 3 is set to be the focal plane as described above. However, when the radius of curvature of the lens is changed from this state, a gradation effect occurs for the image of the pixels. This gradation effect is utilized in the third to sixth embodiments. However, when the extent of the gradation becomes substantial, the effect of splitting the left eye pixels and the right eye pixels is reduced and the range that can be viewed three-dimensionally is narrowed. In this embodiment, it is possible to reduce the influence of the through-holes as well as reducing the extent of the gradation, and to suppress color aberrations by subdividing the through-holes to give a large number of through-holes arranged in the direction of arraying of the lenses. It is therefore possible to suppress the phenomenon of the stereoscopic band becoming narrow and it is possible to implement a broad stereoscopic band. The operation and effects of the seventh embodiment other than those described above are the same as for the third embodiment.

Figure 31:
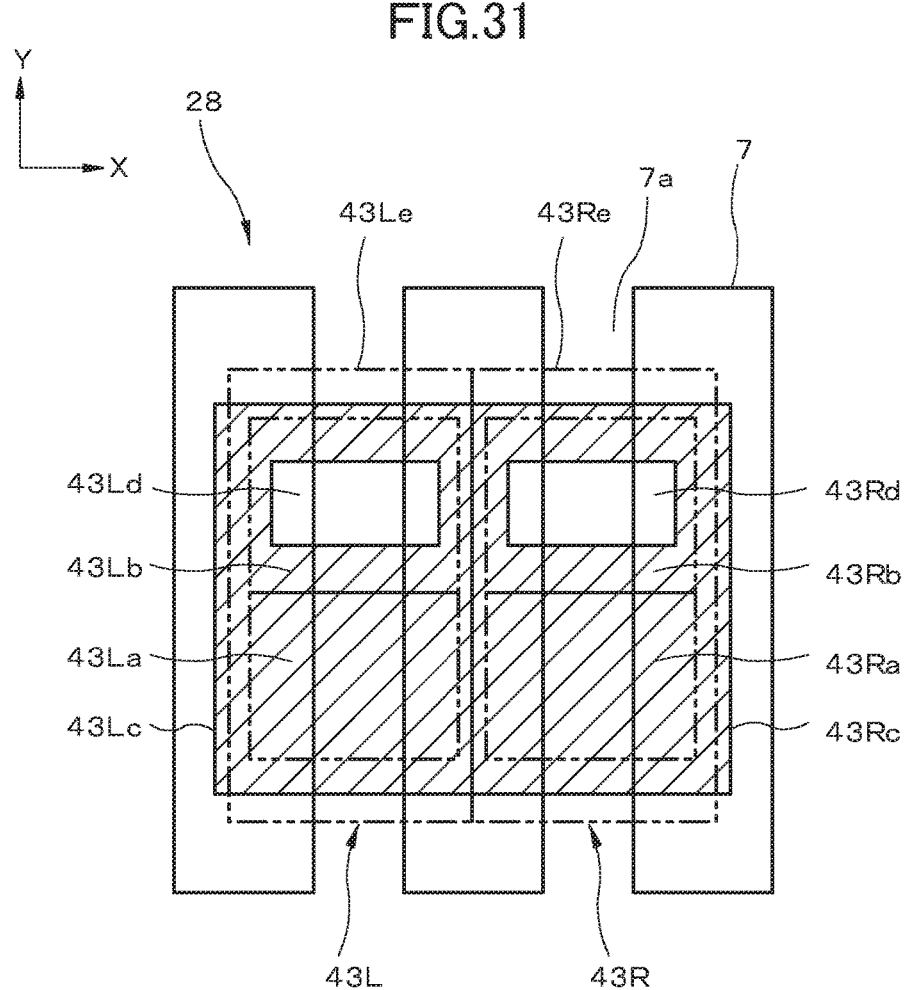
FIG. 31 A plan view showing a display panel of an eighth embodiment of the present invention.
Figure 32:
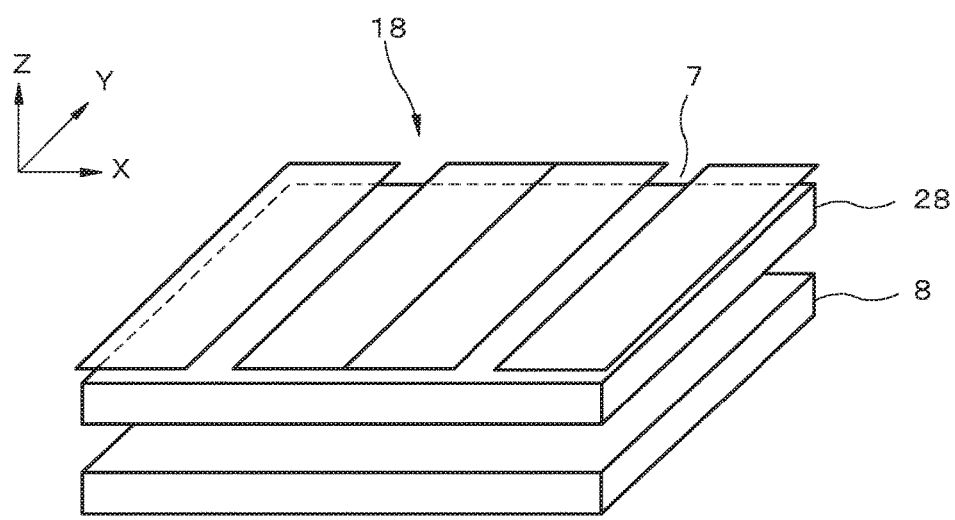
FIG. 32 A perspective view showing a display device of this embodiment.
Figure 33:
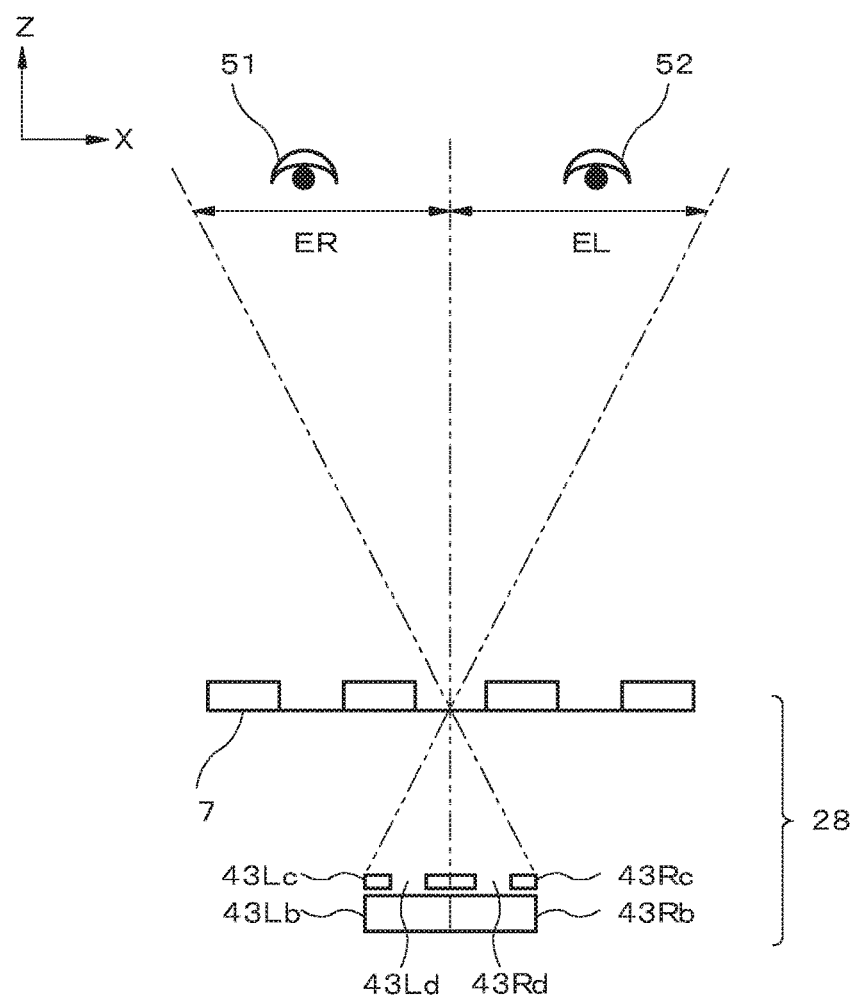
FIG. 33 A diagram showing an optical model in cross-section taken along a reflective region including a through-hole at a line segment parallel with the X-axis direction for the semi-transmissive type liquid crystal display panel of this embodiment.
Figure 34:
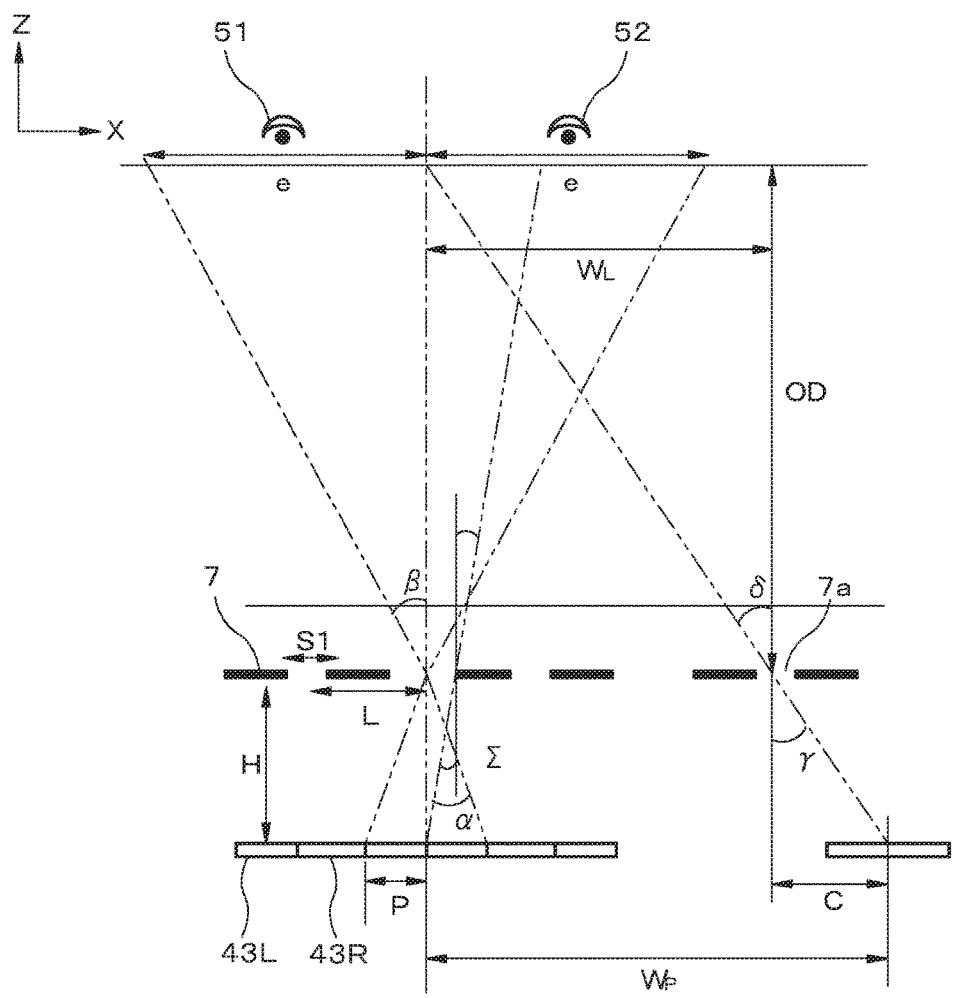
FIG. 34 A diagram showing an optical model for the case of using a lens of a parallax barrier in a semi-transmissive type liquid crystal display panel of this embodiment.

Next, a description is given of an eighth embodiment of the present invention. FIG. 31 is a plan view showing a display panel of this embodiment. FIG. 32 is a perspective view showing a display device of this embodiment. FIG. 33 is a diagram showing an optical model in cross-section cut along a reflective region including a through-hole at a line segment parallel to the X-axis direction at the semi-transmissive type liquid crystal display panel shown in FIG. 32, and FIG. 34 is a view showing an optical model for the case of using a parallax barrier. As shown in FIGS. 31 and 32, a semi-transmissive type liquid crystal display panel 28 and a three-dimensional image display device 18 of the eighth embodiment differ from the semi-transmissive type liquid crystal display panel 23 and the three-dimensional image display device 13 of the third embodiment in using a parallax barrier 7 with a large number of slits 7a arranged in an X-axis direction in place of the lenticular lens 31. The configuration of this embodiment other than that described above is the same as for the third embodiment.

Next, an explanation is given of the operation of the display device of the eighth embodiment configured as described above. First, a description is given of the parallax barrier method using FIGS. 33 and 34. As shown in FIG. 33, the parallax barrier 7 is a barrier (light shielding plate) formed with a large number of thin vertical stripe-shaped openings, i.e. slits 7a. In other words, the parallax barrier is an optical member where a plurality of slits extending in a second direction orthogonal to the first direction that is the light splitting direction are arranged so as to be formed along the first direction. When light emitted from the left eye pixel 43L towards the parallax barrier 7 is transmitted through the slits 7a, the light becomes luminous flux that propagates towards the region EL. When light emitted from the right eye pixel 43R towards the parallax barrier 7 is transmitted through the slits 7a, the light also becomes luminous flux that propagates towards the region ER. On the other hand, when an observer positions their left eye 52 at the region EL and positions their right eye 51 at the region ER, the observer can recognize a three-dimensional image.

Next, a detailed description is given of a size of each part for the three-dimensional image display device arranged with a parallax barrier formed with slit-shaped openings at the front surface of the display panel. As shown in FIG. 34, the arraying pitch for the slits 7a of the parallax barrier 7 is taken to be L, and the distance between the parallax barrier 7 and the pixels is taken to be H. Further, the distance between the parallax barrier 7 and the observer is taken to be an optimum observation distance OD. Moreover, a distance from the center of a slit 7a positioned at the center of the parallax barrier 7 to the center of a slit 7a positioned at an end of the parallax barrier 7 in the X-axis direction is taken to be WL. The parallax barrier 7 itself is a light shielding plate and the light incident to locations other than the slits 7a is not transmitted but a substrate that supports the barrier layer is also provided and a refractive index of the substrate is defined as n. When defined in this manner, light emitted from the slits 7a is refracted in accordance with Snell's law while being emitted from the substrate that supports the barrier layer. The angle of incidence and the exit angle of light at the slits 7a positioned at the center of the parallax barrier 7 are taken to be α and β, respectively, and the angle of incidence and the exit angle of light at the slits 7a positioned at an end of the parallax barrier 7 in the X-axis direction are taken to be γ and δ, respectively. An opening width of the slits 7a is taken to be S1. The arraying pitch L of the cylindrical lenses 7a and the arraying pitch P of the pixels are mutually related in such a manner that one decides the other. Normally, cases where the parallax barrier is designed in line with the display panel are common and the arraying pitch P of the pixels is handled as a constant. The refractive index n can be decided by selecting the material for the support substrate for the barrier layer. With regards to this, the observation distance OD between the parallax barrier and the observer and the interval e of the enlarged projected image for the pixels at the observation distance OD are set to a desired value. The distance H between the barrier and the pixels and the barrier pitch L are decided using these values. The following equations 24 to 29 are established using Snell's law and geometrical relationships. The following equations 30 to 32 are also established.

$$n \times \sin \alpha = \sin \beta \quad \text{[Equation 24]}$$

$$OD \times \tan \beta = e \quad \text{[Equation 25]}$$

$$H \times \tan \alpha = P \quad \text{[Equation 26]}$$

$$n \times \sin \gamma = \sin \delta \quad \text{[Equation 27]}$$

$$H \times \tan \gamma = C \quad \text{[Equation 28]}$$

$$OD \times \tan \delta = WL \quad \text{[Equation 29]}$$

$$WP - WL = C \quad \text{[Equation 30]}$$

$$WP = 2 \times m \times P \quad \text{[Equation 31]}$$

$$WL = m \times L \quad \text{[Equation 32]}$$

If the parallax barrier is interpreted as enlarging the pixels in the same way as with the lenticular lens of the third embodiment, the lateral magnification of the parallax barrier can be considered to be of a value that is the interval for the enlarged projected images for the pixels divided by the interval for the pixels i.e. the pixel pitch, and therefore becomes e/P.

When the width of an opening occurring in the X-axis direction of the through-holes 43Ld and 43Rd is defined as being t times the pixel pitch, the width of the enlarged image at the observation plane of the through-holes becomes t×e. It is then appropriate for an image for the pixels to be gradated by a value that is the width of the enlarged image for the through-holes subtracted from the interval for the enlarged projected image for the pixels divided in half, i.e. (1−t)×e/2. At the parallax barrier, when the width of the slit opening is small, the gradation working becomes larger as the width of the opening becomes larger as with the same theory for image forming as for a pinhole camera.

As shown in FIG. 33, taking note of the behavior of light at the end portion of the opening of the slit 7a positioned at a central part of the parallax barrier 7, the angle of incidence and the exit angle of light that is incident to the end portion of the opening of the slit 7a that is emitted from the boundary of the left eye pixel 43L and the right eye pixel 43R are defined as ε and φ. It is necessary for the light to broaden by just (1−t)×e/2 while the emitted light propagates by just OD. Equations 33 to 35 are therefore established using Snell's law and geometrical relationships. The following equation 36 is then derived.

$$n \times \sin \varepsilon = \sin \varphi \quad \text{[Equation 33]}$$

$$OD \times \tan \varphi = (1-t) \times e/2 \quad \text{[Equation 34]}$$

$$H \times \tan \varepsilon = S1/2 \quad \text{[Equation 35]}$$

$$S1 = 2 \times H \times \tan(1/n \times \arcsin(\sin(\arctan((1-t) \times e/OD/2)))) \quad \text{[Equation 36]}$$

This slit width S1 is a value for implementing a minimum gradation and corresponds to the minimum value for the slit width and is preferably set to the range established by the following equation 37.

$$S1 \geq 2 \times H \times \tan(1/n \times \arcsin(\sin(\arctan((1-t) \times e/OD/2)))) \quad \text{[Equation 37]}$$

The working as a parallax barrier reduces as for the slit width S1 becomes larger. For example, when the slit width is the same as the arraying pitch L of the slits, the light shielding region no longer exists and does not function as a parallax barrier. With regards to this, in the present invention, it is assumed that an optical member such as a parallax barrier splits in mutually different directions light emitted from the plurality of pixels. In order to implement the assumed conditions, it is preferable for the upper limit for the slit width S1 to be half or less of the arraying pitch L of the slits. This condition is to give a maximum value in the order that regions exist where images for the left and right pixels do not overlap. In other words, it is preferable for the slit width S1 to satisfy equation 37 and to be half or less of the arraying pitch of the slits.

In this embodiment, the through-holes are formed in the shape of rectangular openings. However, it is possible to reduce the influence of the through-holes and to suppress collaborations by utilizing the gradation working of the slits by setting the width of the openings of the slits at the parallax barrier appropriately. Comparing the parallax barrier method with the lenticular lens method, absorption loss occurs due to light shielding sections other than slits and the transmissivity and the reflectivity therefore fall. Straightforward manufacturing is also possible using photolithography as described previously and costs can therefore be reduced.

In this embodiment, an explanation is given of using a parallax barrier with slits arranged one-dimensionally in the X-axis direction. However, the present invention is by no means limited in this respect, and is also applicable to barriers where the openings are arranged two-dimensionally. For example, it is also possible to use a parallax barrier where a plurality of pinhole shaped openings are formed in the shape of a matrix. This optical member has an effect of splitting in a second direction orthogonal to the first direction light emitted from each pixel, within a display plane of the display panel. As a result, it is possible to view images for different viewpoints not only in the first direction but also in the second direction. The operation and effects of the eighth embodiment other than those described above are the same as for the third embodiment.

Figure 35:
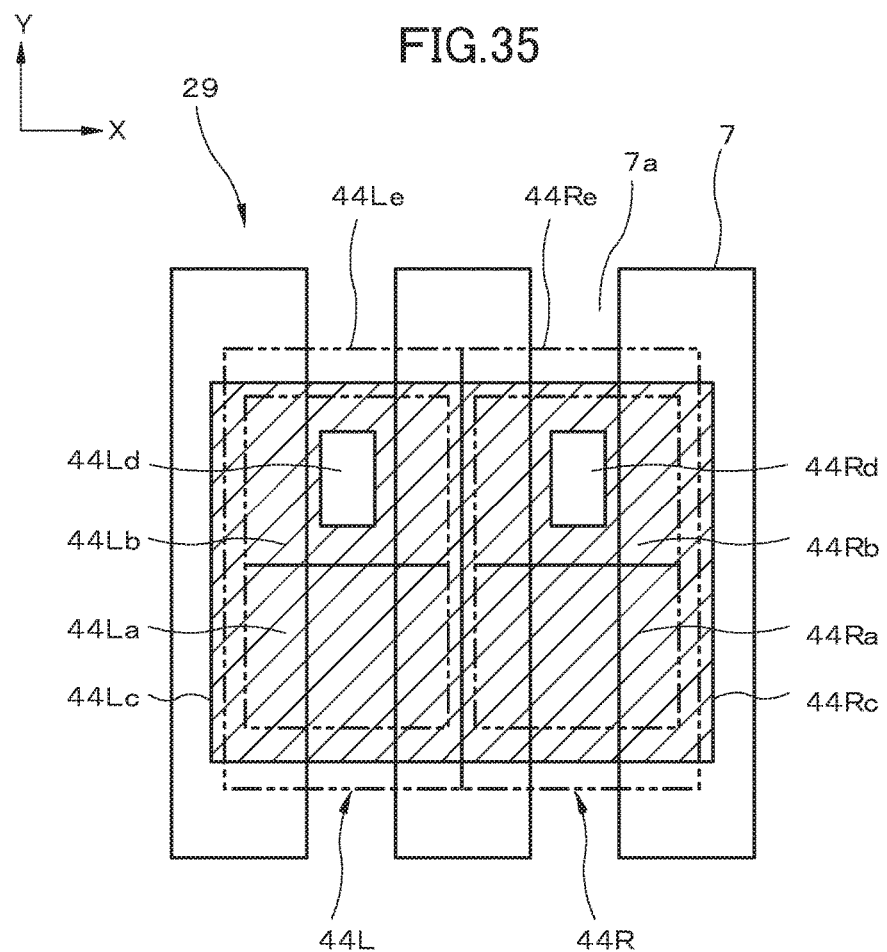
FIG. 35 A plan view showing a display panel of a ninth embodiment of the present invention.
Figure 36:
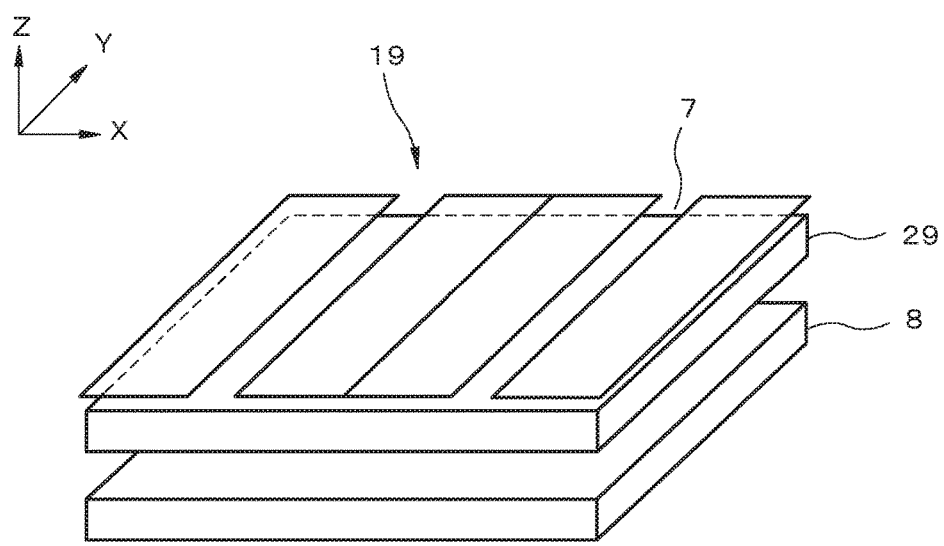
FIG. 36 A perspective view showing a display device of this embodiment.
Figure 37:
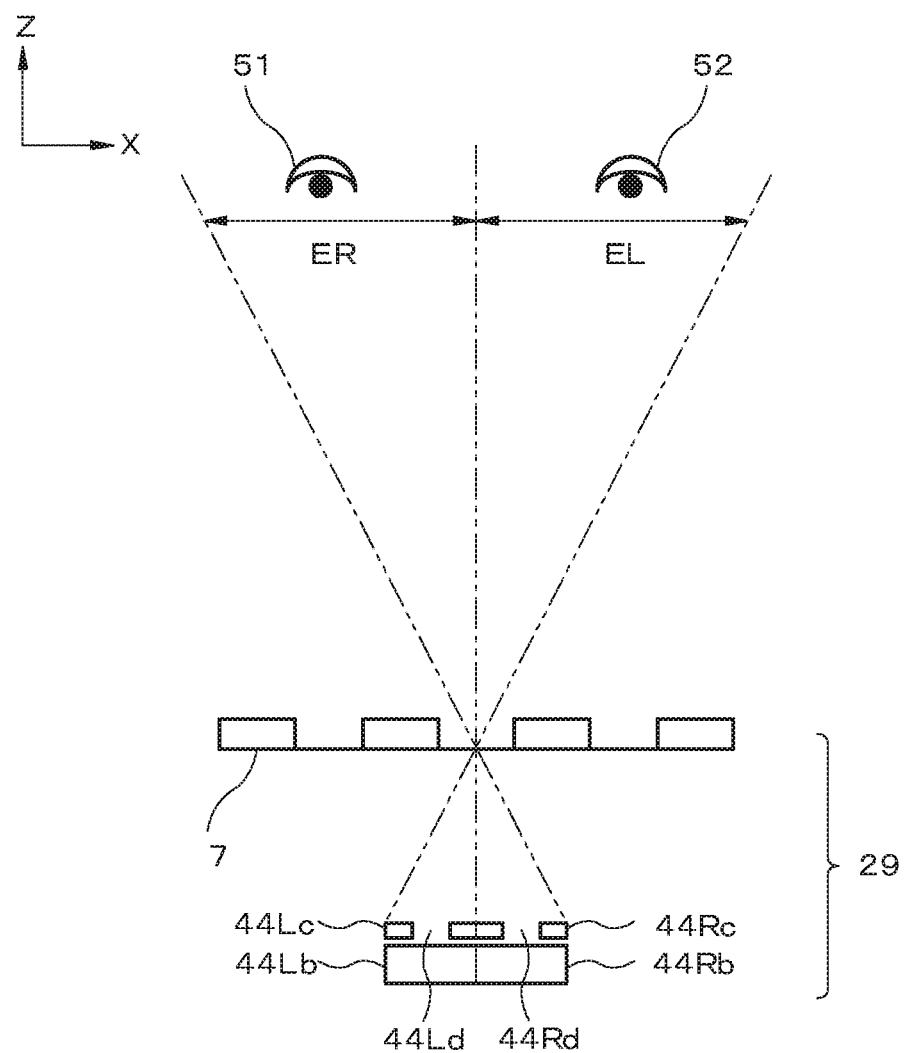
FIG. 37 A diagram showing an optical model in cross-section taken along a reflective region including a through-hole at a line segment parallel with the X-axis direction for the semi-transmissive type liquid crystal display panel of this embodiment.

Next, a description is given of a ninth embodiment of the present invention. FIG. 35 is a plan view showing a display panel of this embodiment. FIG. 36 is a perspective view showing a display device of this embodiment. FIG. 37 is a diagram showing an optical model in cross-section cut along a reflective region including a through-hole at a line segment parallel to the X-axis direction at the semi-transmissive type liquid crystal display panel shown in FIG. 36. As shown in FIGS. 35 and 36, a semi-transmissive type liquid crystal display panel 29 and a three-dimensional image display device 19 of the ninth embodiment differ from the semi-transmissive type liquid crystal display panel 28 and the three-dimensional image display device 18 of the eighth embodiment in the application of the left eye pixel 44L and the right eye pixel 44R of the fourth embodiment. That is, a description is given of the case where the width of the through-holes 44Ld and 44Rd in the X-axis direction is 50 percent of the pixel pitch or less. The configuration of this embodiment other than that described above is the same as for the eighth embodiment.

In this embodiment, the width of the openings of the through-holes 44Ld and 44Rd in the X-axis direction is set to be half of the pixel pitch or less. The extent of gradation of the image for the pixels is therefore different. In this embodiment, the following equation 23 is applied in place of equation 18 described above.

At this time, as shown in FIG. 37, the width of the enlarged image occurring at the observation plane of the through-hole becomes t×e. It is then preferable for the image for the pixels to be gradated by a value that is the width of the enlarged image for this through-hole divided in half, i.e. divided by t×e/2, in order to reduce the influence of the through-holes at the observation plane. In the following, as with the eighth embodiment, the width S2 of the opening of the slits is calculated preferably so as to be set at a range established by the following equation 38.

$$S2 \geq 2 \times H \times \tan(1/n \times \arcsin(\sin(\arctan(t \times e/OD/2))))) \quad \text{[Equation 38]}$$

It is possible for the upper limit of the slit width S2 to be considered to be half of the arraying pitch for the slits, as with the eighth embodiment. This means that it is preferable for the slit width S2 to satisfy equation 38 and to be half or less of the arraying pitch of the slits.

This embodiment is preferably applied to the case where the through-holes are formed in the shape of a rectangular opening and the width of the opening in the X-axis direction is small. It is therefore possible to reduce the amount of gradation and implement a broad stereoscopic band. The operation and effects of the ninth embodiment other than those described above are the same as for the fourth embodiment.

Figure 38:
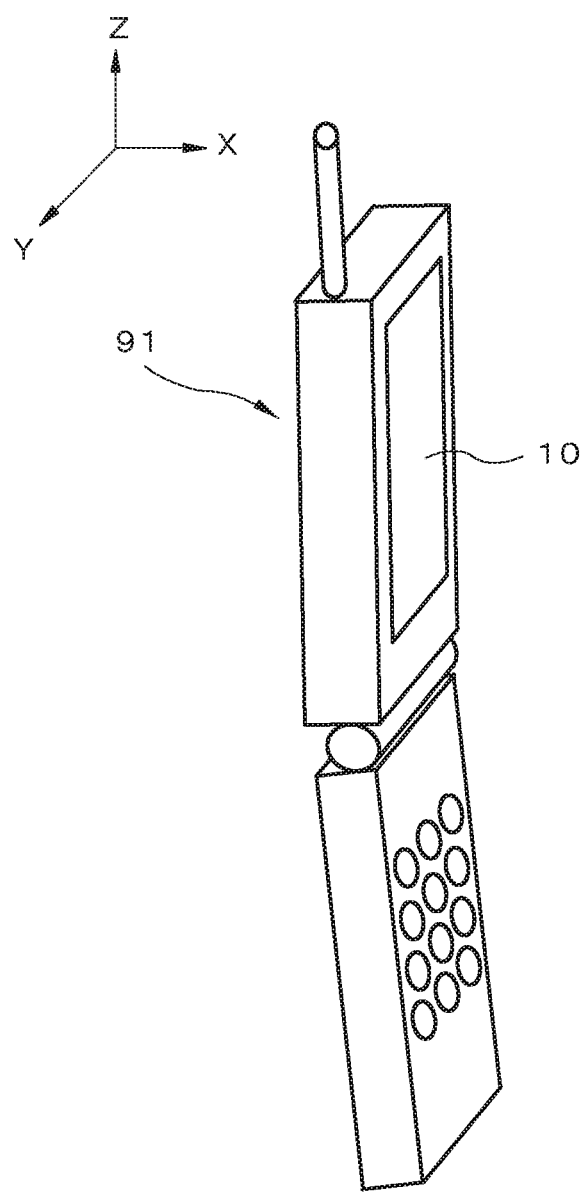
FIG. 38 A perspective view showing a terminal device of a tenth embodiment of the present invention.
Figure 39:
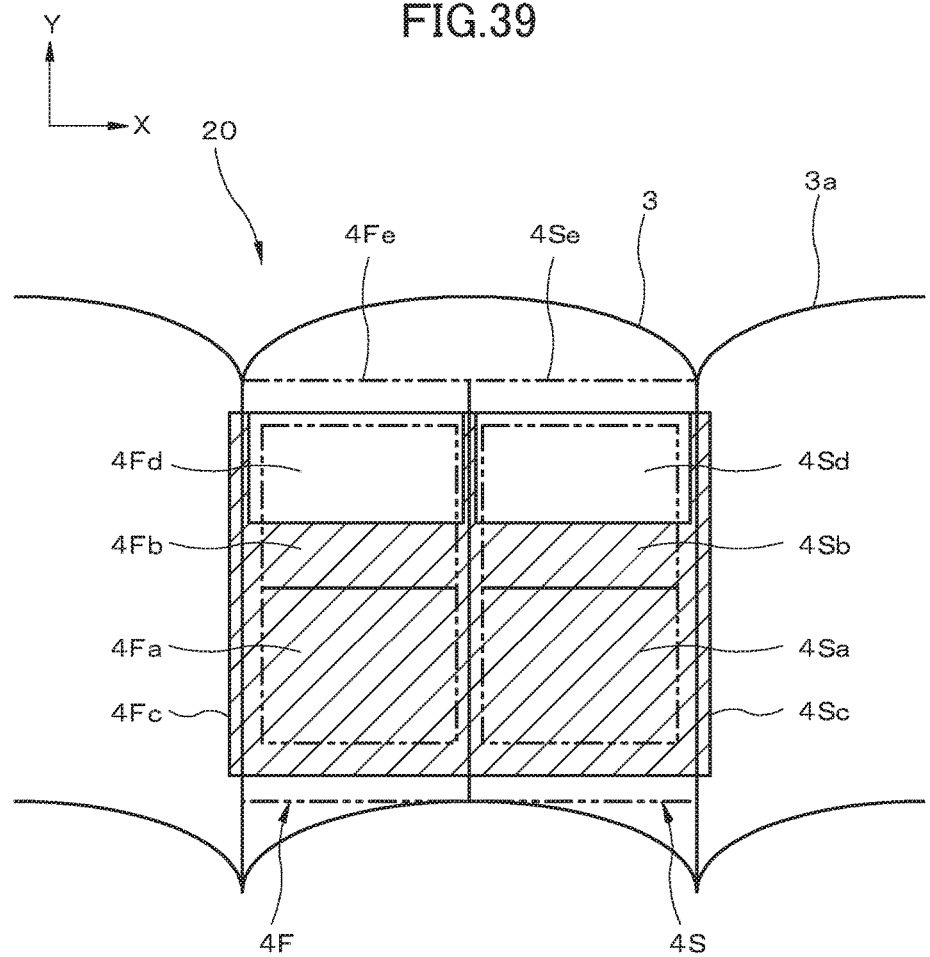
FIG. 39 A plan view showing a display panel of this embodiment.
Figure 40:
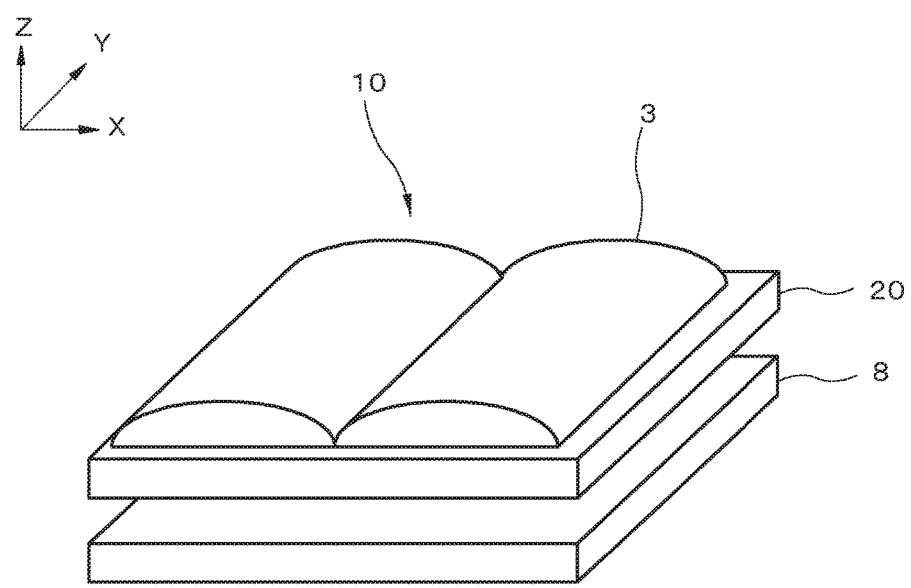
FIG. 40 A perspective view showing a display device of this embodiment.

Next, a description is given of a tenth embodiment of the present invention. FIG. 38 is a perspective view showing a terminal device of this embodiment. FIG. 39 is a plan view showing a display panel of this embodiment. FIG. 40 is a perspective view showing a display device of this embodiment. As shown in FIGS. 38 to 40, a semi-transparent liquid crystal display panel 20 and a display device 10 of this embodiment are incorporated in a mobile telephone 91 as a terminal device. This embodiment differs compared to the first embodiment in that a longitudinal direction of the cylindrical lenses 3a constituting the lenticular lens 3, i.e. the Y-axis direction is the lateral direction of the image display device, i.e. the horizontal direction of the image, and the arraying direction of the cylindrical lenses 3a, i.e. the X-axis direction is the vertical direction, i.e. a perpendicular direction of the image.

Further, as shown in FIG. 39, a plurality of pixel pairs each consisting of one first viewpoint pixel 4F and one second viewpoint pixel 4S are arranged in a matrix shape at the display panel 20. The direction of arraying the first viewpoint pixel 4F and the second viewpoint pixel 4S for one pixel pair is the X-axis direction that is the direction of arraying the cylindrical lenses 3a and is the vertical direction (perpendicular direction) of the screen. The structure of each pixel 4F and 4S is the same as for the first embodiment. For example, a transmission region 4Fa, a reflective region 4Fb, a color layer 4Fc, a slit-shaped through-hole 4Fd, and a light shielding region 4Fe are provided for the first viewpoint pixel 4F as in the first embodiment. The configuration of this embodiment other than that described above is the same as the first embodiment.

Next, an explanation is given of the operation of the image displaying device of this embodiment. The basic operation is the same as for the first embodiment but the displayed images are different. The first viewpoint pixel 4F of the display panel 20 displays a first viewpoint image and the second viewpoint pixel 4S displays a second viewpoint image. The first viewpoint image and the second viewpoint image are planar images rather than the three-dimensional images with mutual parallaxes. Both images can be mutually independent images or can be images displaying mutually correlating information.

In this embodiment, there is the advantage that not only can uniform reflective displaying that is not influenced by the through-holes be implemented on the phenomenon of color aberrations occurring due to the viewing angle and external light conditions, but also it is possible to select and the observe the first viewpoint image or the second viewpoint image by the observer just changing the angle of the mobile telephone 91. In particular, when there is correlation between the first viewpoint image and the second viewpoint image, it is possible to alternately switch over between respective images for observation using a straightforward method of just changing the viewing angle. This substantially increases convenience. When the first viewpoint image and the second viewpoint image are arranged in a lateral direction, the cases exists where different images are observed by the right eye and the left eye depending on the position of the observer. In this event, the observer is confused and can no longer recognize images for each viewpoint. With regards to this, as shown in this embodiment, when the images for a plurality of viewpoints are arranged in the vertical direction, the observer is always able to observe images for each viewpoint using both eyes and can easily recognize these images. The configuration of this embodiment other than that described above is the same as for the first embodiment. This embodiment can be combined with any of the second to ninth embodiments. Combination with embodiments described in the following is also possible.

In the first to tenth embodiments, examples are shown where image display devices are mounted on a mobile telephone etc. and an image having a parallax is supplied to both the left and right eyes of a single observer so as to display a three-dimensional image, or a plurality of types of images are supplied at the same time to a single observer. However, the image display device of the present invention is not limited in this respect and can also be a large type display panel where a plurality of mutually different images are supplied to a plurality of observers. The same also applies to embodiments described in the following.

Figure 41:
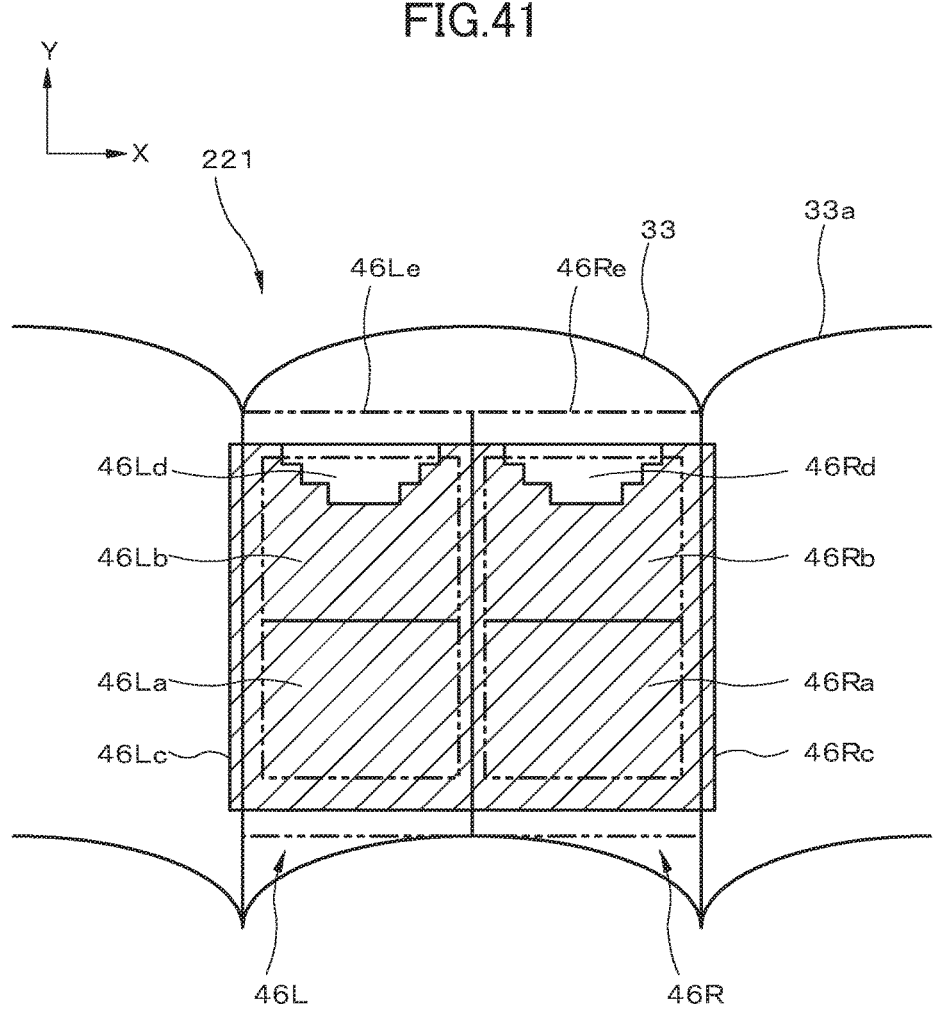
FIG. 41 A plan view showing a display panel of an eleventh embodiment of the present invention.
Figure 42:
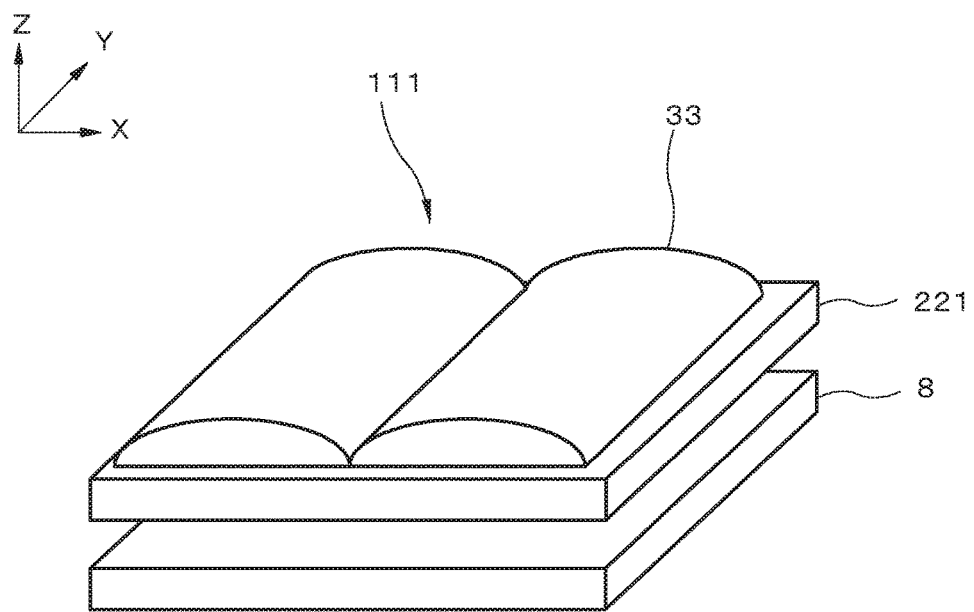
FIG. 42 A perspective view showing a display device of this embodiment.

Next, an explanation is given of an eleventh embodiment of the present invention. FIG. 41 is a plan view showing a display panel of this embodiment. FIG. 42 is a perspective view showing a display device of this embodiment. As shown in FIGS. 41 and 42, a semi-transmissive type liquid crystal display panel 221 and the display device 111 of this eleventh embodiment differ compared to the semi-transmissive type liquid crystal display panel 27 and the display device 17 disclosed in the seventh embodiment in that a left eye pixel 46L and a right eye pixel 46R are used.

At the left eye pixel 46L, the shape of the through-hole 46Ld provided at the color layer 46Lc is different to that of the seventh embodiment. Specifically, the shape of the through-hole 46Ld is stepped, and the width of the opening for the through-hole in the Y-axis direction therefore differs depending on the X-axis direction coordinate. For example, for the left eye pixel 46L, a through-hole where the width of the opening in the Y-axis direction is a maximum is formed in the vicinity of the center in the X-axis direction. The width of the openings in the Y-axis direction is also arranged so as to become smaller in a stepped manner going away from the vicinity of the center in the X-axis direction. The same also applies for the right eye pixel 46R. The configuration of this embodiment other than that described above is the same as for the seventh embodiment. This is to say that, as in the seventh embodiment, the cylindrical lenses 33a constituting the lenticular lens 33 have a radius of curvature that is smaller than that of the cylindrical lenses 3a constituting the lenticular lens 3 disclosed in the first embodiment, and larger than the radius of curvature of the cylindrical lenses 31a constituting the lenticular lens 31 disclosed in the third embodiment.

In FIG. 41, the light shielding region 46Le is arranged at a portion other than the transmission region 46La and the reflective region 46Lb of the left eye pixel 46L. This is the same as with other pixels and the same as with other embodiments.

In this embodiment, the width of the openings for the through-holes 45Ld in the Y-axis direction are configured to be different depending on the X-axis coordinate. The focal point of the lenticular lens 33 is also set to be slightly different from the pixel. The image-forming effects with respect to the observation plane are therefore weak, the image for the pixels exhibits a gradation effect that is slight, and superior separation characteristics can therefore be implemented. As a result of these two characteristics, as in the second embodiment, the same effects can be exhibited as for a configuration where the width of the openings in the Y-axis direction changes gently with respect to the X-axis direction even when through-holes having stepped openings are used as in this embodiment. It is therefore possible to suppress the occurrence of colour abberations in the direction of the viewing angle causes by the stepped openings, and it is possible to reduce discomfort felt by the observer.

In particular, when a TFT method is used as a method for driving the liquid crystal display panel, it is necessary to arrange a large number of structures such as transistors for applying voltages corresponding to images to be displayed at pixel electrodes and storage capacitors for holding the voltages. As a result, there are cases where through-holes of a shape that changes smoothly as in the second embodiment cannot be arranged appropriately due to the layout of these structures. In such cases it is possible to increase the displaying quality through the application of through-holes having stepped openings as in this embodiment and slightly lowering the separation performance of the lenticular lens, i.e. by slightly lowering the performance of separation of light emitted from the left and right pixels into different directions.

By then setting the focal length of the lenticular lens in this embodiment so that the stepped openings occurring at the through-holes are not projected as is onto the observation plane, it is possible for this to be considered to be the same as, for example, the third embodiment. The gradation can therefore be set to be the same as the width of each step of the stepped opening in the X-axis direction. It is therefore possible to reduce color aberrations that depend on the direction of the viewing angle caused by the shape of the steps of the through-holes and it is possible to implement the same picture quality as for the second embodiment.

As shown in FIG. 41, it is preferable for the width of the openings of the through-holes in the X-axis direction to be formed to be larger at the end sections of the color layers and then become smaller upon moving further away from the end sections. In other words, this shape is such that part of the color layer can be represented as a bitten off shape. As it is then possible to prevent the color layers from having acute angles, not only do the shapes of the through-holes become straightforward, but it is also possible to reduce irregularities of the shape within the plane and uniform displaying can be implemented.

In this embodiment, an explanation is given where the shapes of the openings of the through-holes are stepped shapes but the present invention is by no means limited in this respect and can similarly be applied through-hole shapes where the widths of the openings in the Y-axis direction change in step shapes with respect to the X-axis direction.

The following is a summary of the above eleventh embodiment of the present invention. The display panel of this embodiment comprises a plurality of display units including at least pixels for displaying a first viewpoint image and pixels for displaying a second viewpoint image arranged in the shape of a matrix, an optical member, for splitting in mutually different directions light emitted from each pixel within the display unit provided along a first direction along which the pixels for displaying the first viewpoint image and the pixels for displaying the second viewpoint image are arranged;

The width of the through-hole in a second direction orthogonal to the first direction for the display plane of the display panel changes in a stepped shape according to the position in the first direction, and the optical member does not have an image-forming relationship with the pixels. In the present invention, it is then possible to reduce the influence of the through-holes and suppress color aberrations by displaying with the through-hole images in a gradated manner. The degree of freedom of arraying the through-holes is therefore increased and it is possible to implement high quality displaying. The operation and effects of the eleventh embodiment other than those described above are the same as for the seventh embodiment.

Figure 43:
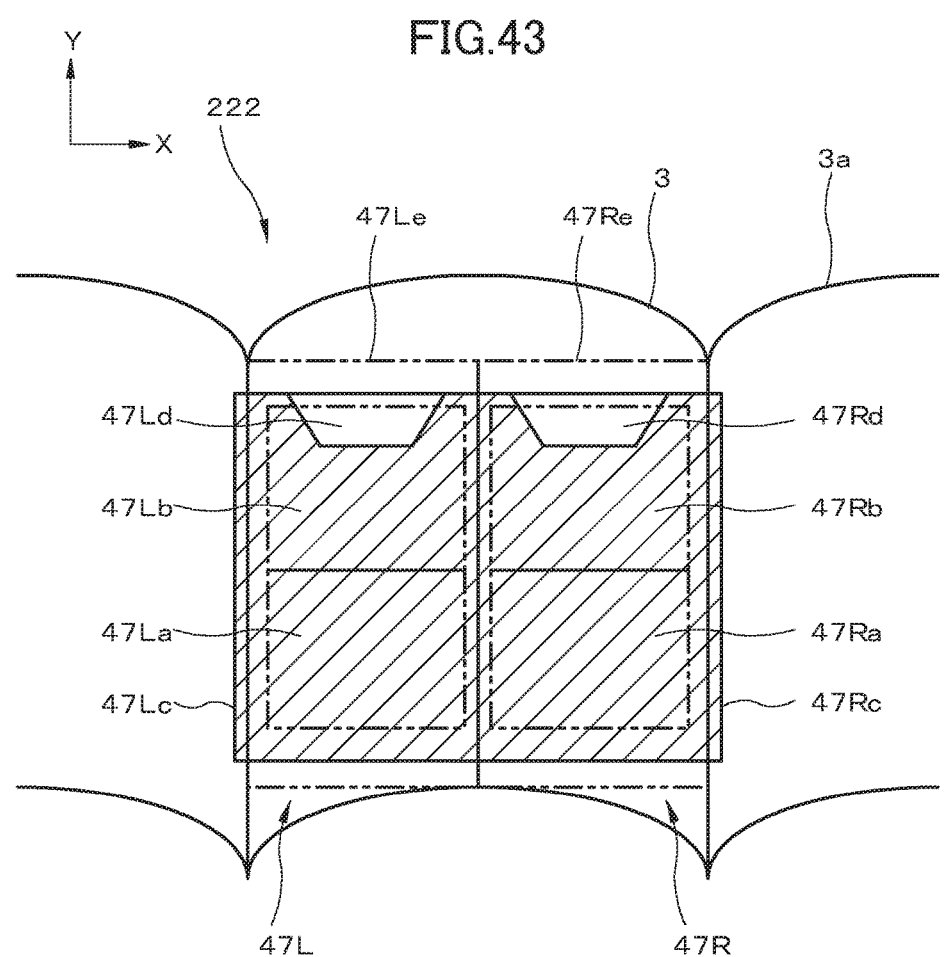
FIG. 43 A plan view showing a display panel of a twelfth embodiment of the present invention.
Figure 44:
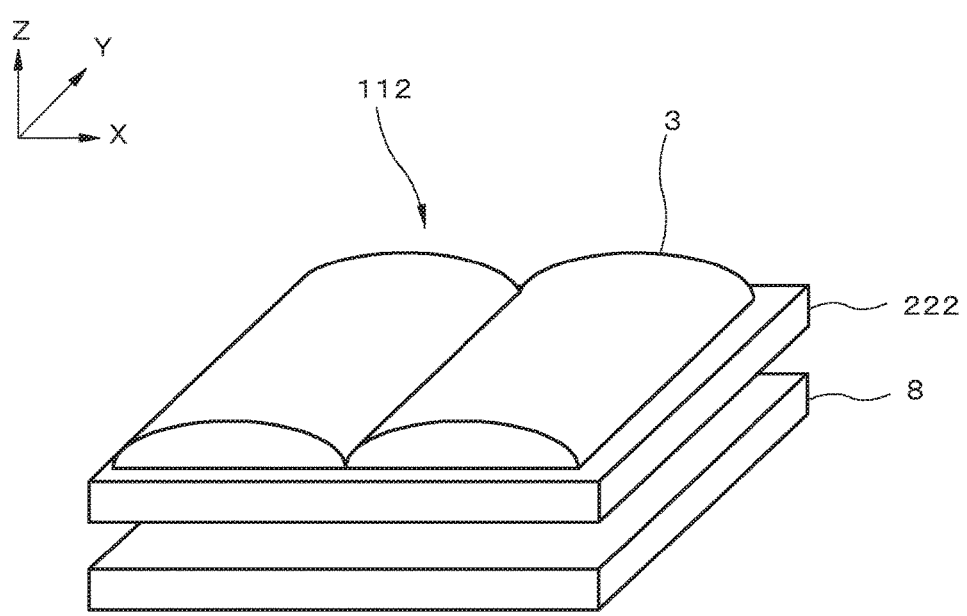
FIG. 44 A perspective view showing a display device of this embodiment.

Next, a description is given of a twelfth embodiment of the present invention. FIG. 43 is a plan view showing a display panel of this embodiment. FIG. 44 is a perspective view showing a display device of this embodiment. As shown in FIGS. 43 and 44, a semi-transmissive type liquid crystal display panel 222 and a display device 112 of this twelfth embodiment differ compared to the semi-transmissive type liquid crystal display panel 22 and the display device 12 disclosed for the second embodiment in that a left eye pixel 47L and a right eye pixel 47R are used.

At the left eye pixel 47L, the shape of through-hole 47Ld provided at the color layer 47Lc is different to that of the second embodiment. Specifically, the shape of the through-hole 47Ld is an inverted trapezoid. That is, the through-hole 47 is trapezoidal with a lower base positioned at an end side of the color layer. The through-hole is formed in such a manner that the color layer 47Lc is present at a corner section of the reflective region 47Lb. The same also applies for the right eye pixel 47R. The configuration of this embodiment other than that described above is the same as for the second embodiment. The configuration of this embodiment other than that described above is the same as for the second embodiment.

In this embodiment, the through-holes are arranged so as to exclude a corner section of the display regions of the pixels. That is, the through-holes are formed in such a manner that color layers exists at the corner sections of the regions used in pixel displaying. Typically, a color resist for forming a color layer is formed to a certain extent of the thickness. This thickness depends on the density of the colors to be implemented but have recently tended to increase in order to display broad color bands. Specifically, the thickness of a color resist forming a color layer is 2 micrometers for a liquid crystal of a thickness of 3 to 4 micrometers. This causes a substantial discrepancy for the structure for the thickness direction at the through-holes and their surroundings. A flat layer is therefore introduced in order to reduce this discrepancy. However, it is not possible to completely reduce this discrepancy and there is therefore a slight difference in the thickness of the liquid crystal layer at the through-hole portions and the color layer portions. This is to say that the thickness of the liquid crystal layers is greater than that of the through-hole sections were the color layers do not exist.

Next, taking note of the corner section of the region used in pixel displaying, this region is a point of inflection and there is therefore a tendency for irregular orientation of the liquid crystal to easily occur. In particular, when the light shielding region is formed of an organic layer such as black resist rather than being formed from a metal layer, steps occur at an intersection of the light shielding region. There is a tendency for abnormal orientation of the liquid crystal to be caused by the influence of the steps. In particular, the probability of abnormal orientation occurring at corner portions is higher than that is for at linear sections.

In this embodiment, through-holes are formed except for at a corner section where the probability of abnormal orientation of the liquid crystal occurring is high. As a result, it is possible to reduce abnormal orientation of the liquid crystal in cases where through-holes are formed at corner sections of pixels and cases where an end section of a through-hole is formed at a corner section of a pixel. It is therefore possible to improve displaying quality. The operation and effects of the twelfth embodiment other than those described above are the same as for the second embodiment.

Figure 45:
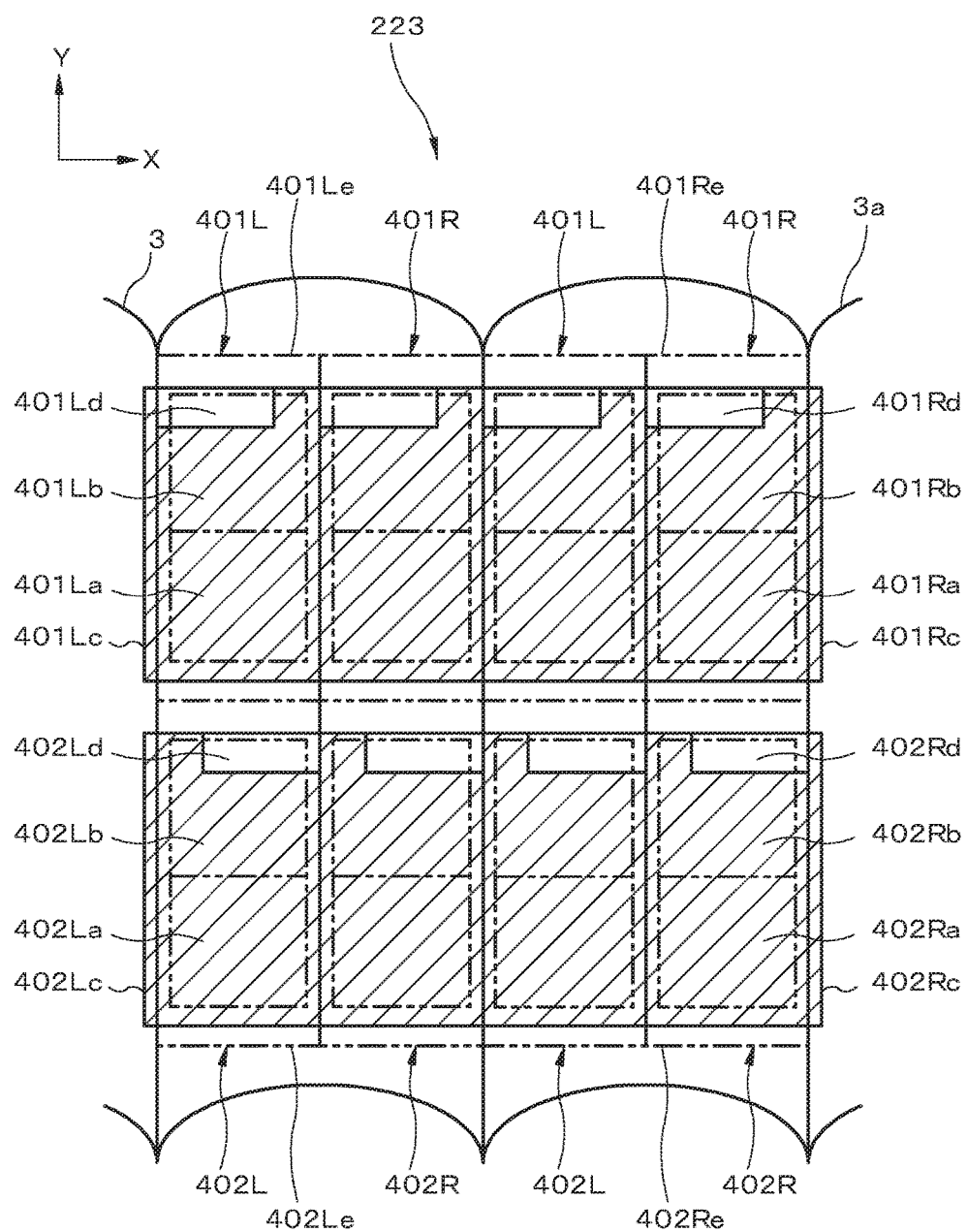
FIG. 45 A plan view showing a display panel of a thirteenth embodiment of the present invention.
Figure 46:
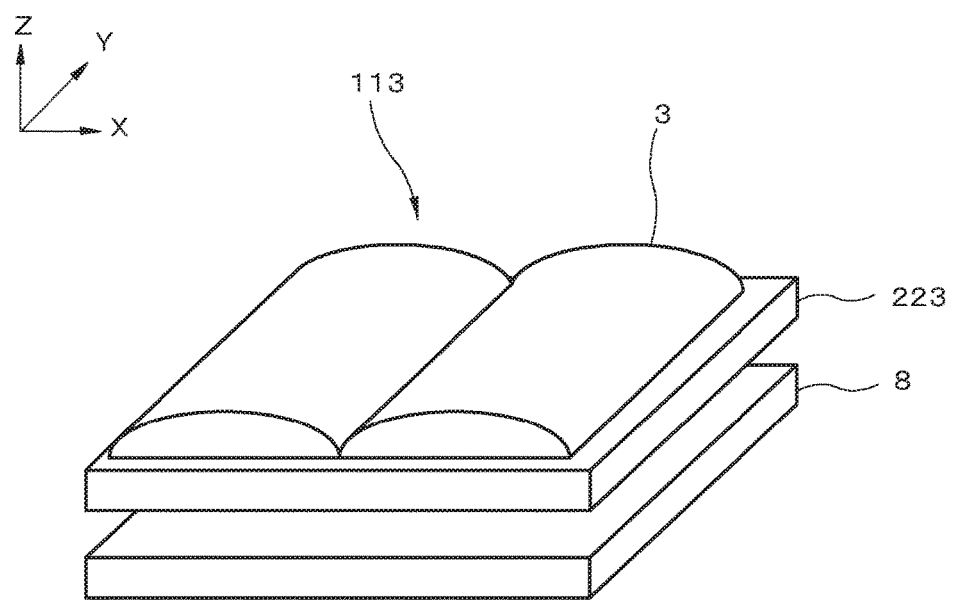
FIG. 46 A perspective view showing a display device of this embodiment.

Next, a description is given of a thirteenth embodiment of the present invention. FIG. 45 is a plan view showing a display panel of this embodiment. FIG. 46 is a perspective view showing a display device of this embodiment. As shown in FIGS. 45 and 46, a semi-transmissive type liquid crystal display panel 223 and a display device 113 of the thirteenth embodiment differ compared to the semi-transmissive type liquid crystal display panel 2 and the display device 1 of the first embodiment in that two types of left eye pixel 401L and 402L and two types of right eye pixel 401R and 402R are used.

The structure of the left eye pixel 401L is the same as the structure of the right eye pixel 401R. Similarly, the structure of the left eye pixel 402L is the same as the structure of the right eye pixel 402R. The left eye pixel 401L and the right eye pixel 401R constitute a set that forms a display unit. Display units constituted by the left eye pixel 401L and the right eye pixel 401R are repeatedly arranged along the X-axis direction that is the direction of arraying of the cylindrical lenses. The left eye pixel 402L and the right eye pixel 402R also constitute a set that forms a display unit. Display units constituted by the left eye pixel 402L and the right eye pixel 402R are repeatedly arranged along the X-axis direction that is the direction of arraying of the cylindrical lenses. Rows of display units constituted by the left eye pixel 401L and the right eye pixel 401R and rows of display units that are constituted by the left eye pixel 402L and the right eye pixel 402R are arranged alternately along the Y-axis direction.

At the left eye pixel 401L, the through-hole 401Ld is only formed at a region for part of the pixel. Specifically, the through-holes are arranged divided along the X-axis direction with respect to the left eye pixel 4L of the first embodiment. For example, rectangular-shaped through-holes are arranged discontinuously in the X-axis direction. The positions of the rectangular through-holes, i.e. the relative positions of the through-holes at each pixel are different at the left eye pixel 401L and the left eye pixel 402L. In particular, the relative positions in the X-axis direction are different. In one example, the relative positions of the through-holes 401Ld at the left eye pixels 401L are symmetrical about the Y-axis to the relative positions of the through-holes 402Ld at the left eye pixels 402L, i.e. are symmetrical with respect to an axis extending in a direction orthogonal to the direction of arraying of the cylindrical lenses. The configuration of this embodiment other than that described above is the same as for the first embodiment.

In this embodiment, the influence of the through-holes can be compensated for and high picture quality is possible by using rows of display units including the left eye pixel 401L and the right eye pixel 401R and rows of display units including the left eye pixel 402L and the right eye pixel 402R arranged alternately along the Y-axis direction.

That is, the position of the through-hole 401Ld at the left eye pixel 401L in the X-axis direction is different from the position of the through-hole 402Ld at the left eye pixel 402L in the X-axis direction. A position of an image for the through-hole 401Ld projected at the observation plane by the lenticular lens and the position of an image of the through-hole 402Ld are different. It is therefore possible to prevent the phenomenon of the positions of the images of the through-holes being the same for all pixels, and it is possible to reduce the influence of the through-holes. In other words, display units neighboring in a second direction that is orthogonal within a display plane with respect to the first direction that is the splitting direction of the optical member such as the lens has pixels where the relative positions of the through-holes are different. It is therefore possible to compensate for the influence of the through-holes using pixels neighboring along the second direction.

In each of the first to twelfth embodiments, it is assumed that all of the pixels have the same structure. In this regard, this embodiment is characterized by the point that different pixel structures are adopted and the influence of through-holes is reduced.

This embodiment is particularly suited to display panels using thin-film transistors. This embodiment is particularly suited to being applied to changing the positions of thin-film transistors in row units in cases where the positions of the through-holes are restricted for thin-film transistors and storage capacitors used in combination with thin-film transistors. For example, by arranging the positions of thin-film transistors etc. within the pixels symmetrically about a Y-axis in line units, appropriate combination with the positions of the through-holes of this embodiment is possible.

In this embodiment, the positions of the through-holes are configured in the same manner at the left eye pixels and the right eye pixels constituting each display unit. That is, the relative positions of the through-holes are the same for pixels constituting each display unit. It is therefore possible to make the pixels viewed by the left eye and the pixels viewed by the right eye the same. This makes it possible to dramatically reduce the feeling of discomfort. This is extremely effective in cases where it is wished to implement two-dimensional displaying by displaying the same information at the left eye pixel and the right eye pixel constituting each display unit.

In this embodiment, it is possible to reduce the effect of the through-holes by arraying pixels of different through-hole positions along the Y-axis direction. This is extremely effective with multiple viewpoints where it is necessary to arrange a large number of pixels in the X-axis direction. In other words, in this embodiment, an explanation is given for the case of two viewpoints where the display units are constructed from two types of left eye pixel and right eye pixel. However, when the number of viewpoints is increased, it is necessary to arrange a large number of pixels along the X-axis direction, i.e. along the direction of arraying of the cylindrical lenses.

For example, when a large number of multiple viewpoint display pixels are arranged within a square region, the pixel density in the X-axis direction becomes high. It is therefore difficult to array pixels having different through-hole positions along the X-axis direction. It is therefore preferable to arrange pixels having different through-hole positions along the Y-axis direction as in this embodiment, and high image quality is therefore possible.

When multiple viewpoint display pixels are arranged without restriction within a square region, i.e. when implementing multiple viewpoint display without increasing the pixel density in the X-axis direction, the pitch of the display units in the X-axis direction becomes fine, and a sufficient compensation effect can no longer be obtained. It is therefore preferable to compensate using pixels neighboring in the Y-axis direction as in this embodiment.

Regarding the arrangement of the color pixels, when pixels for, for example, the three colors of red, green, and blue are arranged in the form of lateral stripes, the positions of through-holes for the pixels for red and green neighboring on the Y-axis direction are different but the positions of the through-holes for the blue pixels neighboring the green pixels are the same as for the red pixels. The positions of the through-holes for the red pixels neighboring the blue pixels are different to the positions of the through-holes for the blue pixels. As a result, when only pixels of the same color are given color, pixels where the positions of the through-holes are different are arranged alternately. That is, the relationship between the number of pixels for which the through-hole positions are different and the number of colors for the color pixels should at least be that the numbers are not the same. More specifically, a relationship where the values do not match with each other is preferable. This means that compensation effects can effectively be demonstrated using pixels that carry out the same role even with pixels that are not directly next to each other.

The heights of the openings of the through-holes, i.e. the widths of the openings of the through-holes in the Y-axis direction can be different depending on the type of color. This is to say that in the present invention, an important point is that pixels exist where the positions of the through-holes are different for the X-axis direction that is the direction of splitting the lenses.

In this embodiment, an explanation is given of using two types of pixels where the positions of the through-holes are different. However, the present invention is by no means limited in this respect and a large number of types of pixels can also be used. The operation and effects of the thirteenth embodiment other than those described above are the same as for the first embodiment.

Figure 47:
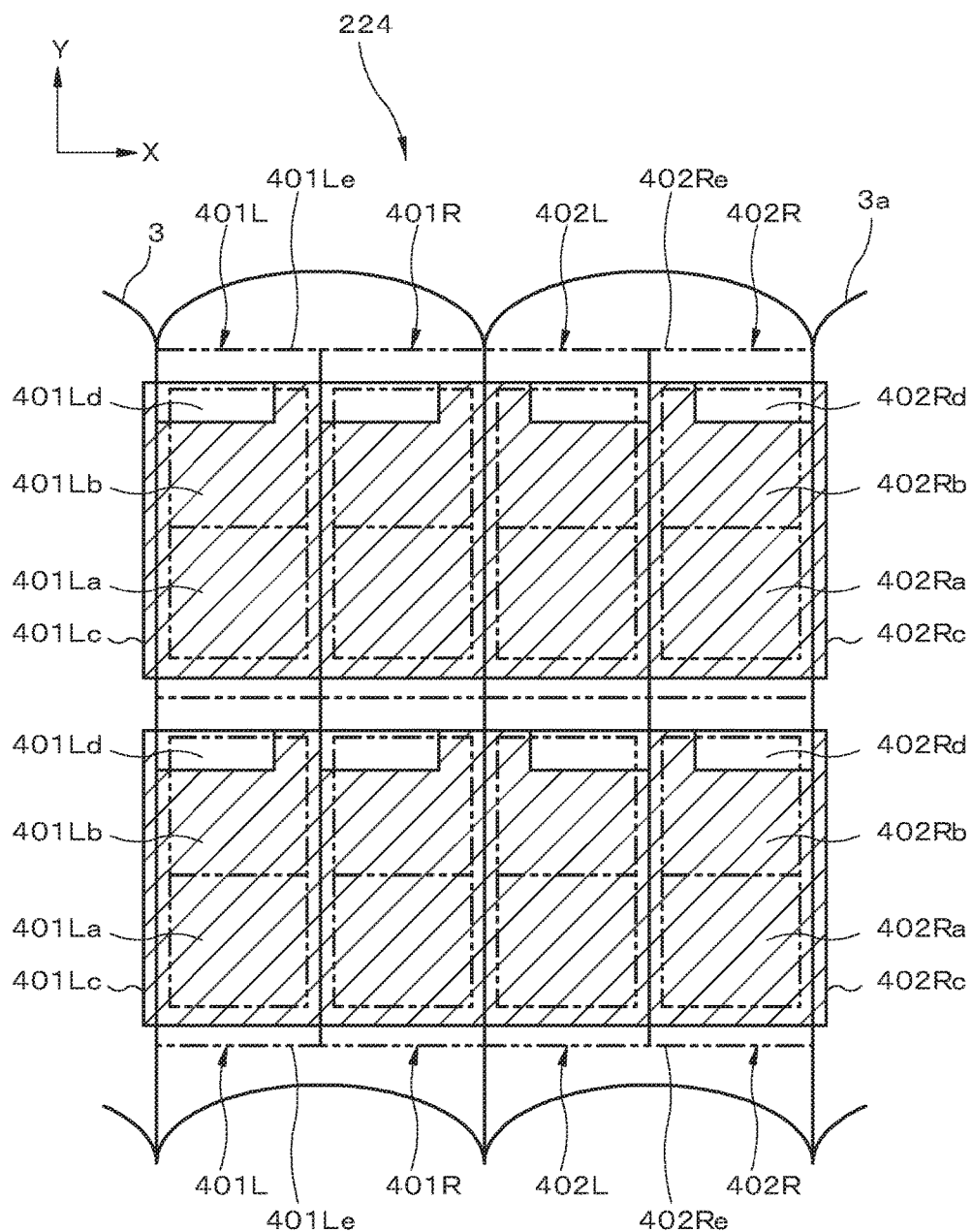
FIG. 47 A plan view showing a display panel of a fourteenth embodiment of the present invention.
Figure 48:
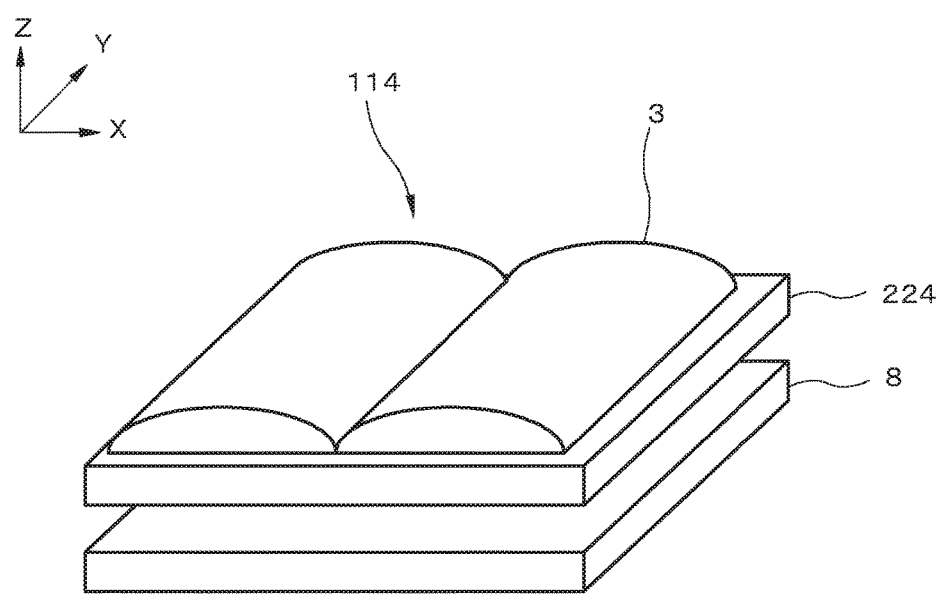
FIG. 48 A perspective view showing a display device of this embodiment.

Next, an explanation is given of a fourteenth embodiment of the present invention. FIG. 47 is a plan view showing a display panel of this embodiment. FIG. 48 is a perspective view showing a display device of this embodiment. As shown in FIGS. 47 and 48, a semi-transmissive type liquid crystal display panel 224 and a display device 114 of the fourteenth embodiment differ from the semi-transmissive type liquid crystal display panel 223 and the display device 113 disclosed in the thirteenth embodiment with regards to the arrangement of the left eye pixels and the right eye pixels. The point that two types of left eye pixel 401L and 402L are used, and two types of right eye pixel 401R and 402R are used is the same but display units that are constructed from the left eye pixel 401L and the right eye pixel 401R are arranged repeatedly along the Y-axis direction. Display units constructed from the left eye pixel 402L and the right eye pixel 402R are repeatedly arranged along the Y-axis direction. This is to say that columns of the two types of display units are arranged alternately in the X-axis direction. The configuration of this embodiment other than that described above is the same as for the thirteenth embodiment.

The influence of through-holes is compensated for in this embodiment by using display units neighboring in the X-axis direction. That is, display units neighboring in the first direction that is the direction of splitting of the optical member such as a lens have pixels where the relative positions of the through-holes are different. This means that the same pixels are arranged in the Y-axis direction. Use is therefore possible where arrangements of lateral stripes of colors can be combined as preferred and arrangement is possible independent of the type of color and type of pixel. This is preferable from the point of making the displaying uniform. In particular, when there are more types of color layers than there are viewpoints, application is possible for, for example, cases such as three colors for two viewpoints, as preferred. This is because the number of pixels in the X-axis direction is smaller than the number of pixels in the Y-axis direction.

It is preferable for the direction in which pixels where the positions of the through-holes are the same are repeatedly arranged to be orthogonal to the direction where pixels of the same color are repeatedly arranged in order for the displaying to be made uniform. It is also preferable for the direction where pixels of the same color are repeatedly arranged to be the same as the direction of arraying of the lenses. This is in order to prevent the occurrence of separation of colors due to the lens working. It is therefore preferable for the direction where pixels where the positions of the through-holes are the same are repeatedly arranged to be orthogonal to the direction of arraying of the lenses. When this is not the case, as disclosed in the thirteenth embodiment, the number of pixels where the positions of the through-holes are different and the number of colors for the color pixels become restricted. The operation and effects of the fourteenth embodiment other than those described above are the same as for the thirteenth embodiment.

Figure 49:
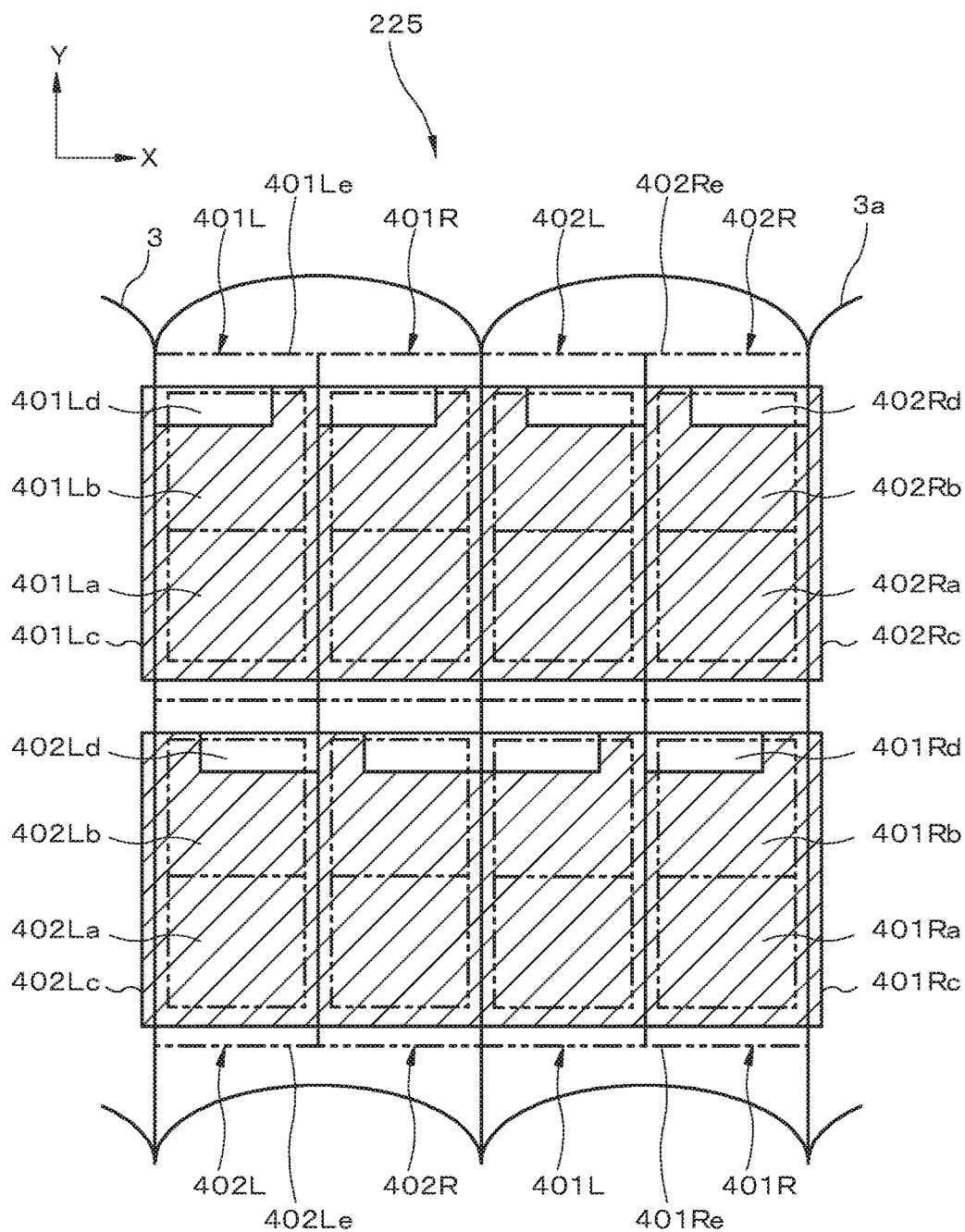
FIG. 49 A plan view showing a display panel of a fifteenth embodiment of the present invention.
Figure 50:
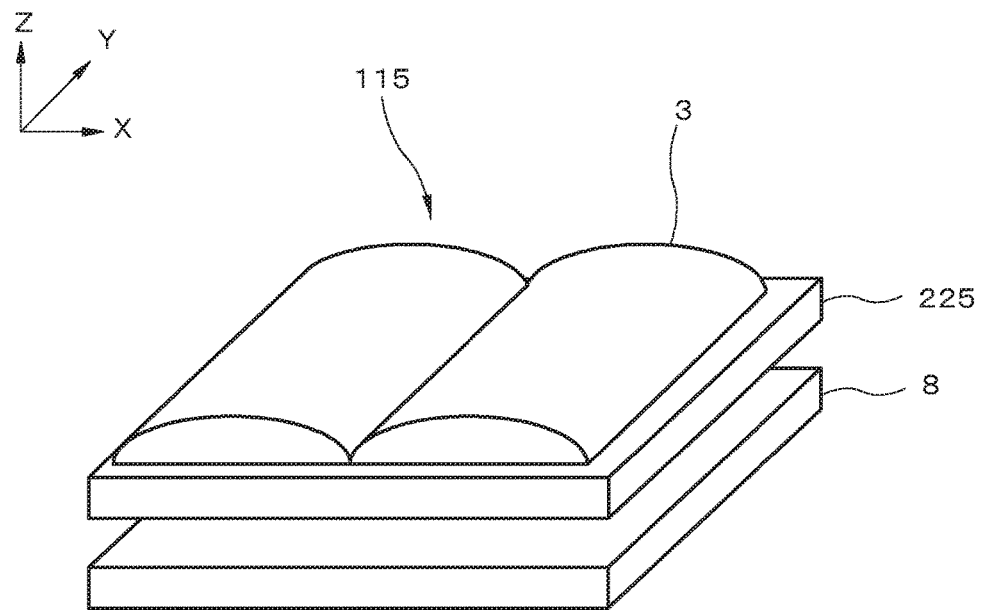
FIG. 50 A perspective view showing a display device of this embodiment.

Next, a description is given of a fifteenth embodiment of the present invention. FIG. 49 is a plan view showing a display panel of this embodiment. FIG. 50 is a perspective view showing a display device of this embodiment. As shown in FIGS. 49 and 50, a semi-transmissive type liquid crystal display panel 225 and a display device 115 of the fifteenth embodiment differ from the semi-transmissive type liquid crystal display panel 223 and the display device 113 disclosed in the thirteenth embodiment with regards to the arrangement of the left eye pixels and the right eye pixels.

That is, display units constructed from the left eye pixel 401L and the right eye pixel 401R and display units constructed from the left eye pixel 402L and the right eye pixel 402R are arranged in a checkered pattern. In other words, the two types of display units are alternately arranged along the Y-axis direction rather than being alternately arranged along the X-axis direction. The structure of the fifteenth embodiment other than that described above is the same as for the thirteenth embodiment.

In this embodiment, the influence of the through-holes is reduced by using not only display units arranged along the X-axis direction, but also display units arranged along the Y-axis direction. That is, display units neighboring in the first direction that is the direction of splitting of the optical member such as a lens have pixels where the relative positions of the through-holes are different, and display units neighboring along a second direction orthogonal to the first direction within the display plane also have pixels where the relative positions of the through-holes are different. It is therefore possible to increase the compensation effects from those of the thirteenth embodiment and high picture quality is possible. The operation and effects of the fifteenth embodiment other than those described above are the same as for the thirteenth embodiment.

Figure 51:
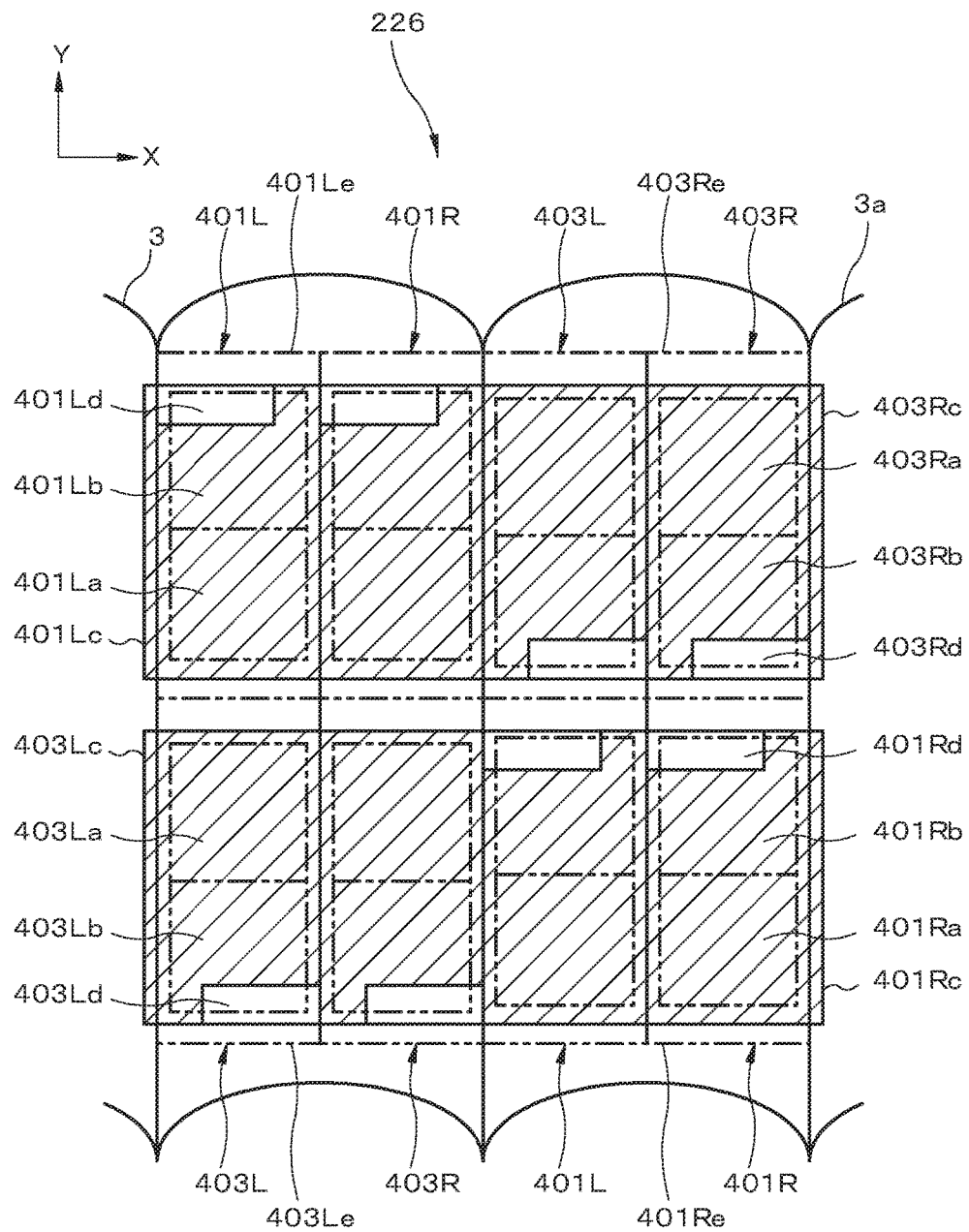
FIG. 51 A plan view showing a display panel of a sixteenth embodiment of the present invention.
Figure 52:
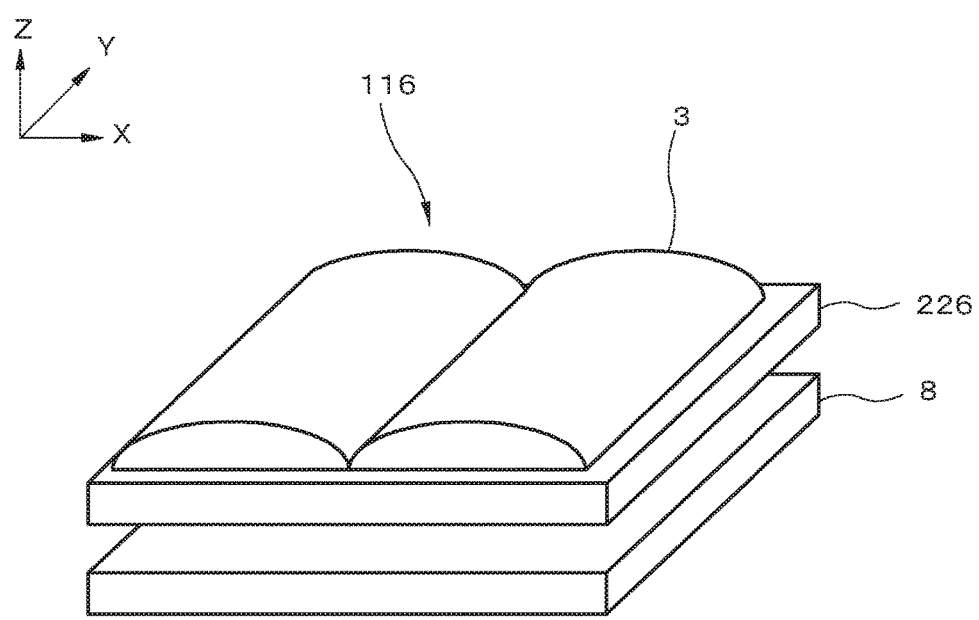
FIG. 52 A perspective view showing a display device of this embodiment.

Next, a description is given of a sixteenth embodiment of the present invention. FIG. 51 is a plan view showing a display panel of this embodiment. FIG. 52 is a perspective view showing a display device of this embodiment. As shown in FIGS. 51 and 52, a semi-transmissive type liquid crystal display panel 226 and a display device 116 of the sixteenth embodiment differ from the semi-transmissive type liquid crystal display panel 225 and the display device 115 disclosed in the fifteenth embodiment with regards to the arrangement of the left eye pixels and the right eye pixels. That is, the point of using the left eye pixel 401L and the right eye pixel 401R is the same but the point of using a left eye pixel 403L and a right eye pixel 403R is different. The left eye pixel 403L is arranged so as to be rotationally symmetrical through 180 degrees with respect to the left eye pixel 401L. The right eye pixel 403R is arranged so as to be rotationally symmetrical through 180 degrees with respect to a right eye pixel 403L. Display units constructed from the left eye pixel 401L and the right eye pixel 401R and display units constructed from the left eye pixel 403L and the right eye pixel 403R are also arranged in a checkered pattern as with the fourteenth embodiment. The structure of the sixteenth embodiment other than that described above is the same as for the fifteenth embodiment.

In this embodiment, it is possible to demonstrate a two-dimensional compensation effect by arranging two types of display units in a checkered pattern and high picture quality is therefore possible. Further, through-holes of neighboring pixels are arranged in close proximity. It is therefore possible to suppress abnormal alignment of the liquid crystal caused by steps between the through-holes and their surroundings and high picture quality is therefore possible. The operation and effects of the sixteenth embodiment other than those described above are the same as for the fifteenth embodiment.

Figure 53:
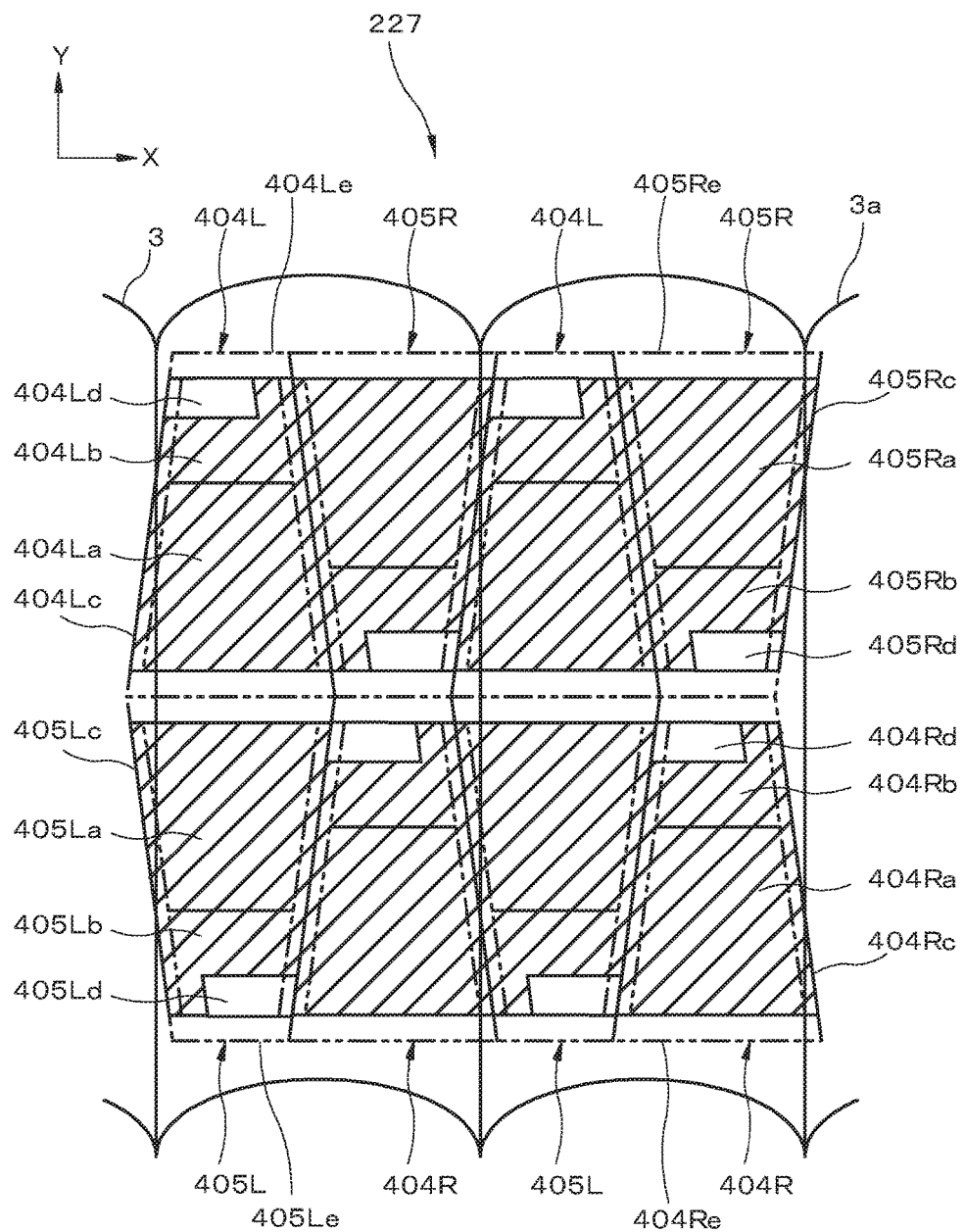
FIG. 53 A plan view showing a display panel of a seventeenth embodiment of the present invention.
Figure 54:
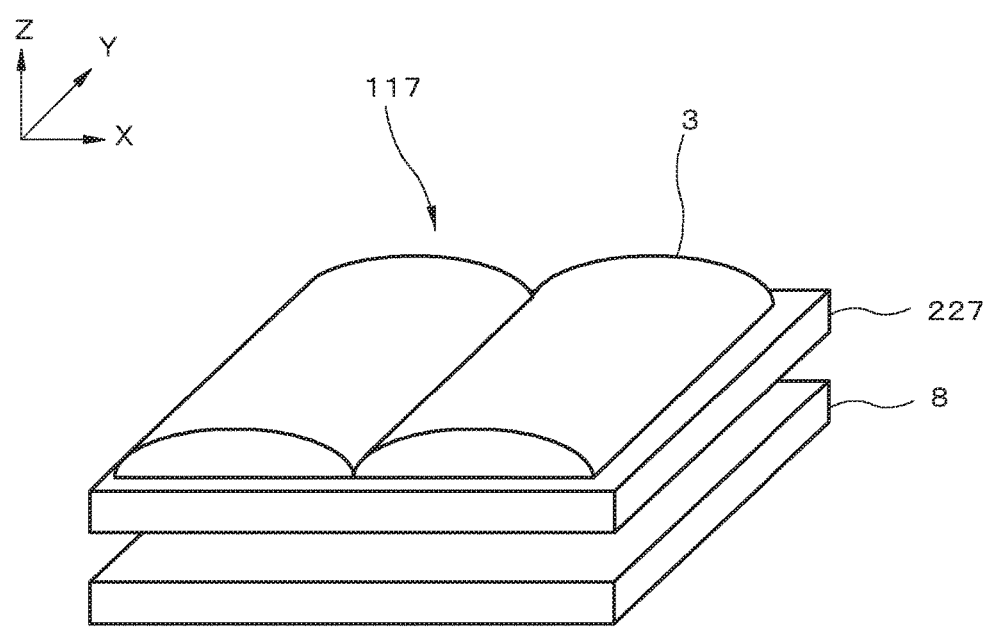
FIG. 54 A perspective view showing a display device of this embodiment.

Next, a description is given of a seventeenth embodiment of the present invention. FIG. 53 is a plan view showing a display panel of this embodiment. FIG. 54 is a perspective view showing a display device of this embodiment. As shown in FIGS. 53 and 54, a semi-transmissive type liquid crystal display panel 227 and a display device 117 of the seventeenth embodiment substantially differ compared to the semi-transmissive type liquid crystal display panel 226 and the display device 116 of the sixteenth embodiment with regards to the shape and arrangement of the pixels.

Regarding the shape of the pixels, whereas the basic elements of the previous embodiments were rectangular, the basic element of this embodiment is trapezoidal. Here, referring to the basic element as being trapezoidal means that the shapes of the display regions of the pixels are trapezoidal.

Specifically, at a left eye pixel 404L, a light shielding region positioned at the boundary with a pixel neighboring along an X-axis direction is arranged so as to be inclined from the Y-axis direction. A light shielding region positioned at the boundary with the pixel neighboring on the left side is then arranged so as to be inclined in a direction at an opposing angle to that of the light shielding region positioned at the boundary with the pixel neighboring to the right side. A trapezoidal oblique side section is therefore formed, and a display region for the pixels is formed in the shape of a trapezoid. This is to say that a transmission region 404La is a trapezoid and a reflective region 404Lb is also a trapezoid. The shape of a color layer 404Lc is the same as for the other embodiments with the exclusion of the through-hole section. A through-hole 404Ld is a trapezoid and is arranged in the vicinity of the approach of the display region that is trapezoidal. The through-hole 404Ld is arranged offset towards the −X direction rather than in the vicinity of the center of the upper edge in the X-axis direction.

The right eye pixel 405R is arranged so as to be rotationally symmetrical through 180 degrees with respect to the left eye pixel 404L. A display pixel is then formed by a left eye pixel 404L and the right eye pixel 405R.

Similarly, the left eye pixel 405L is arranged so as to be rotationally symmetrical through 180 degrees with respect to the left eye pixel 404L. A right eye pixel 404R is arranged so as to be rotationally symmetrical through 180 degrees with respect to a right eye pixel 405L. That is, the left eye pixel 404L and the right eye pixel 404R have the same pixel structure but their positional relationship with respect to the lens is different. Similarly, the pixel structure for a left eye pixel 405L and the right eye pixel 405R is the same but their positional relationship with respect to the lens is different. A display pixel is then formed by the left eye pixel 405L and the right eye pixel 404R.

Next, an explanation is given of the arrangement of the two types of display pixels. Display elements constructed from the left eye pixel 404L and the right eye pixel 405R are arranged at the −Y direction side of display elements constructed from the left eye pixel 404L and the right eye pixel 405R. The left eye pixel 405L is arranged so as to be rotationally symmetrical through 180 degrees with respect to the left eye pixel 404L. The upper sides of the trapezoidal pixels are therefore also simply arranged in a relative manner. Similarly, the lower side of the right eye pixel 405R is also arranged relative to the lower side of the right eye pixel 404R.

Display elements constructed from the left eye pixel 404L and the right eye pixel 405R are arranged at the +Z direction side of display elements constructed from the left eye pixel 404L and the right eye pixel 405R. Display elements constructed from the left eye pixel 404L and the right eye pixel 405R are arranged at the −Y direction side of display elements constructed from the left eye pixel 404L and the right eye pixel 405R.

In the X-axis direction that is the image splitting direction of the cylindrical lenses, light shielding regions arranged at the boundary of the neighboring pixel are arranged so as to be inclined from the Y-axis direction. The direction of this inclination is alternately made the reverse direction every one pixel for the pixels neighboring in the Y-axis direction. As a result, the light shielding regions extending along the Y-axis direction constitute a zigzag line extending along the Y-axis direction. This zigzag line and a further zigzag line arranged line-symmetrically to this zigzag line with respect to the Y-axis are alternately arranged along the X-axis direction.

A further feature of this embodiment is that a left eye pixel and a right eye pixel occurring within a display unit are not arranged in parallel. For example, the right eye pixel 405R is arranged rotationally symmetrically through 180 degrees with respect to the left eye pixel 404L at a display unit constructed from the left eye pixel 404L and the right eye pixel 405R. This is to say that this display unit has pixels that are arranged with a rotationally symmetrical relationship.

Originally, it was not desirable to use pixels arranged differently within display units. This is because pixels that are in different states for the left eye and the right eye are then viewed. In this embodiment, this problem is resolved by employing compensation using neighboring display units.

In this embodiment, display elements constructed from the left eye pixel 405L and the right eye pixel 404R are arranged at the −Y direction side of display elements constructed from the left eye pixel 404L and the right eye pixel 405R. Taking note of these two types of display units, the left eye pixel 404L has the same structure as the right eye pixel 404R. The left eye pixel 405L then has the same structure as the right eye pixel 405R. Pixels of the same structure are then arranged by lining up to neighboring display units. This is an idea for compensation using neighboring display pixels.

The through-holes for each pixel are arranged with a different structure for the pixels constituting each display unit. This arrangement is so that compensation using neighboring display units is possible. The structure of the seventeenth embodiment other than that described above is the same as for the sixteenth embodiment.

In this embodiment, it is possible to demonstrate two-dimensional compensation effects. The influence of the through-holes can therefore be reduced and high-quality displaying is possible. Further, the display regions for each pixel are trapezoidal. It is therefore possible to reduce the influence of non-displaying regions existing between neighboring pixels along the X-axis direction that is the direction of splitting of the lenses and improved visibility is possible. It is also possible to arrange the wiring and the thin-film transistors more effectively. This makes it possible to ensure that the regions contributing to displaying are large and bright displaying is therefore possible. Arrangement not only of through-holes at vertically neighboring pixels but also the arrangement of reflective regions and transmission regions at close proximity is possible, and bright displaying is therefore also possible. In this embodiment, basically only one type of pixel is used and this one type of pixel is arranged rotationally symmetrically or is arranged line-symmetrically. This is to say that just one type of pixel is being used and the design load can therefore be reduced.

An explanation is given where the through-holes in this embodiment are trapezoidal. However, the present invention is by no means limited in this respect. In one example, it is also possible to use rectangular through-holes, it is possible to use through-holes in the shape of a parallelogram, or it is possible to use through-holes of a shape where a parallelogram is divided in two to the left and right. It is also possible for the through-holes to be arranged in the vicinity of the center income X-axis direction of an upper edge constituting a trapezoidal display region.

It is also possible to use a shape based on a trapezoid rather than using a perfect trapezoidal shape. In one example, it is also possible to apply a shape provided with a rectangle of the same width as the base at the base of the trapezoid. A structure formed using photolithography preferably does not have acute angles in order to achieve a uniform shape. With a shape where rectangles are arranged at the bases of trapezoids, it is possible to eliminate acute angles by forming using only obtuse angles and right-angles. This can be applied not only to the shape of the display regions for the pixels but also to the shapes of the through-holes.

An explanation is now given of an example arrangement for the color pixels. This embodiment can be handled in the same way as the case where pixels with through-holes the relative positions of which are different are alternately arranged along the Y-axis direction such as disclosed for the thirteenth embodiment. For example, consider the case for pixels for the three colors of red, green, and blue arranged as lateral stripe shapes. In FIG. 53, the left eye pixel 404L for the left end of a pixel row is for red, and a left eye pixel 405L neighboring this pixel in the −Y direction is for green. At this time, the positions of the through-holes for the red and green pixels are different. A left eye pixel 404L is then further arranged at the −Y direction side of the left eye pixel 405L. This left eye pixel 404L is then for blue, and position of the through-hole is the same as for the left eye pixel 404L for red on the +Y direction side. The left eye pixel 405L, the left eye pixel 404L, and the left eye pixel 405L, are then arranged in this order at the −Y direction side of the left eye pixel 404L for blue and are allocated to red, green, and blue, respectively. To summarize the above, the red left eye pixel 404L, the green left eye pixel 405L, the blue left eye pixel 404L, the red left eye pixel 405L, the green left eye pixel 404L, and the blue left eye pixel 405L are arranged in this order in a direction going from the +Y direction towards the −Y direction. This set is then repeatedly arranged in the Y-axis direction. As a result, when only pixels of the same color are given color, pixels where the positions of the through-holes are different are arranged alternately. This means that compensation effects can be effectively demonstrated using pixels that carry out the same role even with pixels that are not directly next to each other and high picture quality is possible. That is, the relationship between the number of pixels for which the through-hole positions are different and the number of colors for the color pixels should at least be that the numbers are not the same. More specifically, a relationship where the values do not match with each other is preferable.

At each of the display units, the positions of the through-holes of the left eye pixels are different from the positions of the through-holes of the right eye pixels. This is to say that a set of the right eye pixels corresponding to the set of left eye pixels described above is constituted by a red right eye pixel 405R, a green right eye pixel 404R, a blue right eye pixel 405R, a red right eye pixel 404R, a green right eye pixel 405R, and a blue right eye pixel 404R going in a direction from the +Y direction towards the −Y direction. The red left eye pixel 404L has exactly the same structure as the red right eye pixel 404R. That is, at the left eye pixel circuit, a pixel arrangement where the phase is offset in the Y-axis direction by just a portion for the RGB stripes constitutes the right eye pixel set. When this is considered as an RGB set, implementation is possible by arranging sets of the same structure so as to form a checkered pattern.

The operation and effects of the seventeenth embodiment other than those described above are the same as for the fifteenth embodiment.

Figure 55:
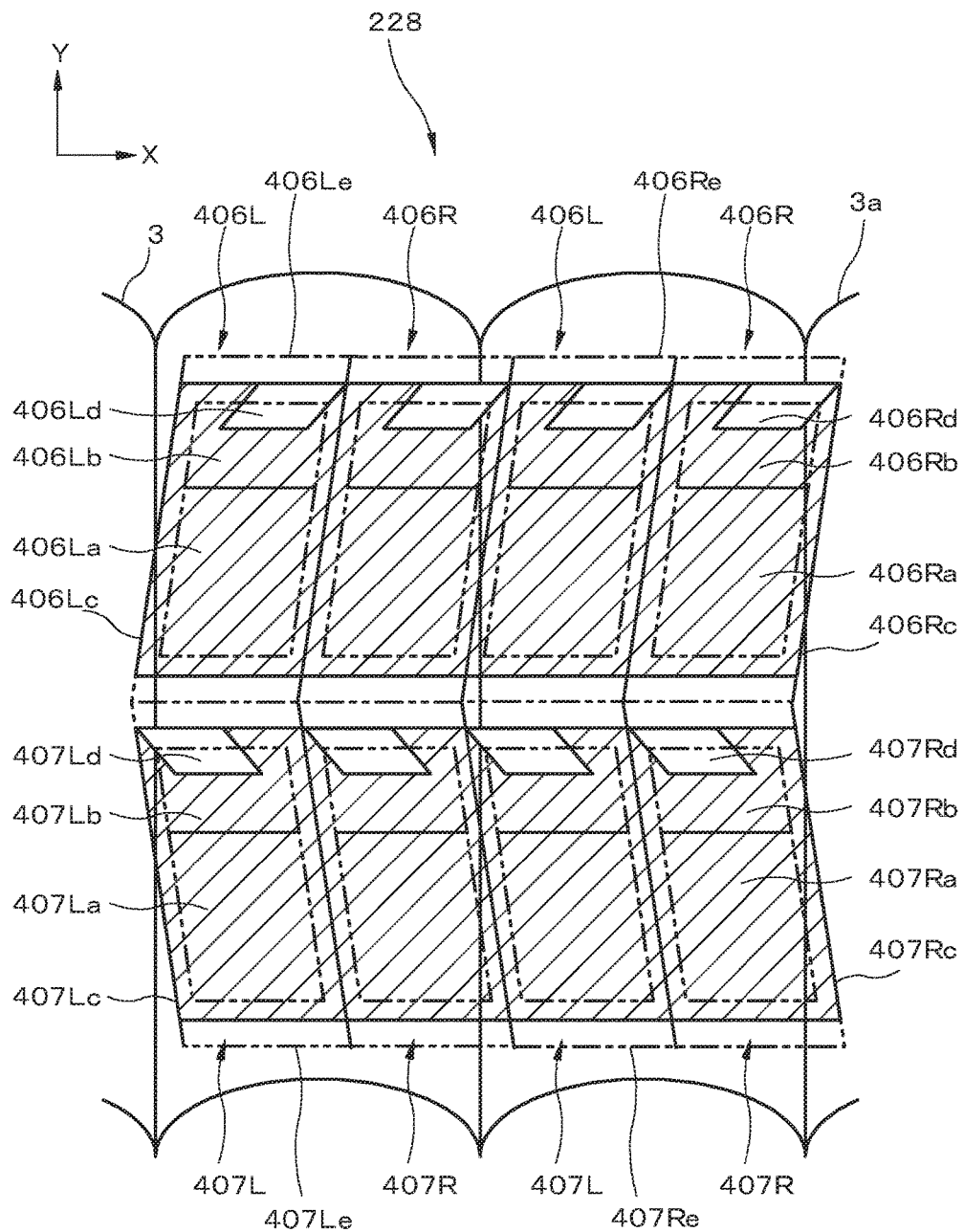
FIG. 55 A plan view showing a display panel of an eighteenth embodiment of the present invention.
Figure 56:
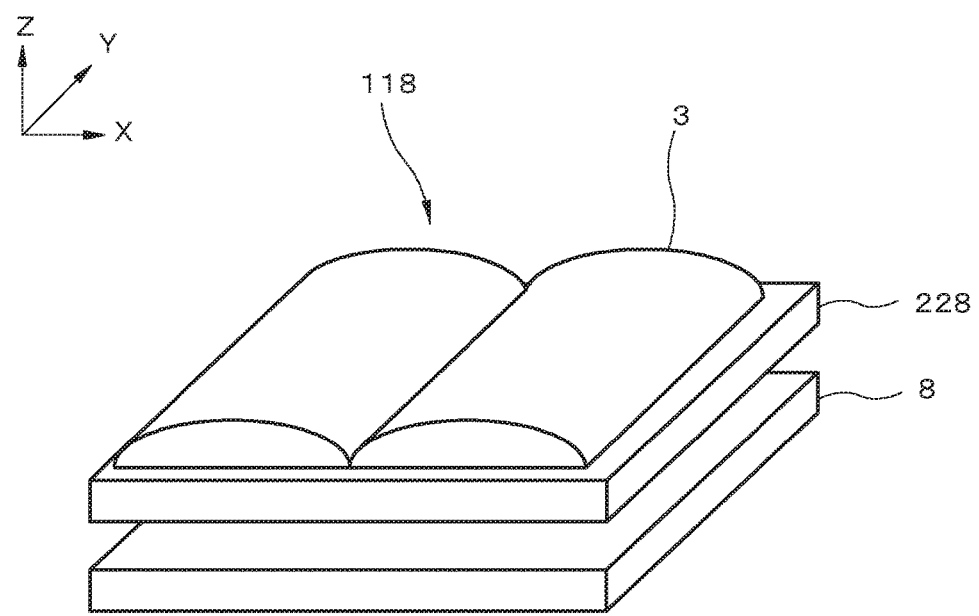
FIG. 56 A perspective view showing a display device of this embodiment.

Next, a description is given of an eighteenth embodiment of the present invention. FIG. 55 is a plan view showing a display panel of this embodiment. FIG. 56 is a perspective view showing a display device of this embodiment. As shown in FIGS. 55 and 56, a semi-transmissive type liquid crystal display panel 228 and a display device 118 of the eighteenth embodiment differ from the semi-transmissive type liquid crystal display panel 223 and the display device 113 disclosed in the thirteenth embodiment with regards to the shape of the pixels. The regularity of the arrangement of the pixels is however substantially the same.

Whereas each pixel of the seventeenth embodiment takes a trapezoid as a basic element, each pixel in this embodiment takes a parallelogram as a basic element. At a left eye pixel 406L, a transmission region 406La and a reflective region 406Lb are arranged, and the display region that is these regions combined is in the shape of a parallelogram. In this embodiment, the transmission region 406La is in the shape of a parallelogram, and the reflective region 406Lb is also in the shape of a parallelogram. This is to say that a light shielding region 406Lc is formed so that the display region, the transmission region, and the reflective region are all in the shape of a parallelogram. A color layer 406Lc is formed so that a through-hole 406Ld is also in the shape of the parallelogram.

A right eye pixel 406R and the left eye pixel 406L have the same structure. Display pixels are then formed by the left eye pixels 406L and the right eye pixels 406R. Display units constructed from the left eye pixels 406L and the right eye pixels 406R are then repeatedly arranged along the X-axis direction.

Display units constructed from left eye pixels 407L and right eye pixels 407R are then arranged at the −Y direction side of display units constructed from the left eye pixels 406L and the right eye pixels 406R. The left eye pixels 407L are then arranged symmetrically to the left eye pixels 406L with respect to the Y-axis. The right eye pixels 407R have the same structure as the left eye pixels 407L. Display units constructed from the left eye pixels 407L and the right eye pixels 407R are then repeatedly arranged along the X-axis direction. Display units constructed from the left eye pixels 406L and the right eye pixels 406R and display units constructed from the left eye pixels 407L and the right eye pixels 407R are then repeatedly arranged alternately along the Y-axis direction.

In this embodiment, when two through-holes are arranged on the same straight line by changing only a Y-coordinate without changing the X-coordinates of the through-hole 406Ld and the through-hole 407Ld, the heights of the openings of the through-holes, i.e. the widths in the Y-axis direction, are always fixed and do not depend on the position in the X-axis direction. The same is also the case for other through-holes. This is to say that this is characterized by utilizing display units neighboring along the Y-axis direction so that the width of the through-holes in the Y-axis direction is always fixed. In other words, the concept of neighboring pixel compensation disclosed in the thirteenth embodiment is utilized, and a structure that is the same as for the first embodiment, i.e. a structure where the width of the through-holes in the Y-axis direction is fixed regardless of the X-axis position is implemented. The structure of the eighteenth embodiment other than that described above is the same as for the thirteenth embodiment.

In this embodiment, the neighboring pixel compensation effect is utilized, and the actual height of the through-holes, i.e. the width in the Y-axis direction, is fixed regardless of the X-axis direction. It is therefore possible to reduce the influence of the through-holes and high-quality displaying is possible. A minimum size for the through-holes is usually defined using process conditions for the color layers. Cases can therefore occur where the through-holes become too large when the heights of the through-holes are fixed regardless of the X-axis position at each pixel unit as disclosed in the first embodiment of the present invention. This corresponds, for example, to cases such as panels where the definition is high. In this embodiment, the heights of the through-holes are held fixed collectively with the neighboring pixels. It is therefore possible to keep the size of the through-holes for each pixel small. This means that it is possible to implement reflective displaying of a high degree of color purity even in cases where the definition is high.

As in the seventeenth embodiment, it is possible to reduce the influence of non-displaying regions existing between neighboring pixels along the X-axis direction that is the direction of splitting of the lenses and improved visibility is possible. In the seventeenth embodiment, the light shielding regions extending along the Y-axis direction are in the form of a zigzag line extending along the Y-axis direction. This zigzag line and a further zigzag line line-symmetrical to this zigzag line with respect to the Y-axis are then arranged alternately along the X-axis direction. With regards to this, in this embodiment, the point that the light shielding region extending along the Y-axis direction is constituted by a zigzag line extending in the Y-axis direction is the same. However, the point that the same type of zigzag line is repeatedly arranged in the X-axis direction is different.

In the event of the application of a lateral stripe structure to the color filter, it is preferable for the number of types of pixels where the positions of the through-holes in the Y-axis direction are different and the number of colors for the color pixels to at least not be the same number. More specifically, a relationship where the values cannot be mutually divided is preferable, as in the thirteenth embodiment. This means that compensation effects can effectively be demonstrated using pixels that carry out the same role even with pixels that are not directly next to each other.

This embodiment can be similarly applied even to cases where each pixel takes a rectangle as a basic element. The operation and effects of the eighteenth embodiment other than those described above are the same as for the thirteenth embodiment.

Figure 57:
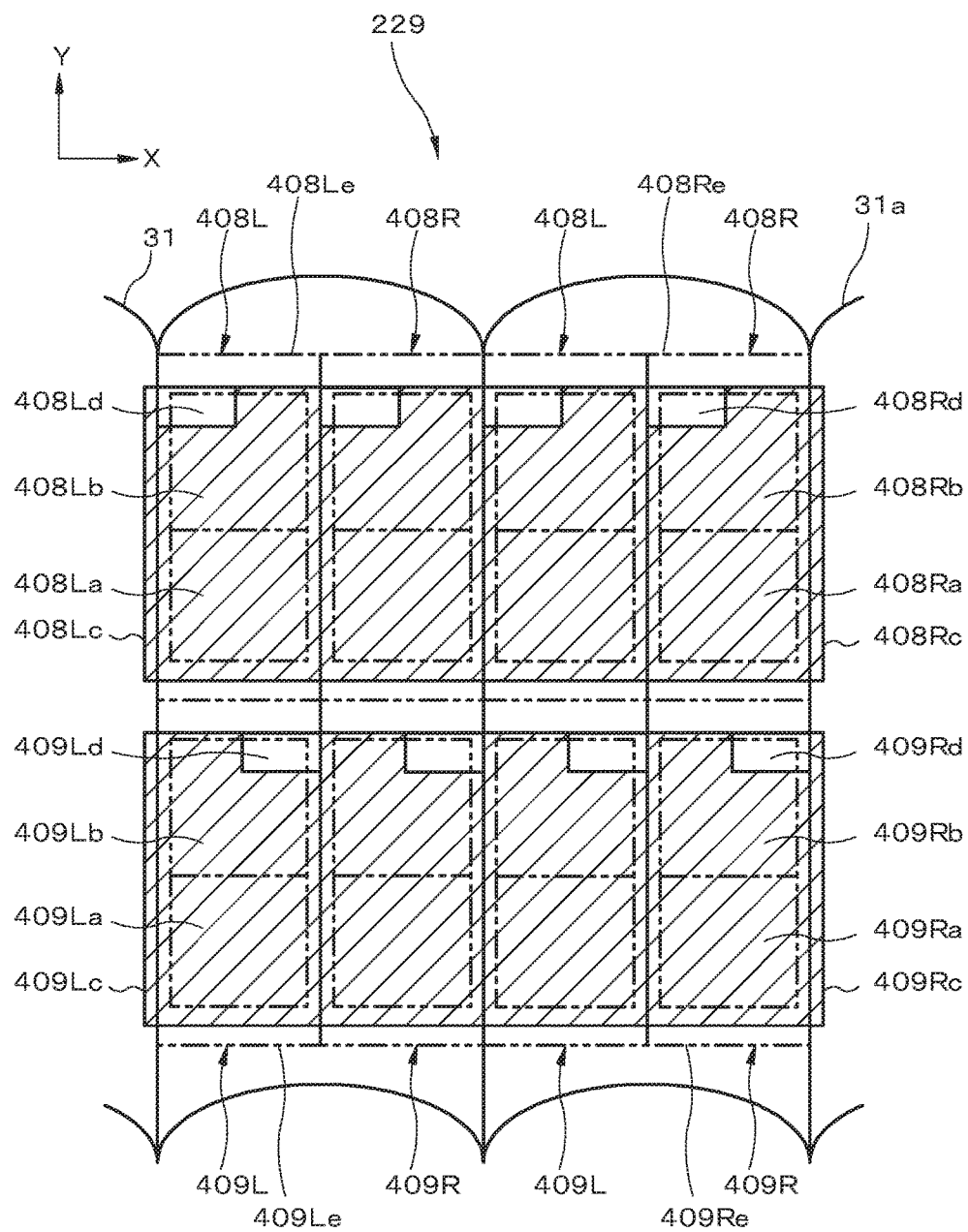
FIG. 57 A plan view showing a display panel of a nineteenth embodiment of the present invention.
Figure 58:
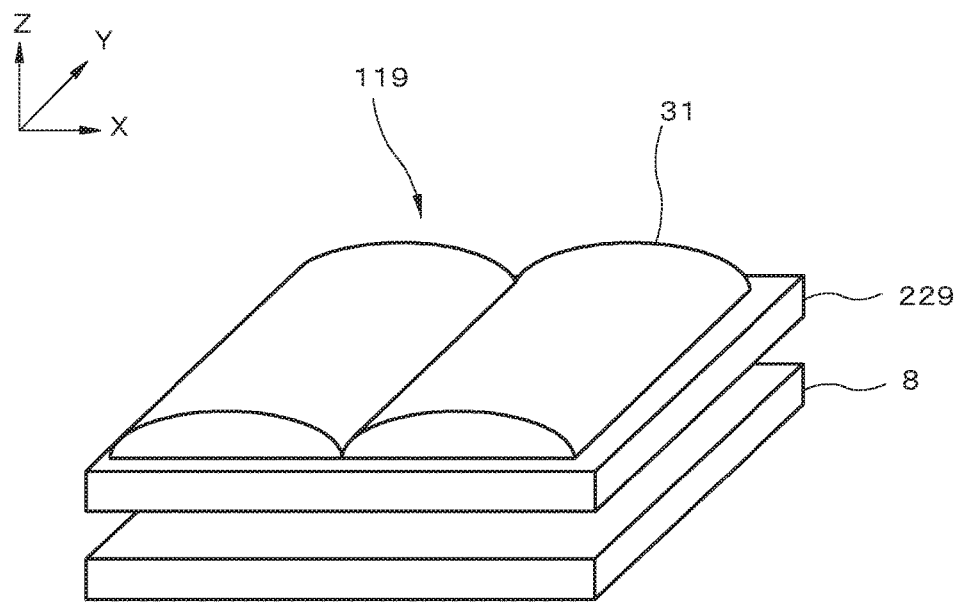
FIG. 58 A perspective view showing a display device of this embodiment.
Figure 59:
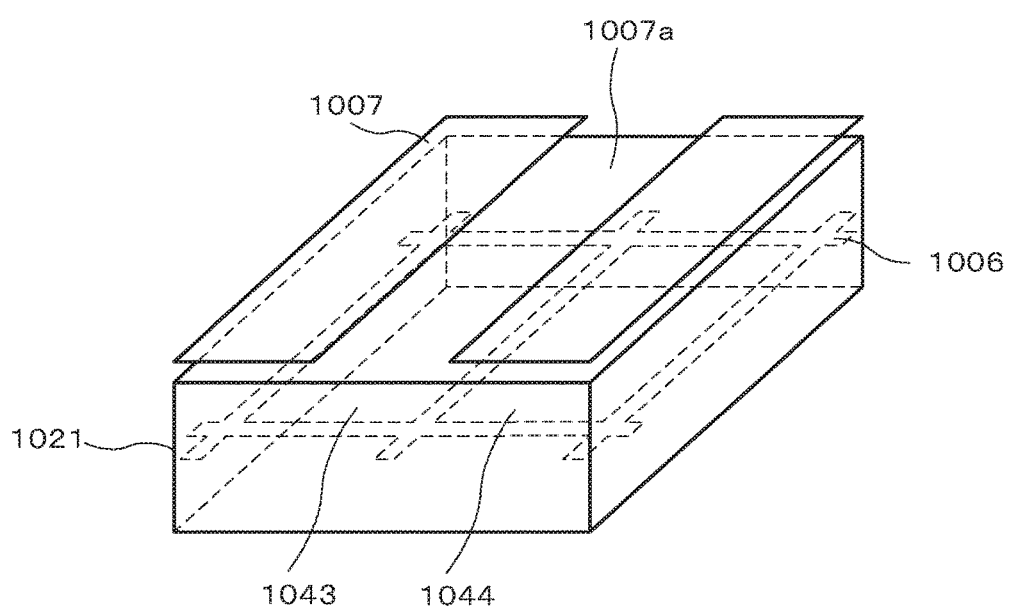
FIG. 59 A perspective view showing a biocular three-dimensional image display device using a parallax barrier of the related art.
Figure 60:
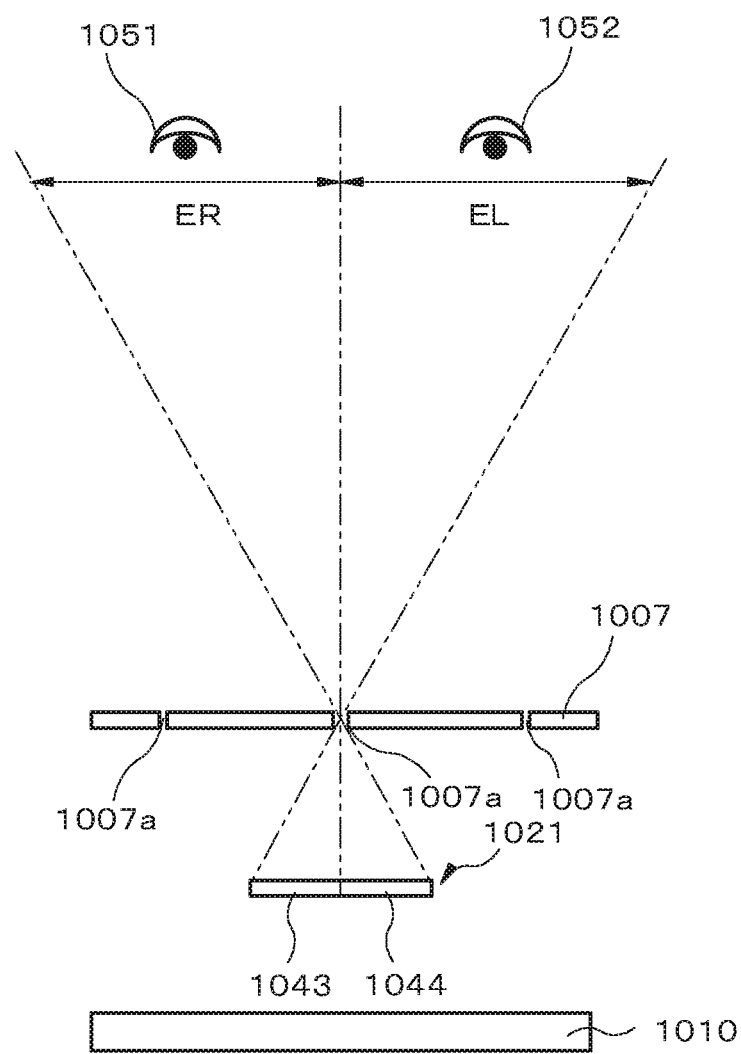
FIG. 60 A diagram showing an optical model for this three-dimensional image display device.
Figure 61:
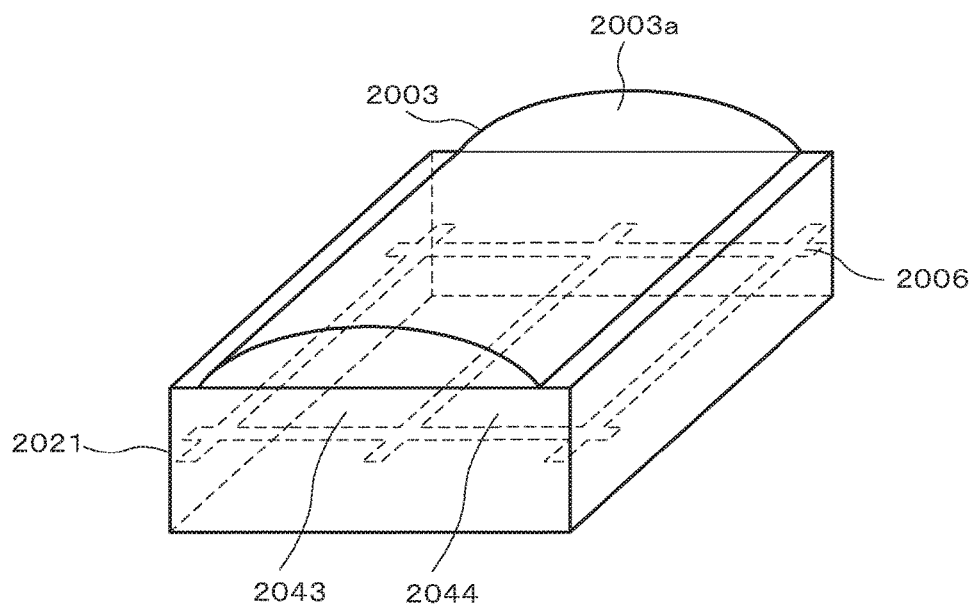
FIG. 61 A perspective view showing a biocular three-dimensional image display device using a lenticular lens of the related art.
Figure 62:
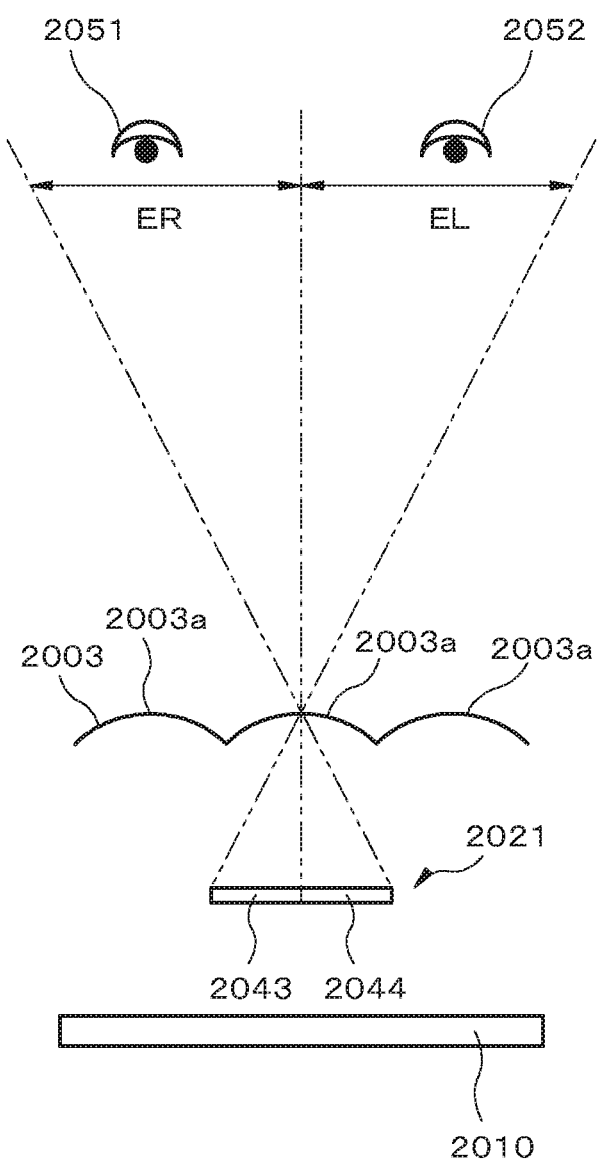
FIG. 62 A diagram showing an optical model for this three-dimensional image display device.
Figure 63:
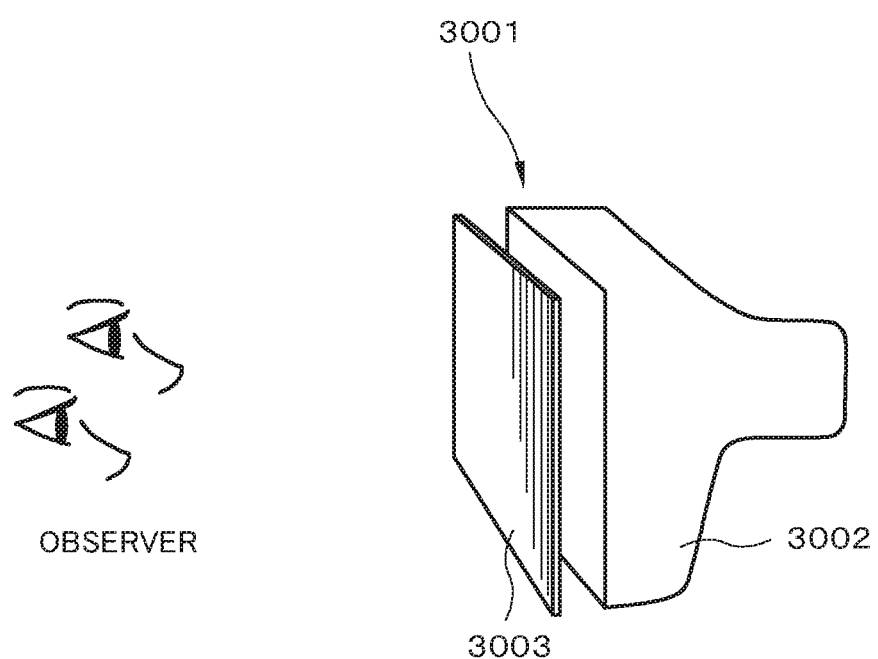
FIG. 63 A schematic view showing a simultaneous multiple image displaying device of the related art disclosed in patent literature 1.
Figure 64:
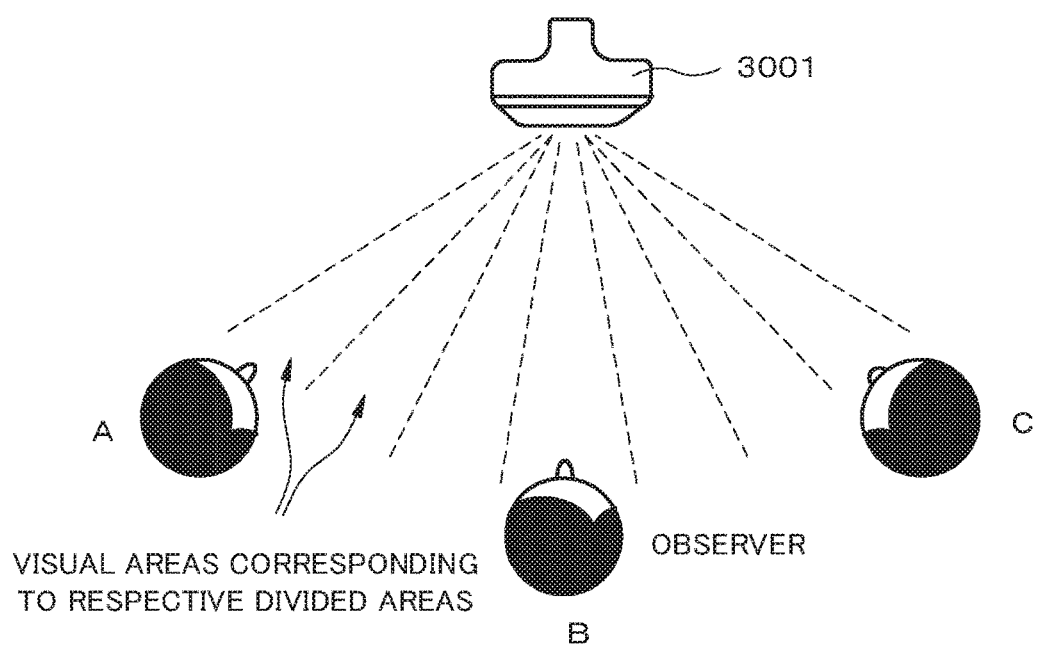
FIG. 64 A view illustrating the operation of the simultaneous multiple image displaying device.
Figure 65:
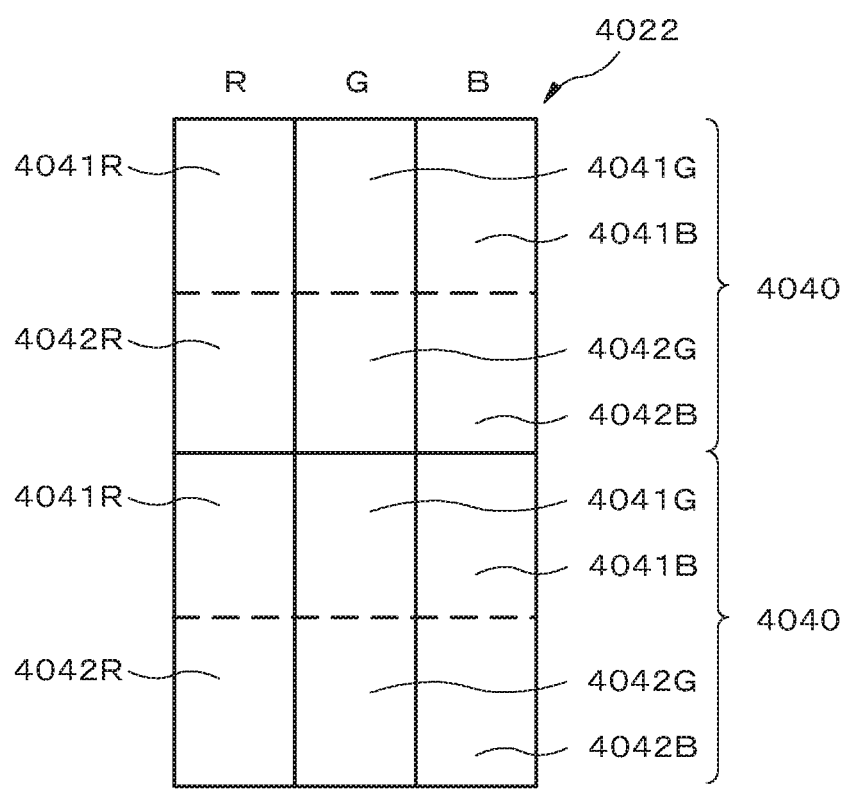
FIG. 65 A plan view showing a first semi-transmissive type liquid crystal display device of the related art as disclosed in non-patent literature 2.
Figure 66:
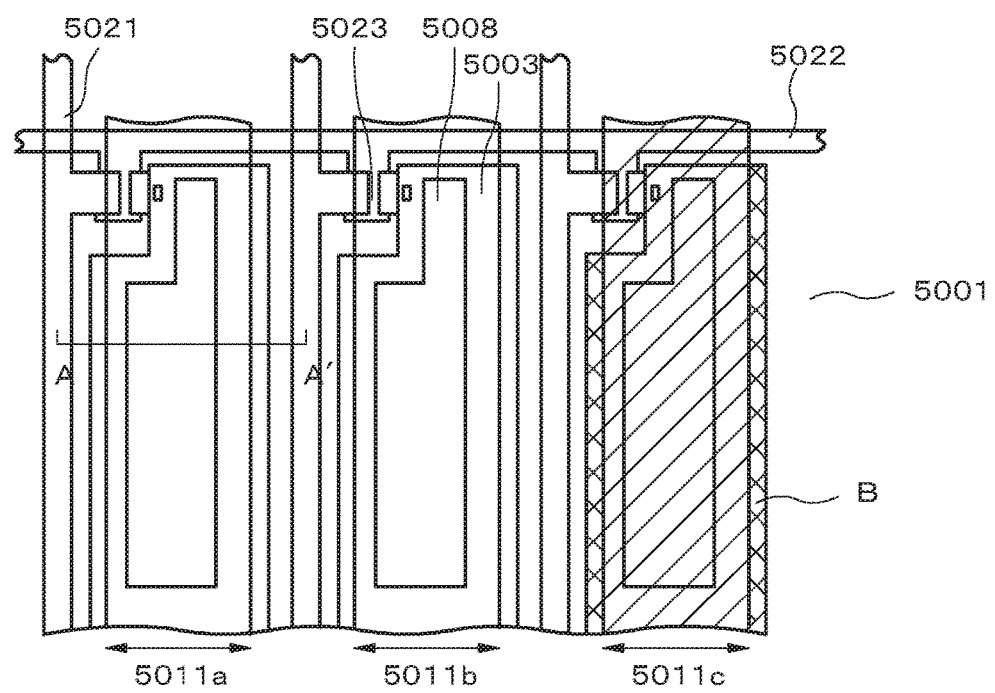
FIG. 66 A plan view showing a second semi-transmissive type liquid crystal display device of the related art as disclosed in non-patent literature 2.

Next, an explanation is given of a nineteenth embodiment of the present invention. FIG. 57 is a plan view showing a display panel of this embodiment. FIG. 58 is a perspective view showing a display device of this embodiment. As shown in FIGS. 57 and 58, a semi-transmissive type liquid crystal display panel 229 and a display device 119 of the nineteenth embodiment differ from the semi-transmissive type liquid crystal display panel 223 and the display device 113 disclosed in the thirteenth embodiment with regards to the shape of the pixels, and in particular the shape of the through-holes. However, the arrangement of the pixels is the same. The lenticular lens 33 of the seventh embodiment can be used. As described previously, the focal length of the cylindrical lenses constituting the lenticular lens is smaller than the distance between the main point of the lens and the pixel plane for the lenticular lens 33.

In the eighteenth embodiment, when two types of the through-hole positioned in the Y-axis direction are positioned on the same straight line while keeping the X-axis coordinate as is, the merged opening heights of the two types of through-holes are constant for any X-axis coordinates. With regards to this, in the nineteenth embodiment, the opening heights are not constant for any X-coordinate even when through-holes positioned in the Y-axis direction are merged. Specifically, as shown in the seventh embodiment, this gives through-holes that are subdivided in the X-axis direction. It is therefore possible to make variations in the height of the openings of the through-holes uniform by making the focal length of the cylindrical lenses small. In other words, this embodiment combines the concept of neighboring pixel compensation disclosed in the thirteenth embodiment with the concept of subdivided through-holes and defocusing lenses disclosed in the seventh embodiment. It is therefore possible to apply the third to seventh embodiments with regards to setting of the radius of curvature of the lens. That is, in this embodiment, it is preferable to select a through-hole opening width and a value with respect to a composite image for the through-holes of pixels neighboring in the Y-axis direction. The structure of the nineteenth embodiment other than that described above is the same as for the thirteenth embodiment.

It is therefore possible to provide compatibility with through-holes of a still smaller surface area than in the eighteenth embodiment by arranging the focal lengths of the cylindrical lenses constituting the lenticular lens so as to be offset from the pixel plane. With regards to the heights of the openings the plurality of through-holes are composed of being uniform regardless of the X-axis coordinates of the eighteenth embodiment, in the nineteenth embodiment it is also possible to provide compatibility with the through-holes subdivided in the X-axis direction. As a result, this embodiment can provide compatibility with increases in the definition and reflective displays with a high degree of color purity can be implemented. The operation and effects of the nineteenth embodiment other than those described above are the same as for the thirteenth embodiment.

Each of the embodiments described above can be implemented independently or can be implemented in combination as is appropriate.

The invention claimed is:

1. A display panel comprising:
    a plurality of display units including at least pixels for displaying a first viewpoint image and pixels for displaying a second viewpoint image arranged in a shape of a matrix;
    an optical member, for splitting in mutually different directions light emitted from each pixel within the display unit provided along a first direction along which the pixels for displaying the first viewpoint image and the pixels for displaying the second viewpoint image are arranged; and
    color filter layers each, having a through-hole, provided at least a display region of each pixel, wherein,
    a light shielding region is formed surrounding the display region in each of the pixels, and
    a width of the through-hole in a second direction changes in a stepped manner according to the position in the first direction, the width of the through-hole in the second direction being maximized at a central portion in the first direction of each pixel and decreases gradually in a stepped manner towards end portions in the first direction of each pixel.

2. A display panel comprising:
    a plurality of display units including at least pixels for displaying a first viewpoint image and pixels for displaying a second viewpoint image arranged in a shape of a matrix;
    an optical member, for splitting in mutually different directions light emitted from each pixel within the display unit provided along a first direction along which the pixels for displaying the first viewpoint image and the pixels for displaying the second viewpoint image are arranged; and
    color filter layers each, having a through-hole, provided at at least a display region of each pixel,
    wherein a light shielding region is formed surrounding the display region in each of the pixels,
    within each pixel, a width of the through-hole in the first direction is larger than a width of the display region, and a portion of the through-hole overlaps the light shielding region,
    a width of the through-hole in a second direction orthogonal to the first direction at a display plane of the display panel changes gradually according to the position in the first direction, the width of the through-hole in the second direction being maximized at a central portion in the first direction of each pixel and decreases gradually in the direction toward end portions in the first direction of each pixel, and
    the width of the through-hole in the second direction is minimized at a portion on the light shielding region,
    wherein the position in the second direction of the through-hole in each pixel is the same among pixels adjacent to each other in the first direction.

* * * * *